US00RE49284E

(19) United States
(12) Reissued Patent
Kozuka et al.

(10) Patent Number: US RE49,284 E
(45) Date of Reissued Patent: *Nov. 8, 2022

(54) METHOD FOR CONTROLLING CORDLESS TELEPHONE DEVICE, HANDSET OF CORDLESS TELEPHONE DEVICE, AND CORDLESS TELEPHONE DEVICE

(71) Applicant: Panasonic Intellectual Property Corporation of America, Torrance, CA (US)

(72) Inventors: Masayuki Kozuka, Osaka (JP); Shingo Matsumoto, Tokyo (JP); Hideyuki Oka, Osaka (JP); Akihiko Inoue, Osaka (JP); Hiroshi Yahata, Osaka (JP); Tomoki Ogawa, Osaka (JP); Tohru Wakabayashi, Hyogo (JP); Keizo Ishiguro, Nara (JP)

(73) Assignee: Panasonic Intellectual Property Corporation of America, Torrance, CA (US)

( * ) Notice: This patent is subject to a terminal disclaimer.

(21) Appl. No.: 16/999,609

(22) Filed: Aug. 21, 2020

Related U.S. Patent Documents

Reissue of:
(64) Patent No.: 9,280,314
Issued: Mar. 8, 2016
Appl. No.: 14/514,659
Filed: Oct. 15, 2014

U.S. Applications:
(63) Continuation of application No. 15/914,710, filed on Mar. 7, 2018, now Pat. No. Re. 48,232, which is an application for the reissue of Pat. No. 9,280,314.
(Continued)

(30) Foreign Application Priority Data

Jul. 24, 2014 (JP) ..... 2014-150290

(51) Int. Cl.
*G10L 21/06* (2013.01)
*G10L 15/22* (2006.01)
(Continued)

(52) U.S. Cl.
CPC ..... *G10L 15/22* (2013.01); *G06F 3/167* (2013.01); *H04M 1/72415* (2021.01); *G10L 2015/223* (2013.01)

(58) Field of Classification Search
CPC ..... H04M 1/72415
See application file for complete search history.

(56) References Cited

U.S. PATENT DOCUMENTS 5,671,267 A 9/1997 August
5,920,806 A 7/1999 Gouessant
(Continued)

FOREIGN PATENT DOCUMENTS

EP 1161064 12/2001
JP 06-152768 5/1994
(Continued)

OTHER PUBLICATIONS

JPO Search Report, Patent Application 2014-150290, dated Jan. 18, 2018. (Year: 2018).

*Primary Examiner* — Luke S Wassum
(74) *Attorney, Agent, or Firm* — Wenderoth, Lind & Ponack, LLP

(57) ABSTRACT

Disclosed is a method for controlling a cordless telephone device for use in a system that allows remote control of a home electric appliance. The method includes a first generation step of causing a first generation unit in a handset to encode audio input via a sound receiving unit in the handset to generate a first stream, and a first transmission step of transmitting the first stream to a base unit. The first generation step includes causing the first generation unit to generate instruction bit information and a first instruction stream
(Continued)

when a first trigger indicating a request to start the remote control is given to the first generation unit. The first transmission step includes transmitting the instruction bit information and the first instruction stream to the base unit through a multiplexing scheme that is common to transmission of a first stream generated when the first trigger is not given.

14 Claims, 40 Drawing Sheets

Related U.S. Application Data

(60) Provisional application No. 61/892,179, filed on Oct. 17, 2013.

(51) Int. Cl.

| | |
|---|---|
| ***G06F 3/16*** | (2006.01) |
| ***H04M 1/725*** | (2021.01) |
| ***G10L 15/00*** | (2013.01) |
| ***H04M 1/72415*** | (2021.01) |

(56) References Cited

U.S. PATENT DOCUMENTS

| | | | | |
|---|---|---|---|---|
| 5,963,624 | A | 10/1999 | Pope | |
| 5,978,689 | A | 11/1999 | Tuoriniemi | |
| 6,901,270 | B1 * | 5/2005 | Beach | G10L 15/30 704/E15.047 |
| 6,975,993 | B1 | 12/2005 | Keiller | |
| 7,194,259 | B2 | 3/2007 | DeLine | |
| 7,389,103 | B2 | 6/2008 | Stepanian | |
| 7,418,392 | B1 | 8/2008 | Mozer | |
| 7,627,313 | B2 | 12/2009 | Aretz | |
| 8,260,618 | B2 | 9/2012 | Mahlbacher | |
| 8,340,975 | B1 | 12/2012 | Rosenberger | |
| 8,442,812 | B2 * | 5/2013 | Ehsani et al. | 704/9 |
| 8,666,750 | B2 | 3/2014 | Buck | |
| 9,922,646 | B1 | 3/2018 | Blanksteen | |
| 11,283,914 | B2 * | 3/2022 | Hatanaka | H04M 1/72412 |
| 2001/0005197 | A1 | 6/2001 | Mishra | |
| 2001/0041980 | A1 | 11/2001 | Howard | |
| 2002/0110228 | A1 * | 8/2002 | Silverman et al. | 379/110.01 |
| 2002/0149796 | A1 * | 10/2002 | Ominato | 358/402 |
| 2003/0080874 | A1 | 5/2003 | Yumoto | |
| 2003/0210774 | A1 | 11/2003 | Wanderlich | |
| 2005/0210064 | A1 | 9/2005 | Caldini | |
| 2005/0272477 | A1 | 12/2005 | Boykins | |
| 2006/0217065 | A1 | 9/2006 | Spilo | |
| 2007/0046493 | A1 | 3/2007 | Park | |
| 2007/0211579 | A1 * | 9/2007 | Yoshimura | H04R 5/04 369/7 |
| 2008/0026725 | A1 | 1/2008 | Cha | |
| 2008/0154610 | A1 | 6/2008 | Mahlbacher | |
| 2008/0220767 | A1 | 9/2008 | Aretz | |
| 2010/0228553 | A1 * | 9/2010 | Morii | H04M 1/60 704/500 |
| 2012/0109384 | A1 | 5/2012 | Stepanian | |
| 2013/0150004 | A1 | 6/2013 | Rosen | |
| 2013/0169524 | A1 | 7/2013 | Han et al. | |
| 2013/0230057 | A1 | 9/2013 | Hori et al. | |
| 2014/0156281 | A1 | 6/2014 | Boyd | |

FOREIGN PATENT DOCUMENTS

| | | |
|---|---|---|
| JP | 07-030675 | 1/1995 |
| JP | 9-270861 | 10/1997 |
| JP | 10-094070 | 4/1998 |
| JP | 2006-203900 | 8/2006 |
| JP | 2009-049653 | 3/2009 |
| JP | 2011-118822 | 6/2011 |
| WO | 03/056790 | 7/2003 |
| WO | 2012/063417 | 5/2012 |

* cited by examiner

FIG. 28

<SETTING DATA: PRIORITY ORDER>

| LIGHTING DEVICE | TELEPHONE HANDSET(A) | TELEPHONE HANDSET(B) | TELEPHONE HANDSET(C) |
|---|---|---|---|
| LIGHTING DEVICE(A) | FIRST | — | — |
| LIGHTING DEVICE(B) | — | FIRST | — |
| LIGHTING DEVICE(C) | — | — | FIRST |
| LIGHTING DEVICE(D) | SECOND | SECOND | SECOND |
| LIGHTING DEVICE(E) | THIRD | FOURTH | FOURTH |
| LIGHTING DEVICE(F) | FOURTH | THIRD | THIRD |
| LIGHTING DEVICE(G) | FIFTH | — | — |

| AIR CONDITIONER | TELEPHONE HANDSET(A) | TELEPHONE HANDSET(B) | TELEPHONE HANDSET(C) |
|---|---|---|---|
| AIR CONDITIONER(A) | FIRST | — | — |
| AIR CONDITIONER(B) | FOURTH | FIRST | — |
| AIR CONDITIONER(C) | FIFTH | — | FIRST |
| AIR CONDITIONER(D) | SECOND | SECOND | SECOND |
| AIR CONDITIONER(E) | THIRD | THIRD | THIRD |

| TELEVISION DEVICE | TELEPHONE HANDSET(A) | TELEPHONE HANDSET(B) | TELEPHONE HANDSET(C) |
|---|---|---|---|
| TELEVISION DEVICE(A) | FIRST | — | — |
| TELEVISION DEVICE(B) | THIRD | FIRST | — |
| TELEVISION DEVICE(C) | FOURTH | — | FIRST |
| TELEVISION DEVICE(D) | SECOND | SECOND | SECOND |

| VIDEO DEVICE | TELEPHONE HANDSET(A) | TELEPHONE HANDSET(B) | TELEPHONE HANDSET(C) |
|---|---|---|---|
| VIDEO DEVICE(A) | FIRST | — | — |
| VIDEO DEVICE(D) | SECOND | FIRST | FIRST |

FIG. 31

<SETTING DATA: PRIORITY ORDER>

| LIGHTING DEVICE | BEDROOM | NURSERY ROOM (1) | NURSERY ROOM (2) | LIVING ROOM | DINING ROOM | TOILET ROOM | BATHROOM OR LAUNDRY ROOM |
|---|---|---|---|---|---|---|---|
| LIGHTING DEVICE(A) | FIRST | SEVENTH | SEVENTH | SIXTH | SIXTH | FIFTH | FOURTH |
| LIGHTING DEVICE(B) | SIXTH | FIRST | EIGHTH | SEVENTH | SEVENTH | SIXTH | SIXTH |
| LIGHTING DEVICE(C) | SEVENTH | EIGHTH | FIRST | EIGHTH | EIGHTH | SEVENTH | SEVENTH |
| LIGHTING DEVICE(D) | SECOND | SECOND | SECOND | FIRST | SECOND | SECOND | SECOND |
| LIGHTING DEVICE(E) | THIRD | THIRD | THIRD | SECOND | FIRST | THIRD | THIRD |
| LIGHTING DEVICE(F) | FOURTH | FOURTH | FOURTH | FOURTH | THIRD | FIRST | FIFTH |
| LIGHTING DEVICE(G) | FIFTH | FIFTH | FIFTH | FIFTH | FOURTH | FOURTH | FIRST |

FIG. 38

| | |
|---|---|
| TAKE REMOTE CONTROL OF HOME ELECTRIC APPLIANCE USING WEARABLE TERMINAL | MAKE GESTURE |
| MAKE CALL ON WEARABLE TERMINAL | TURN ON POWER BUTTON OF WEARABLE TERMINAL |
| ANSWER INCOMING CALL ON SMARTPHONE WITH WEARABLE TERMINAL | OPERATE TOUCH PANEL OF WEARABLE TERMINAL |

METHOD FOR CONTROLLING CORDLESS TELEPHONE DEVICE, HANDSET OF CORDLESS TELEPHONE DEVICE, AND CORDLESS TELEPHONE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a continuation reissue of application Ser. No. 15/914,710, filed Mar. 7, 2018, which is an application for reissue of U.S. Pat. No. 9,280,314, which issued on Mar. 8, 2016 from application Ser. No. 14/514,659, which claims the benefit of U.S. Provisional Application No. 61/892,179, filed Oct. 17, 2013. More than one reissue application has been filed for the reissue of U.S. Pat. No. 9,280,314. The reissue applications are (i) application Ser. No. 15/914,710, filed Mar. 7, 2018 and (ii) the present application.*

BACKGROUND

1. Technical Field

The present disclosure relates to a technique for controlling a cordless telephone device for use in a system that allows remote control of a home electric appliance in accordance with voice instructions of a user.

2. Description of the Related Art

Recent advancements in communication technology enable remote control of a home electric appliance by using voice instructions of a user (see Japanese Unexamined Patent Application Publication No. 6-152768 and Japanese Unexamined Patent Application Publication No. 7-30675). The techniques disclosed in Japanese Unexamined Patent Application Publication No. 6-152768 (hereinafter referred to as "Patent Literature 1") and Japanese Unexamined Patent Application Publication No. 7-30675 (hereinafter referred to as "Patent Literature 2") allow a user to input a specific code or password to a handset of a cordless telephone device to set the operation mode of a base unit of the cordless telephone device to a speech recognition mode. The base unit executes various processes for remote control of a home electric appliance in the speech recognition mode.

SUMMARY

However, further improvements are needed in the techniques disclosed in Patent Literature 1 and Patent Literature 2.

In one general aspect, the techniques disclosed here feature a method for controlling a cordless telephone device including a base unit and a handset, for use in a system that allows remote control of a home electric appliance by using voice instructions of a user. The method includes a first generation step of causing a first generation unit included in the handset to generate a first stream by encoding audio input via a sound receiving unit included in the handset, and a first transmission step of transmitting the first stream to the base unit. The first generation step includes causing the first generation unit to generate instruction bit information indicating that the audio represents the voice instructions and to generate, as the first stream, a first instruction stream indicative of the voice instructions in a case where a first trigger indicating a request to start the remote control of the home electric appliance is given to the first generation unit. The first transmission step includes transmitting the instruction bit information and the first instruction stream to the base unit through a common multiplexing scheme that is common to transmission of the first stream generated in a case where the first trigger is not given to the first generation unit. These general and specific aspects may be implemented using a system, a method, and a computer program, and any combination of systems, methods, and computer programs.

Embodiments of the present disclosure may enable easy switching between a call mode in which a user makes a telephone call and a remote control mode in which a user takes remote control of a home electric appliance.

BRIEF DESCRIPTION OF THE DRAWINGS

FIG. 28 is a table showing illustrative data stored in a target device database in the control system illustrated in FIG. 27;

FIG. 31 is a table showing illustrative data stored in a target device database in the control system illustrated in FIG. 30;

FIG. 38 is a table showing illustrative relationships between operations demanded by a user and operations performed on a wearable terminal.

DETAILED DESCRIPTION

Figure 1:
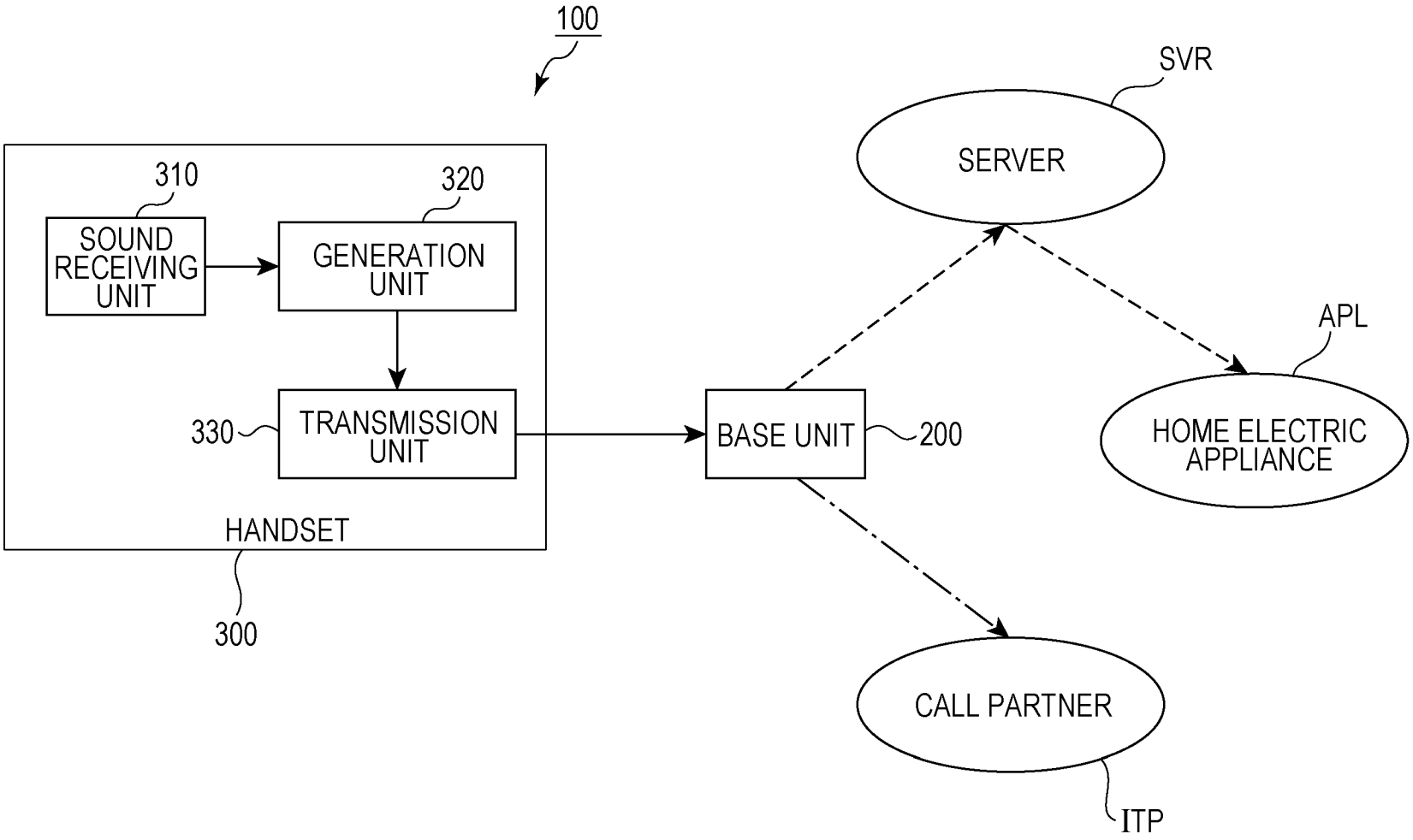
FIG. 1 is a schematic block diagram of a cordless telephone device according to Embodiment 1.

Findings on which the Present Disclosure is Based

The inventor has found that the techniques disclosed in Patent Literature 1 and Patent Literature 2 given above have the following difficulties.

The techniques disclosed in Patent Literature 1 and Patent Literature 2 require, between the handset and the base unit, a line used only for telephone calls or conversations and a line used only for remote control of home electric appliances. This increases the complexity of the design required by a control system for controlling home electric appliances, and also increases construction cost for the control system.

To address the problems described above, the inventor has developed the following solution.

A first aspect of the present disclosure provides a method for controlling a cordless telephone device including a base unit and a handset, for use in a system that allows remote control of a home electric appliance by using voice instructions of a user. The method includes a first generation step of causing a first generation unit included in the handset to generate a first stream by encoding audio input via a sound receiving unit included in the handset, and a first transmission step of transmitting the first stream to the base unit. The first generation step includes causing the first generation unit to generate instruction bit information indicating that the audio represents the voice instructions and to generate, as the first stream, a first instruction stream indicative of the voice instructions in a case where a first trigger indicating a request to start the remote control of the home electric appliance is given to the first generation unit. The first transmission step includes transmitting the instruction bit information and the first instruction stream to the base unit through a common multiplexing scheme that is common to transmission of a first stream generated in a case where the first trigger is not given.

According to this aspect, instruction bit information and a first instruction stream are transmitted to a base unit through a common multiplexing scheme that is common to transmission of a first stream generated in a case where the first trigger is not given. Thus, the user may be able to easily switch the operation mode of the cordless telephone device between the call mode and the remote control mode.

In the first aspect, the common multiplexing scheme may be a Time Division Duplex/Time Division Multiple Access (TDD-TDMA) scheme complying with a Digital Enhanced Cordless Telecommunications (DECT) standard.

According to this aspect, the common multiplexing scheme is a TDD-TDMA scheme complying with a DECT standard. Thus, a system for the remote control of a home electric appliance may be easily constructed.

In the first aspect, in a case where the first trigger is not given to the first generation unit, the first generation step may include causing the first generation unit to generate call bit information indicating that the audio represents a voice call and to generate, as the first stream, a first call stream indicative of the audio.

According to this aspect, the first generation unit generates call bit information. Thus, the base unit may be able to accurately determine whether or not the user wishes to enter a remote control mode, preventing or reducing erroneous switching of the operation mode of the cordless telephone device.

In the first aspect, the first generation step may include, in a case where the first generation unit receives the first trigger during generation of the first call stream, causing the first generation unit to generate the instruction bit information and the first instruction stream, and causing the first generation unit to switch an operation mode of the cordless telephone device from a call mode in which the audio is transferred to an intended party with which the user is engaged in the voice call to a mute mode in which transfer of the audio to the intended party is interrupted.

According to this aspect, upon receipt of the first trigger during the generation of a first call stream, the first generation unit switches the operation mode of the cordless telephone device from a call mode in which audio is transferred to the intended party to a mute mode in which transfer of the audio to the intended party is interrupted. Thus, the voice instructions given to the cordless telephone device may be less likely to be delivered to the intended party. This may enable the user to easily switch the operation mode of the cordless telephone device from the call mode to the remote control mode even during a telephone conversation.

In the first aspect, the first generation step may include causing the first generation unit to generate, during the mute mode, an alternative stream representing an alternative sound that replaces the audio. The first transmission step may include transmitting the alternative stream to the base unit through the common multiplexing scheme.

According to this aspect, an alternative stream is transmitted to the base unit. Thus, the intended party may be able to hear an alternative sound during the mute mode. Accordingly, the intended party may be able to recognize that the connection with the cordless telephone device is ongoing.

In the first aspect, the first generation step may include, in a case where the first generation unit receives a second trigger indicating a request to return to the call mode, (i) causing the first generation unit to terminate the mute mode, and (ii) causing the first generation unit to generate the call bit information and the first call stream.

According to this aspect, the user may be able to easily return the operation mode of the cordless telephone device from the remote control mode to the call mode during a telephone conversation.

In the first aspect, the first generation step may include, after a certain period has elapsed since the mute mode began, (i) causing the first generation unit to terminate the mute mode, and (ii) causing the first generation unit to generate the call bit information and the first call stream.

According to this aspect, the user may be able to easily return the operation mode of the cordless telephone device from the remote control mode to the call mode during a telephone conversation.

In the first aspect, the first generation step may include causing the first generation unit to generate, as the call bit information, information specifying an audio encoding scheme for the first call stream.

According to this aspect, the first call stream may be appropriately encoded using the audio encoding scheme specified in the call bit information.

In the first aspect, the first generation step may include causing the first generation unit to generate, as the call bit information, information specifying a bit rate for the first call stream.

According to this aspect, the first call stream may be appropriately encoded at the bit rate specified in the call bit information.

In the first aspect, the first generation step may include causing the first generation unit to generate, as the instruction bit information, information specifying an audio encoding scheme for the first instruction stream.

According to this aspect, the first instruction stream may be appropriately encoded using the audio encoding scheme specified in the instruction bit information.

In the first aspect, the first generation step may include causing the first generation unit to generate, as the instruction bit information, information specifying a bit rate for the first instruction stream.

According to this aspect, the first instruction stream may be appropriately encoded at the bit rate specified in the instruction bit information.

In the first aspect, the first generation step may include causing the first generation unit to encode the first instruction stream and the first call stream at a bit rate complying with the DECT standard using an audio encoding scheme complying with the DECT standard.

According to this aspect, the first instruction stream and the first call stream may be appropriately encoded at a bit rate complying with the DECT standard using an audio encoding scheme complying with the DECT standard.

In the first aspect, the first trigger may be given to the first generation unit by predetermined movement given to the handset, predetermined audio given to the handset, or a predetermined operation given to the handset.

According to this aspect, the user may be able to give predetermined movement, predetermined audio, or a predetermined operation to the handset to easily switch the operation mode of the cordless telephone device.

In the first aspect, the method may further include a second generation step of generating a second stream corresponding to the first stream transmitted from the handset to the base unit, and a second transmission step of transmitting the second stream. The second generation step may include (i) in a case where the base unit receives the instruction bit information and the first instruction stream, causing the base unit to generate a second instruction stream corresponding to the first instruction stream, and (ii) in a case where the base unit receives the call bit information and the first call stream, causing the base unit to generate a second call stream corresponding to the first call stream. The second transmission step may include (iii) in a case where the base unit generates the second instruction stream, causing the base unit to transmit the second instruction stream to a server that generates a control command using the second instruction stream for controlling the home electric appliance, and (iv) in a case where the base unit generates the second call stream, transmitting the second call stream to a telephone of the intended party.

According to this aspect, the base unit generates a second instruction stream corresponding to the first instruction stream in accordance with receipt of the instruction bit information and the first instruction stream. Thus, the user may be able to appropriately operate the home electric appliance in accordance with audio from the user. The base unit generates a second call stream corresponding to the first call stream in accordance with receipt of the call bit information and the first call stream. Thus, the user may be able to appropriately have a conversation with the intended party.

In the first aspect, the second transmission step may include causing the base unit to selectively transmit the second instruction stream or the second call stream via a public communication line that is common to transmission of the second instruction stream and the second call stream.

According to this aspect, the base unit selectively transmits the second instruction stream or the second call stream via a public communication line that is common to transmission of the second instruction stream and the second call stream. Thus, a simple connection may be made between the cordless telephone device and the public communication line.

In the first aspect, the second transmission step may include (i) in a case where the base unit generates the second instruction stream, causing the base unit to transmit the second instruction stream via a first public communication line, and (ii) in a case where the base unit generates the second call stream, causing the base unit to transmit the second call stream via a second public communication line different from the first public communication line.

According to this aspect, the base unit that generates a second call stream transmits the second call stream via a second public communication line different from a first public communication line. Thus, the user may be able to select a public communication line suitable for the transmission of the second instruction stream as a first public communication line, and to select a public communication line suitable for the second call stream as a second public communication line.

In the first aspect, the second generation step may include causing the base unit to generate, during the mute mode, an alternative stream representing an alternative sound that replaces the audio. The second transmission step may include, in a case where the base unit generates the alternative stream, transmitting the alternative stream to the telephone of the intended party.

According to this aspect, an alternative stream is transmitted to the telephone of the intended party. Thus, the intended party may be able to hear an alternative sound during the mute mode. Accordingly, the intended party may be able to recognize that the connection with the cordless telephone device is ongoing.

A second aspect of the present disclosure provides a handset of a cordless telephone device for use in a system that allows remote control of a home electric appliance by using voice instructions of a user. The handset includes a sound receiving unit configured to receive audio of the user, a first generation unit configured to generate a first stream by encoding the audio input via the sound receiving unit, and a first transmission unit configured to transmit the first stream to a base unit of the cordless telephone device. The first generation unit is configured to generate instruction bit information indicating that the audio represents the voice instructions and to generate, as the first stream, a first instruction stream indicative of the voice instructions in accordance with a first trigger indicating a request to start the remote control of the home electric appliance. The first transmission unit is configured to transmit the instruction bit information and the first instruction stream to the base unit through a common multiplexing scheme that is common to transmission of a first stream generated in a case where the first trigger is not given to the first generation unit.

According to this aspect, instruction bit information and a first instruction stream are transmitted to a base unit through a common multiplexing scheme that is common to transmission of a first stream generated in a case where the first trigger is not given. Thus, the user may be able to easily switch the operation mode of the cordless telephone device between the call mode and the remote control mode.

In the second aspect, in a case where the first trigger is not given to the first generation unit, the first generation unit may be configured to generate call bit information indicating that the audio represents a voice call and to generate, as the first stream, a first call stream indicative of the audio.

According to this aspect, the first generation unit generates call bit information. Thus, the base unit may be able to accurately determine whether or not the user wishes to enter a remote control mode, preventing or reducing erroneous switching of the operation mode of the cordless telephone device.

In the second aspect, the handset may further include a trigger generation unit configured to give the first trigger to the first generation unit.

According to this aspect, the handset includes a trigger generation unit. Thus, the user may be able to operate the handset to easily switch the operation mode of the cordless telephone device between the call mode and the remote control mode.

A third aspect of the present disclosure provides a cordless telephone device including the handset described above and a base unit. The base unit includes (i) a second generation unit configured to generate a second instruction stream corresponding to the first instruction stream in accordance with receipt of the instruction bit information and the first instruction stream, and configured to generate a second call stream corresponding to the first call stream in accordance with receipt of the call bit information and the first call stream, and (ii) a second transmission unit configured to transmit the second instruction stream to a server that generates a control command using the second instruction stream for controlling the home electric appliance, and configured to transmit the second call stream to a telephone of an intended party with which the user is engaged in the voice call.

According to this aspect, the base unit generates a second instruction stream corresponding to the first instruction stream in accordance with receipt of the instruction bit information and the first instruction stream. Thus, the home electric appliance may appropriately operate in accordance with the audio from the user. The base unit generates a second call stream corresponding to the first call stream in accordance with receipt of the call bit information and the first call stream. Thus, the user may be able to appropriately have a conversation with the intended party.

Some embodiments relating to a technique for controlling a home electrical device using a cordless telephone device will be described hereinafter with reference to the accompanying drawings. The technique for controlling a home electrical device using a cordless telephone device will be apparently understood from the following description. Note that the direction associated with the terms "up", "down", "left", "right", etc. is for descriptive purposes only and is intended to be broadly construed.

Embodiment 1

As described above, existing control techniques using a cordless telephone device require, between the handset and the base unit, a line used only for telephone calls or conversations and a line used only for remote control of home electric appliances. No extremely complicated design of a control system for controlling a home electric appliance is required when a stream representing audio of a telephone conversation and a stream representing audio for remote control of a home electric appliance are transferred from the handset to the base unit using a common multiplexing scheme constructed between the handset and the base unit. This may result in a reduction in the construction cost for the control system. In Embodiment 1, a description will be given of a technique for transferring a stream representing audio of a telephone conversation and a stream representing audio for remote control of a home electric appliance from the handset to the base unit using a common multiplexing scheme constructed between the handset and the base unit.

FIG. 1 is a schematic block diagram of a cordless telephone device 100 according to Embodiment 1. The cordless telephone device 100 will be described with reference to FIG. 1.

The cordless telephone device 100 includes a base unit 200 and a handset 300. As with a typical cordless telephone device, a user is able to input audio to the base unit 200 or the handset 300 and to have a conversation with an intended party ITP.

The user may give voice instructions for remote control of a home electric appliance APL to the handset 300. The voice instructions are transferred from the handset 300 to the base unit 200. After that, the voice instructions are transferred from the base unit 200 to the home electric appliance APL via a server SVR. The home electric appliance APL operates in accordance with the voice instructions. Accordingly, the cordless telephone device 100 can function as part of a system that executes remote control of the home electric appliance APL.

The handset 300 includes a sound receiving unit 310, a generation unit 320, and a transmission unit 330. The user provides audio to the sound receiving unit 310. The sound receiving unit 310 receives the audio and converts it into an electrical signal. The sound receiving unit 310 may be a built-in microphone of a typical telephone. Alternatively, the sound receiving unit 310 may be any other device configured to convert the audio of the user into an electrical signal. The basic concept of this embodiment is not limited to a specific device used for the sound receiving unit 310.

The electrical signal is output from the sound receiving unit 310 to the generation unit 320. The generation unit 320 applies an encoding process to the electrical signal, and generates a stream representing the audio of the user. In this embodiment, the first generation unit is exemplified by the generation unit 320. The first stream is exemplified by the stream generated by the generation unit 320.

The encoding process may be based on an encoding technique used by a typical cordless telephone device. For example, the generation unit 320 may execute an encoding process using an audio encoding scheme complying with the digital enhanced cordless telecommunications (DECT) standard. Additionally, the generation unit 320 may execute an encoding process at a bit rate complying with the DECT standard. Alternatively, the generation unit 320 may perform an encoding process using any other audio encoding technique. The basic concept of this embodiment is not limited to a specific encoding process executed by the generation unit 320.

The stream is output from the generation unit 320 to the transmission unit 330. After that, the transmission unit 330 transmits the stream to the base unit 200. In this embodiment, the first transmission unit is exemplified by the transmission unit 330.

The user may give a trigger to the handset 300 for requesting the start of the remote control of the home electric appliance APL. The user may perform a predetermined operation on the handset 300 to request the start of the remote control of the home electric appliance APL. Alternatively, the user may give predetermined movement to the handset 300 to request the start of the remote control of the home electric appliance APL. Further alternatively, the user may provide predetermined audio to the handset 300 to request the start of the remote control of the home electric appliance APL. The basic concept of this embodiment is not limited to a specific method for requesting the start of the remote control of the home electric appliance APL. In this embodiment, the first trigger is exemplified by the trigger given by the user to the handset 300.

When the user gives a trigger to the handset 300 in the way described above, the generation unit 320 generates instruction bit information in accordance with the trigger. The generation unit 320 generates, as the stream described above, an instruction stream from the electrical signal representing the audio received by the sound receiving unit 310 after the trigger (voice instructions for the home electric appliance APL) was given. In this embodiment, the first instruction stream is exemplified by the instruction stream generated by the generation unit 320.

Similarly to a stream generated by the generation unit 320 when the user does not give a trigger to the handset 300, the instruction bit information and the instruction stream are transmitted from the generation unit 320 to the base unit 200 via the transmission unit 330. The instruction bit information and the instruction stream are transmitted from the transmission unit 330 to the base unit 200 using a multiplexing scheme that is common to the transmission of the stream generated by the generation unit 320 when the user does not give a trigger to the handset 300. Thus, no extremely complicated design of a control system for controlling the home electric appliance APL is required.

A common multiplexing scheme constructed between the handset 300 and the base unit 200 may be a time division duplex/time division multiple access (TDD-TDMA) scheme complying with the DECT standard. Alternatively, any other multiplexing scheme may be constructed between the handset 300 and the base unit 200. The basic concept of this embodiment is not limited to a specific multiplexing scheme.

When the base unit 200 receives the instruction bit information, the base unit 200 may determine that the stream received together with the instruction bit information is an instruction stream representing voice instructions for the home electric appliance APL. In this case, the base unit 200 communicates with the home electric appliance APL via the server SVR.

When the base unit 200 does not receive the instruction bit information, the base unit 200 may determine that the stream received from the handset 300 represents the content of a conversation with the intended party ITP. In this case, the base unit 200 communicates with the telephone of the intended party ITP.

Embodiment 2

The cordless telephone device described in connection with Embodiment 1 is configured to operate under various forms of control. In Embodiment 2, a description will be given of an illustrative control method for the cordless telephone device.

Figure 2:
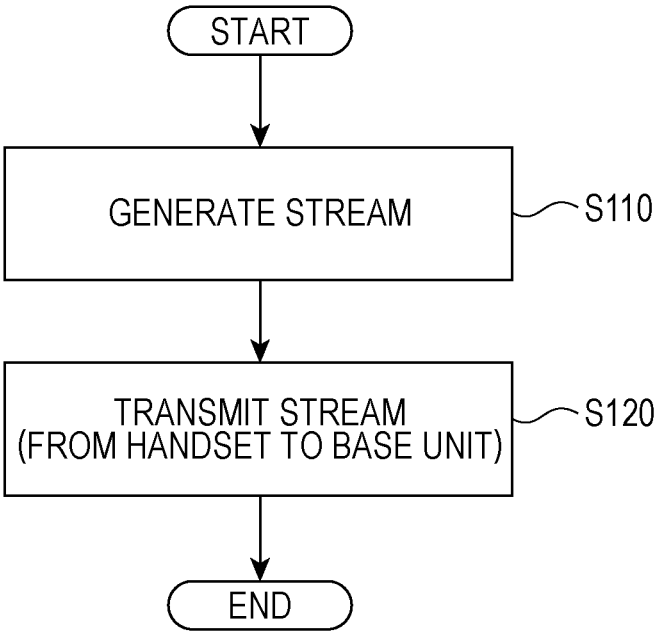
FIG. 2 is a schematic flowchart of an illustrative control method for the cordless telephone device illustrated in FIG. 1 (Embodiment 2)

FIG. 2 is a schematic flowchart of an illustrative control method for the cordless telephone device 100. A control method for the cordless telephone device 100 will be described with reference to FIG. 1 and FIG. 2.

Step S110

In step S110, the generation unit 320 executes an encoding process on an electrical signal representing audio input via the sound receiving unit 310, and generates a stream. When the user gives a trigger to the handset 300, the generation unit 320 generates instruction bit information and also generates an instruction stream as a stream. After the generation unit 320 generates the stream, step S120 is executed. In this embodiment, the first generation step is exemplified by step S110.

Step S120

In step S120, the stream is transmitted from the generation unit 320 to the base unit 200 via the transmission unit 330. If the generation unit 320 generates instruction bit information and an instruction stream in step S110, the instruction bit information and the instruction stream are output from the generation unit 320 to the transmission unit 330. The instruction bit information and the instruction stream are transmitted from the transmission unit 330 to the base unit 200 through a multiplexing scheme. A multiplexing scheme that is common to a stream generated by the generation unit 320 when the user does not give a trigger to the handset 300 is used for the transmission of the instruction bit information and the instruction stream from the transmission unit 330 to the base unit 200. In this embodiment, the first transmission step is exemplified by step S120.

Embodiment 3

The handset may also generate bit information when the user does not give a trigger to the handset. This allows the base unit to accurately determine whether the stream transmitted from the handset represents the content of a conversation with the intended party or voice instructions for a home electric appliance. In Embodiment 3, a description will be given of a control technique for generating a plurality of types of bit information.

Figure 3:
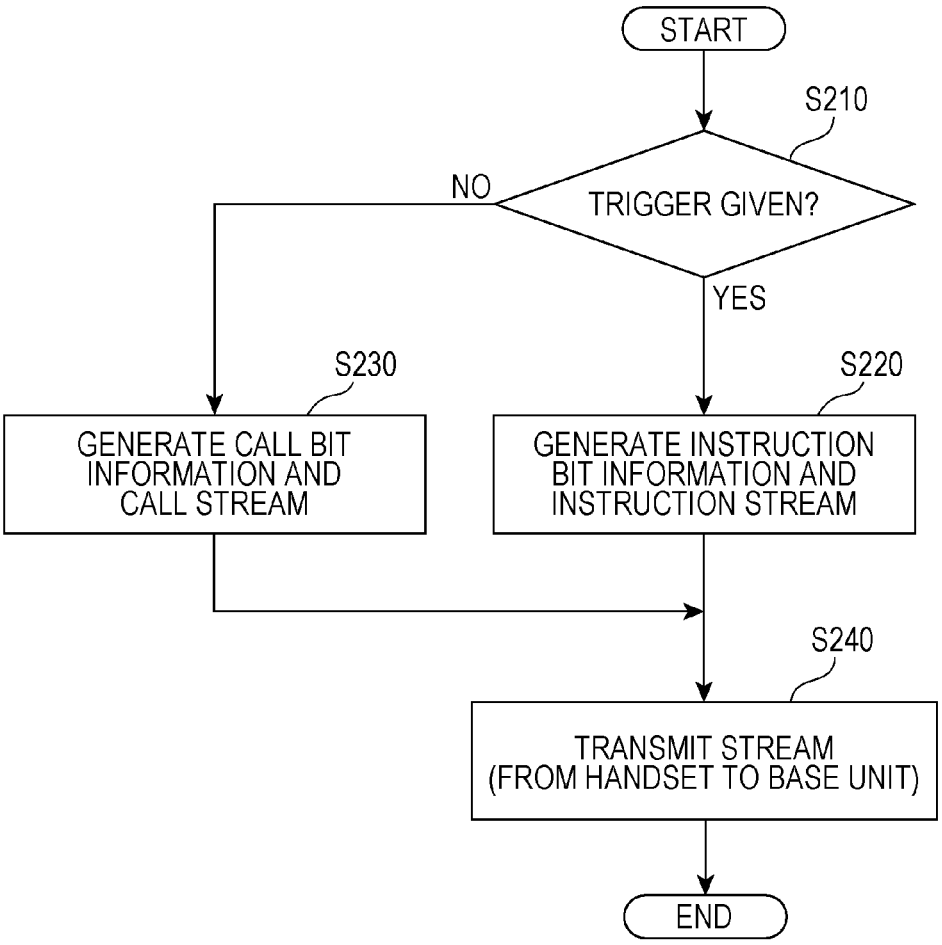
FIG. 3 is a schematic flowchart of an illustrative control method for the cordless telephone device illustrated in FIG. 1 (Embodiment 3)

FIG. 3 is a schematic flowchart of an illustrative control method for the cordless telephone device 100. A control method for the cordless telephone device 100 will be described with reference to FIG. 1 and FIG. 3.

Step S210

In step S210, the user determines whether to give voice instructions to the home electric appliance APL or to have a conversation with an intended party. The user who gives voice instructions to the home electric appliance APL gives a trigger to the handset 300. When the user gives a trigger to the handset 300, step S220 is executed. Otherwise, step S230 is executed.

Step S220

In step S220, the generation unit 320 generates instruction bit information and an instruction stream. Then, step S240 is executed. The generation unit 320 may generate an instruction stream using an audio encoding scheme complying with the DECT standard. The generation unit 320 may generate an instruction stream at a bit rate complying with the DECT standard. In this embodiment, the first generation step is exemplified by step S220.

Step S230

In step S230, the generation unit 320 generates call bit information and a call stream. The generation unit 320 may generate a call stream using an audio encoding scheme complying with the DECT standard. The generation unit 320 may generate a call stream at a bit rate complying with the DECT standard. Unlike the instruction bit information, the call bit information indicates that the audio received by the sound receiving unit 310 is a voice call with the intended party ITP. Unlike the instruction stream, the call stream represents the audio of a conversation with the intended party ITP. After the generation of call bit information and a call stream, step S240 is executed. In this embodiment, the first generation step is exemplified by step S230.

Step S240

In step S240, the stream is output from the generation unit 320 to the transmission unit 330. The instruction bit information and the instruction stream are transmitted from the transmission unit 330 to the base unit 200 through a multiplexing scheme that is common to the call bit information and the call stream.

Embodiment 4

The handset of the cordless telephone device may have a function to generate a trigger signal as to whether or not the user is going to take remote control of a home electric appliance. In Embodiment 4, a description will be given of a cordless telephone device including a handset configured to generate a trigger signal.

Figure 4:
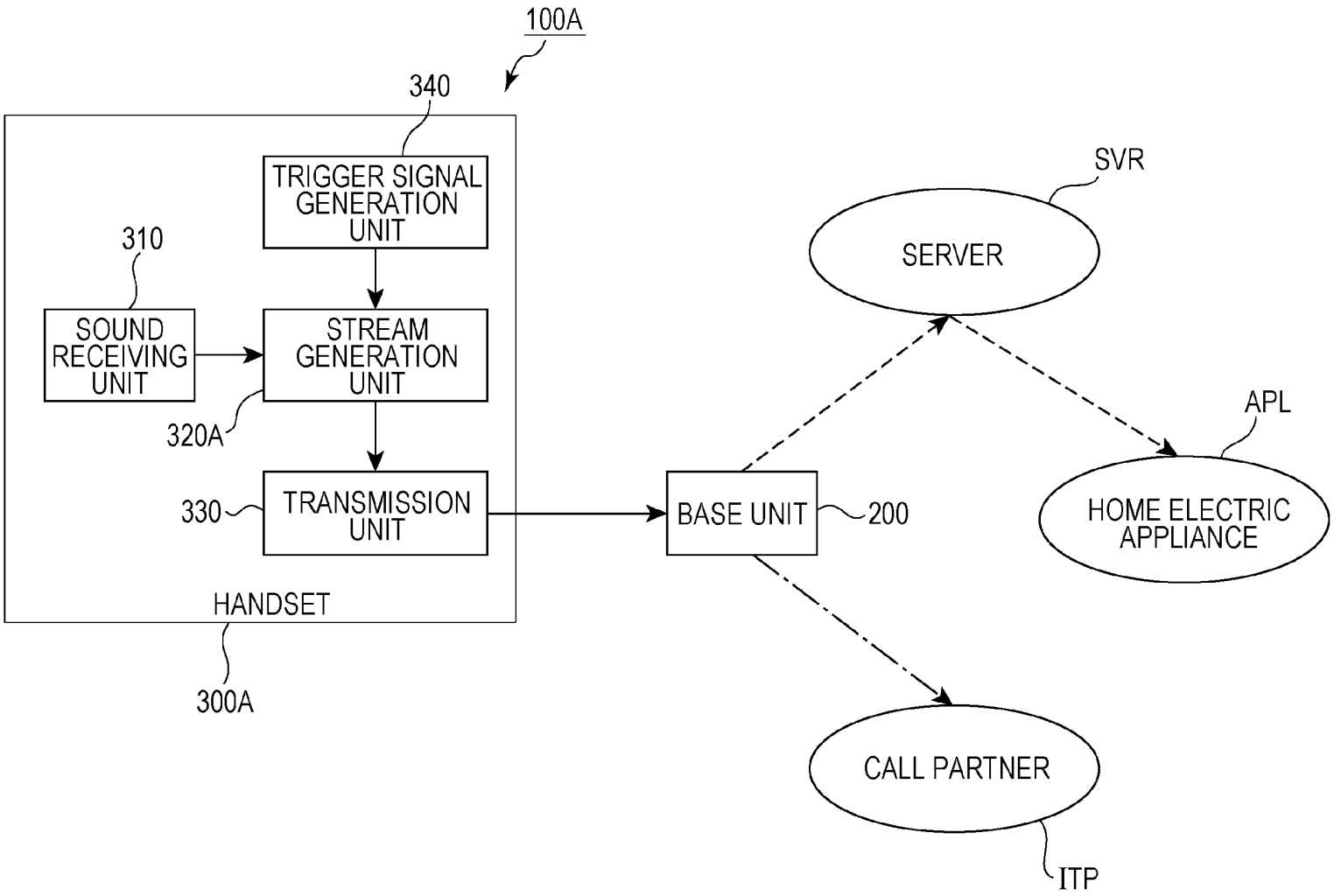
FIG. 4 is a schematic block diagram of a cordless telephone device according to Embodiment 4.

FIG. 4 is a schematic block diagram of a cordless telephone device 100A according to Embodiment 4. The cordless telephone device 100A will be described with reference to FIG. 4. Numerals common to Embodiment 1 and Embodiment 4 designate components having substantially the same function as those in Embodiment 1. These components are thus identified using the description made in Embodiment 1.

The cordless telephone device 100A includes a base unit 200. The base unit 200 is identified using the description made in Embodiment 1.

The cordless telephone device 100A further includes a handset 300A. The handset 300A may selectively generate a pair of instruction bit information and an instruction stream or a pair of call bit information and a call stream in accordance with the technique described in connection with Embodiment 3. The pair of instruction bit information and an instruction stream and the pair of call bit information and a call stream are transmitted from the handset 300A to the base unit 200 through a common multiplexing scheme.

Similarly to Embodiment 1, the handset 300A includes a sound receiving unit 310 and a transmission unit 330. These components are identified using the description made in Embodiment 1.

The handset 300A further includes a stream generation unit 320A and a trigger signal generation unit 340. When the user gives a trigger to the handset 300A, the trigger signal generation unit 340 generates a trigger signal. The trigger signal is output from the trigger signal generation unit 340 to the stream generation unit 320A. The stream generation unit 320A generates instruction bit information in accordance with the trigger signal. After that, the stream generation unit 320A applies an encoding process to the electrical signal received from the sound receiving unit 310 to generate an instruction stream. The instruction bit information and the instruction stream are output from the stream generation unit 320A to the transmission unit 330. In this embodiment, the first generation unit is exemplified by the stream generation unit 320A. The first trigger is exemplified by the trigger signal.

When the stream generation unit 320A does not receive a trigger signal but receives the electrical signal from the sound receiving unit 310, the stream generation unit 320A generates call bit information and a call stream. The call bit information and the call stream are output from the stream generation unit 320A to the transmission unit 330.

The trigger signal generation unit 340 may be an operation button (e.g., a power button) or any other operation portion that appears on a housing (not illustrated) of the handset 300A. In this case, the user who wishes to take remote control of the home electric appliance APL is able to operate the operation portion functioning as the trigger signal generation unit 340 to generate a trigger signal.

The trigger signal generation unit 340 may be an acceleration sensor, an angular velocity sensor, or any other sensor element configured to detect movement given to the handset 300A. In this case, the user who wishes to take remote control of the home electric appliance APL is able to activate the handset 300A to generate a trigger signal.

The trigger signal generation unit 340 may have a function to recognize audio. In this case, the trigger signal generation unit 340 may be electrically connected to the sound receiving unit 310. The trigger signal generation unit 340 may analyze the electrical signal converted from the audio of the user by the sound receiving unit 310, and generate a trigger signal when the electrical signal indicates specific audio.

Embodiment 5

The designer may be able to design various devices on the basis of the design principles of the handset described in connection with Embodiment 4. The designer may design a handset having a shape and function similar to those of the telephone handset of a typical cordless telephone. Alternatively, the designer may design a wearable terminal such as a terminal that looks like a watch or a terminal that looks like a pendant. In Embodiment 5, a description will be given of a handset having a shape and function similar to those of the telephone handset of a typical cordless telephone.

Figure 5:
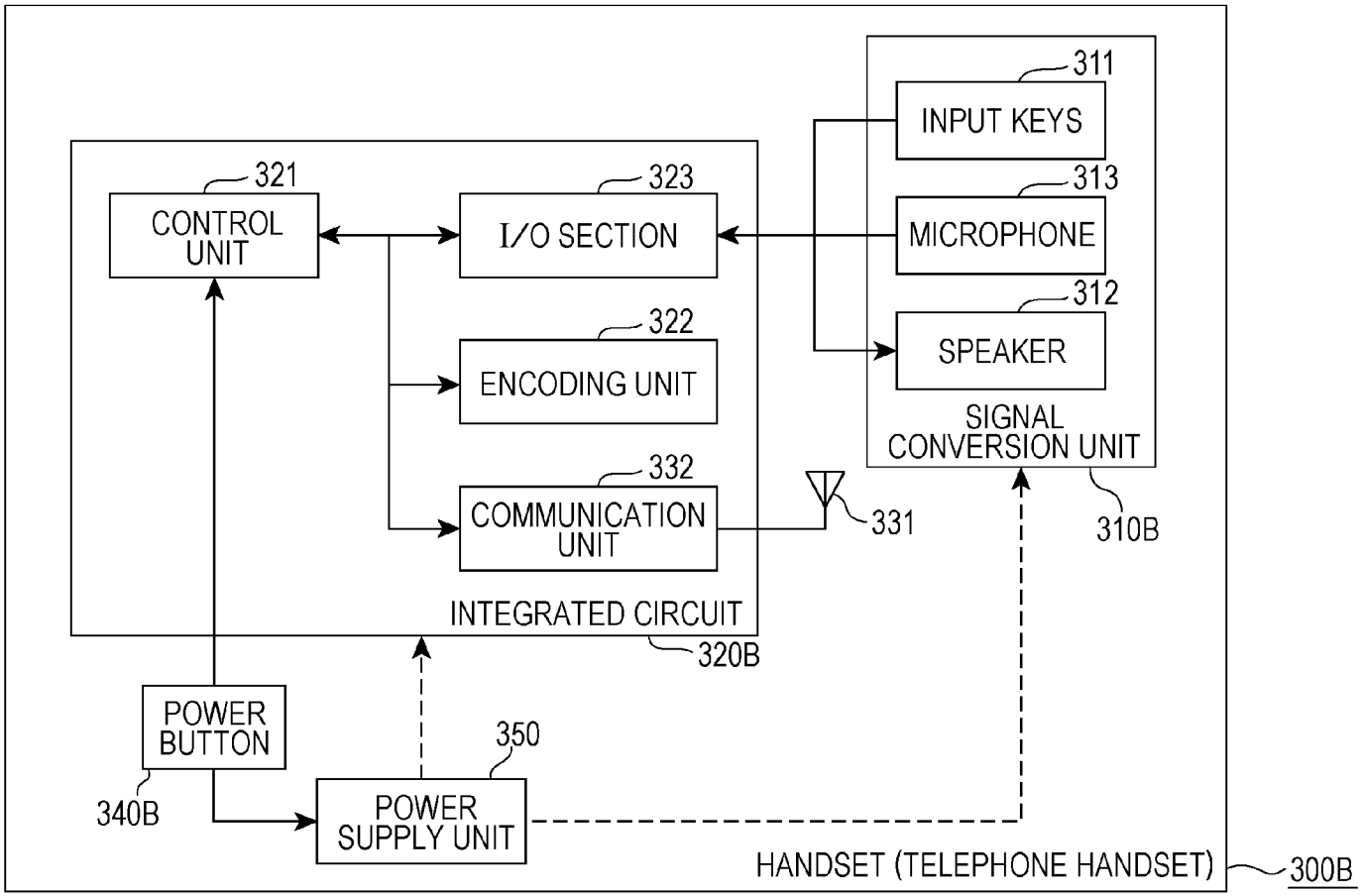
FIG. 5 is a schematic block diagram of a telephone handset according to Embodiment 5.

FIG. 5 is a schematic block diagram of a telephone handset 300B according to Embodiment 5. The telephone handset 300B will be described with reference to FIG. 4 and FIG. 5.

Similarly to the telephone handset of a typical cordless telephone device, the telephone handset 300B has a function to transmit the audio of the user to the base unit as a radio wave, and a function to receive a radio wave representing the audio of the intended party from the base unit and to output the audio of the intended party. In addition to the functions described above, the telephone handset 300B has a function to process audio for the remote control of a home electric appliance.

The telephone handset 300B includes a signal conversion unit 310B, an integrated circuit 320B, an antenna unit 331, a power button 340B, and a power supply unit 350. The user may operate the power button 340B to request supply of power from the power supply unit 350. As a result, power is supplied from the power supply unit 350 to the signal conversion unit 310B and the integrated circuit 320B. After that, the user is able to have a conversation with an intended party or to take remote control of a home electric appliance.

The signal conversion unit 310B includes input keys 311, a speaker 312, and a microphone 313. The input keys 311 may be number keys (or a ten-key pad) of the telephone handset of a typical cordless telephone device. The user may operate the input keys 311 to input the telephone number of the intended party. The input telephone number is output to the integrated circuit 320B as an electrical signal. The integrated circuit 320B processes an electrical signal representing the telephone number, and transmits a radio wave representing the telephone number from the antenna unit 331 to the base unit. The processing of the electrical signal generated by the input keys 311 may be based on a processing technique performed by the telephone handset of a typical cordless telephone device. The basic concept of this embodiment is not limited to a specific process performed on the electrical signal generated by the operation of the input keys 311.

The antenna unit 331 receives the radio wave representing the audio of the intended party. After that, the integrated circuit 320B processes the radio wave, and generates an electrical signal representing the audio of the intended party. After that, the electrical signal is output from the integrated circuit 320B to the speaker 312. The speaker 312 converts the electrical signal from the integrated circuit 320B into audio. As a result, the audio of the intended party is reproduced from the speaker 312. A signal processing technique and reproduction technique for the reproduction of the audio of the intended party may be based on a processing technique performed by the telephone handset of a typical cordless telephone device. The basic concept of this embodiment is not limited to a specific technique for the reproduction of the audio of the intended party.

The microphone 313 converts the audio of the user into an electrical signal. The microphone 313 may have substantially the same structure as a built-in microphone of the telephone handset of a typical cordless telephone device. The basic concept of this embodiment is not limited to a specific structure of the microphone 313. The microphone 313 corresponds to the sound receiving unit 310 described with reference to FIG. 4.

The integrated circuit 320B includes a control unit 321, an encoding unit 322, an input/output (I/O) section 323, and a communication unit 332. The control unit 321 controls the overall operation of the integrated circuit 320B. Accordingly, the encoding unit 322, the I/O section 323, and the communication unit 332 operate under control of the control unit 321.

When the user operates the power button 340B (e.g., when the user presses the power button 340B for a short period of time) while the power supply unit 350 supplies power to the signal conversion unit 310B and the integrated circuit 320B, the trigger signal is output from the power button 340B to the control unit 321. The control unit 321 generates instruction bit information in accordance with the trigger signal. The instruction bit information may include information specifying an audio encoding scheme to be used for the encoding process on the electrical signal generated by the microphone 313. Additionally, the instruction bit information may include information specifying a bit rate to be used for the encoding process on the electrical signal generated by the microphone 313. The instruction bit information is output from the control unit 321 to the encoding unit 322. The power button 340B corresponds to the trigger signal generation unit 340 described with reference to FIG. 4.

After operating the power button 340B, the user inputs voice instructions for the remote control of a home electric appliance to the microphone 313. The microphone 313 converts the voice instructions into an electrical signal. The electrical signal is output from the microphone 313 to the I/O section 323. The I/O section 323 outputs the electrical signal to the encoding unit 322 under control of the control unit 321. The encoding unit 322 may perform an encoding process on the electrical signal in accordance with the audio encoding scheme specified by the instruction bit information, and generate an instruction stream. Additionally, the encoding unit 322 may perform an encoding process on the electrical signal in accordance with the bit rate specified by the instruction bit information, and generate an instruction stream. The control unit 321 and the encoding unit 322 correspond to the stream generation unit 320A described with reference to FIG. 4. In this embodiment, the first instruction stream is exemplified by the instruction stream generated by the encoding unit 322.

The encoding unit 322 outputs the instruction bit information and the instruction stream to the communication unit 332. After that, the communication unit 332 transmits the instruction bit information and the instruction stream to the antenna unit 331. The instruction bit information and the instruction stream are transmitted from the antenna unit 331 to the base unit. The communication unit 332 and the antenna unit 331 correspond to the transmission unit 330 described with reference to FIG. 4.

When the user inputs the telephone number of an intended party using the input keys 311, an electrical signal representing the telephone number is output from the input keys 311 to the I/O section 323. After that, the electrical signal is transferred from the I/O section 323 to the control unit 321. The control unit 321 generates a control signal for establishing communication between the telephone handset 300B and the telephone of the intended party in accordance with the electrical signal from the I/O section 323. After that, the control signal is transmitted from the control unit 321 to the base unit using the antenna unit 331 via the communication unit 332. A technique for generating a control signal to establish communication between the telephone handset 300B and the telephone of the intended party may be similar to a generation technique applicable to the telephone handset of a typical cordless telephone device. This embodiment is not limited to a specific technique for generating a control signal.

When the control unit 321 receives the electrical signal representing the telephone number, the control unit 321 may generate call bit information. Alternatively, when communication is established between the telephone handset 300B and the telephone of the intended party (e.g., when the intended party lifts the receiver off the hook), the control unit 321 may generate call bit information. The basic concept of this embodiment is not limited to a specific timing at which call bit information is generated.

Similarly to the instruction bit information, the call bit information may include information specifying an audio encoding scheme to be used for the encoding process on the electrical signal generated by the microphone 313. Additionally, the call bit information may include information specifying a bit rate to be used for the encoding process on the electrical signal generated by the microphone 313.

The user starts a conversation with the intended party after communication has been established between the telephone handset 300B and the telephone of the intended party. The microphone 313 converts the audio of the user into an electrical signal. The electrical signal is output from the microphone 313 to the I/O section 323. The I/O section 323 outputs the electrical signal to the encoding unit 322 under control of the control unit 321.

The encoding unit 322 may perform an encoding process on the electrical signal in accordance with the audio encoding scheme specified by the call bit information, and generate a call stream. Additionally, the encoding unit 322 may perform an encoding process on the electrical signal in accordance with the bit rate specified by the call bit information, and generate a call stream. In this embodiment, the first call stream is exemplified by the call stream generated by the encoding unit 322.

The encoding unit 322 outputs the call bit information and the call stream to the communication unit 332. After that, the communication unit 332 transmits the call bit information and the call stream from the antenna unit 331. The call bit information and the call stream are transmitted from the antenna unit 331 to the base unit.

Embodiment 6

The telephone handset described in connection with Embodiment 5 is configured to switch the operation mode between a first operation mode used for making a conversation with an intended party and a second operation mode used for taking remote control of a home electric appliance. The telephone handset transmits a call stream and an instruction stream to the base unit through a common multiplexing scheme. This enables the user to switch the operation mode between the first operation mode and the second operation mode while maintaining the communication between the telephone of the intended party and the telephone handset. In Embodiment 6, a description will be given of the switching of the operation mode between the first operation mode and the second operation mode.

Figure 6:
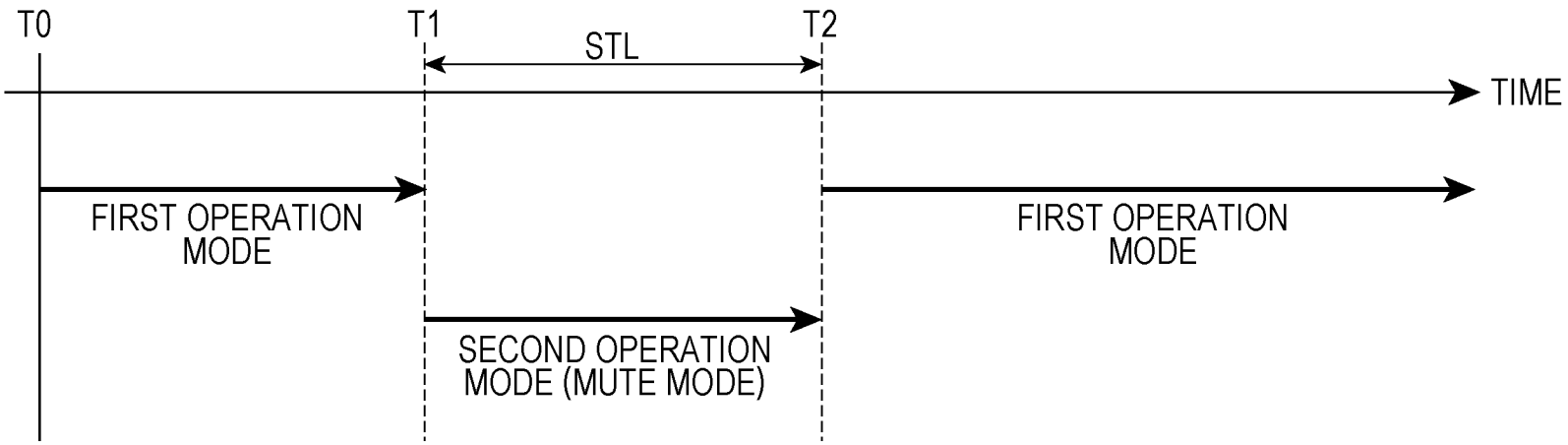
FIG. 6 is a schematic timing chart depicting an illustrative operation of the telephone handset illustrated in FIG. 5 (Embodiment 6)

FIG. 6 is a schematic timing chart depicting an illustrative operation of the telephone handset 300B. The operation of the telephone handset 300B will be described with reference to FIG. 5 and FIG. 6.

At time T0, the user operates the power button 340B to request supply of power from the power supply unit 350. As a result, power is supplied from the power supply unit 350 to the signal conversion unit 310B and the integrated circuit 320B. After that, the user operates the input keys 311 to input the telephone number of the communication partner. As a result, the telephone of the communication partner is called from the telephone handset 300B. When the communication partner takes the receiver off the hook in response to the call, communication is established between the telephone handset 300B and the telephone of the communication partner. After that, the telephone handset 300B operates in the first operation mode. While the telephone handset 300B is operating in the first operation mode, the user has a conversation with the intended party. In this embodiment, the call mode is exemplified by the first operation mode.

At time T1 subsequent to the time T0, the user presses the power button 340B for a short period of time. As a result, a trigger signal is output from the power button 340B to the control unit 321. Accordingly, the control unit 321 receives the trigger signal while the encoding unit 322 is performing a process for generating a call stream. The control unit 321 generates instruction bit information in accordance with the trigger signal. The instruction bit information is output from the control unit 321 to the encoding unit 322. After that, the encoding unit 322 starts an encoding process for generating an instruction stream. As a result, the operation mode of the telephone handset 300B is switched from the first operation mode to the second operation mode.

While the telephone handset 300B is operating in the second operation mode, the control unit 321 generates a request signal for requesting that the audio represented by the instruction stream (that is, voice instructions) not be transferred to the telephone of the intended party. The request signal is transmitted from the control unit 321 to the base unit via the communication unit 332 and the antenna unit 331. The request signal may be transferred from the control unit 321 to the base unit through the multiplexing scheme used for the transmission of the instruction stream and the call stream. As a result of the transmission of the request signal, the telephone handset 300B can operate in a mute mode for the telephone of the intended party.

After the generation of the request signal, the control unit 321 may generate an alternative stream representing an alternative sound that replaces the audio of the user. The alternative stream is transmitted from the control unit 321 to the base unit via the communication unit 332 and the antenna unit 331. The alternative stream may be transferred from the control unit 321 to the base unit through the multiplexing scheme used for the transmission of the instruction stream and the call stream.

At time T2 subsequent to the time T1, the user presses the power button 340B for a short period of time, and requests to return to the first operation mode. As a result, a new trigger signal is output from the power button 340B to the control unit 321. Accordingly, the control unit 321 receives the new trigger signal while the encoding unit 322 is performing a process for generating an instruction stream. The control unit 321 generates call bit information in accordance with the new trigger signal. The second operation mode (mute mode) ends in synchronization with the generation of the call bit information, and the operation mode of the telephone handset 300B is switched from the second operation mode to the first operation mode. In this embodiment, the second trigger is exemplified by the trigger signal.

The call bit information is output from the control unit 321 to the encoding unit 322. The encoding unit 322 starts an encoding process for generating a call stream in accordance with the call bit information.

Embodiment 7

Unlike the period of conversation with the intended party, a period required to input voice instructions for remote control of a home electric appliance does not largely vary in length. Accordingly, a fixed period of time may be assigned to the second operation mode. In this case, the designer may design a telephone handset so that the second operation mode is automatically terminated. In Embodiment 7, a description will be given of a telephone handset configured to automatically terminate the second operation mode.

Figure 7:
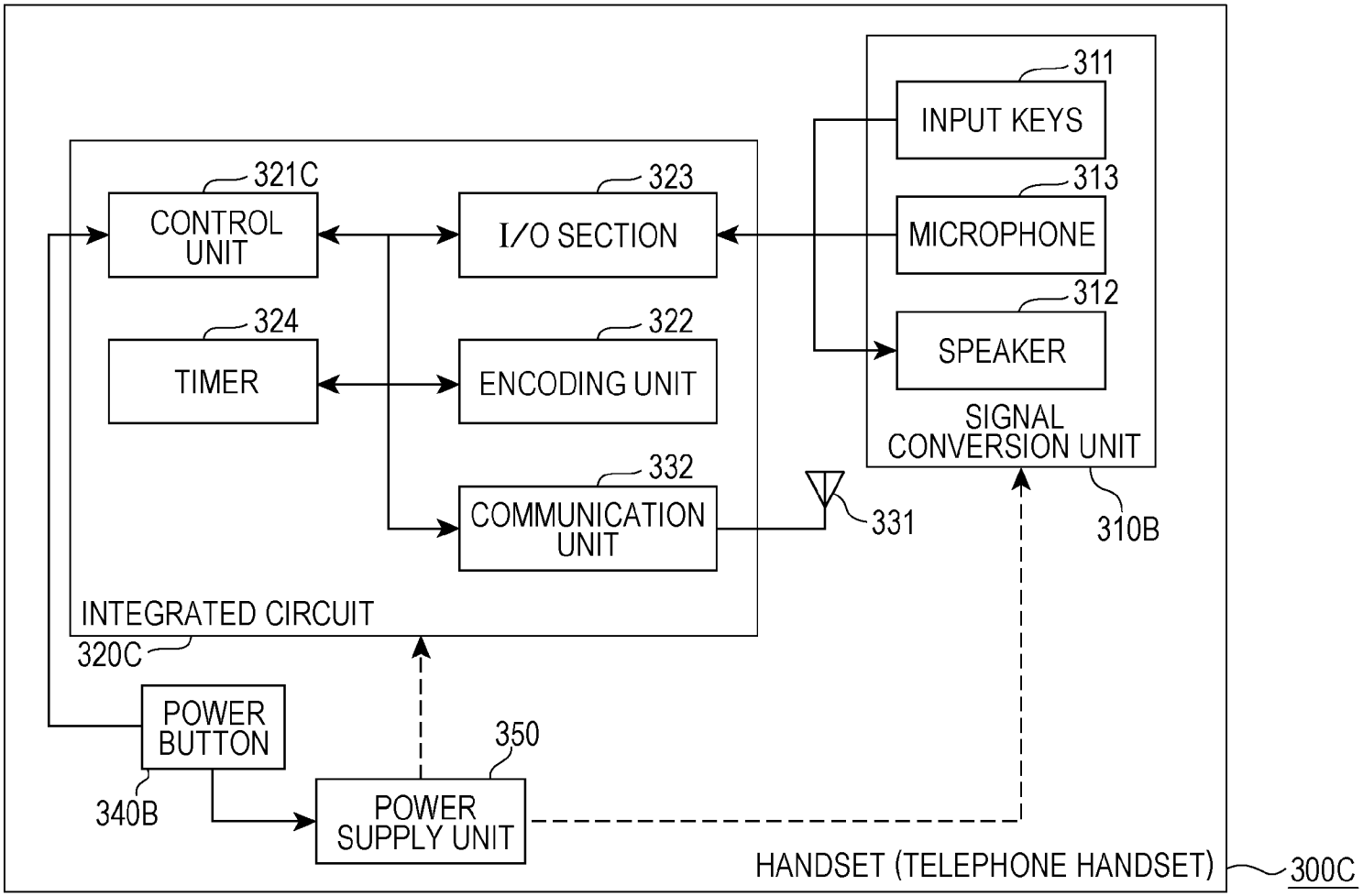
FIG. 7 is a schematic block diagram of a telephone handset according to Embodiment 7.

FIG. 7 is a schematic block diagram of a telephone handset 300C according to Embodiment 7. The telephone handset 300C will be described with reference to FIG. 6 and FIG. 7. Numerals common to Embodiment 5 and Embodiment 7 designate components having substantially the same function as those in Embodiment 5. Thus, these components are identified using the description made in Embodiment 5.

Similarly to Embodiment 5, the telephone handset 300C includes a signal conversion unit 310B, an antenna unit 331, a power button 340B, and a power supply unit 350. These components are identified using the description made in Embodiment 5.

The telephone handset 300C further includes an integrated circuit 320C. Similarly to Embodiment 5, the telephone handset 300C performs processing for a signal to be output to the signal conversion unit 310B, processing for a signal received from the signal conversion unit 310B, processing for signals (bit information and stream) output via the antenna unit 331, and processing for a signal received via the antenna unit 331. Thus, the description made on the signal processing in connection with Embodiment 5 is used to indicate the integrated circuit 320C.

Similarly to Embodiment 5, the integrated circuit 320C includes an encoding unit 322, an I/O section 323, and a communication unit 332. These components are identified using the description made in Embodiment 5.

The integrated circuit 320C further includes a control unit 321C and a timer 324. The control unit 321C controls the overall operation of the integrated circuit 320C. Accordingly, the encoding unit 322, the I/O section 323, the timer 324, and the communication unit 332 operate under control of the control unit 321C.

As described in connection with Embodiment 6, the user operates the power button 340B at the time T1. As a result, the operation mode of the telephone handset 300C is switched from the first operation mode to the second operation mode. A predetermined setting period STL is set in the timer 324. The setting period STL has a length sufficient for the user to give voice instructions to a home electric appliance.

The telephone handset 300C operates in the second operation mode (mute mode) until the setting period STL has elapsed since the time T1. At the time T2 after the setting period STL has elapsed since the time T1, the timer 324 generates a notification signal for sending a notification of the completion of the setting period STL. The notification signal is output from the timer 324 to the control unit 321C.

The control unit 321C generates call bit information in accordance with the notification signal. The second operation mode (mute mode) ends in synchronization with the generation of the call bit information, and the operation mode of the telephone handset 300C is switched from the second operation mode to the first operation mode. The call bit information is output from the control unit 321C to the encoding unit 322. The encoding unit 322 starts an encoding process for generating a call stream in accordance with the call bit information.

Embodiment 8

The techniques described in connection with the various embodiments described above may be suitable for use in a control system for controlling a home electric appliance. In Embodiment 8, a description will be given of an illustrative control system.

Figure 8:
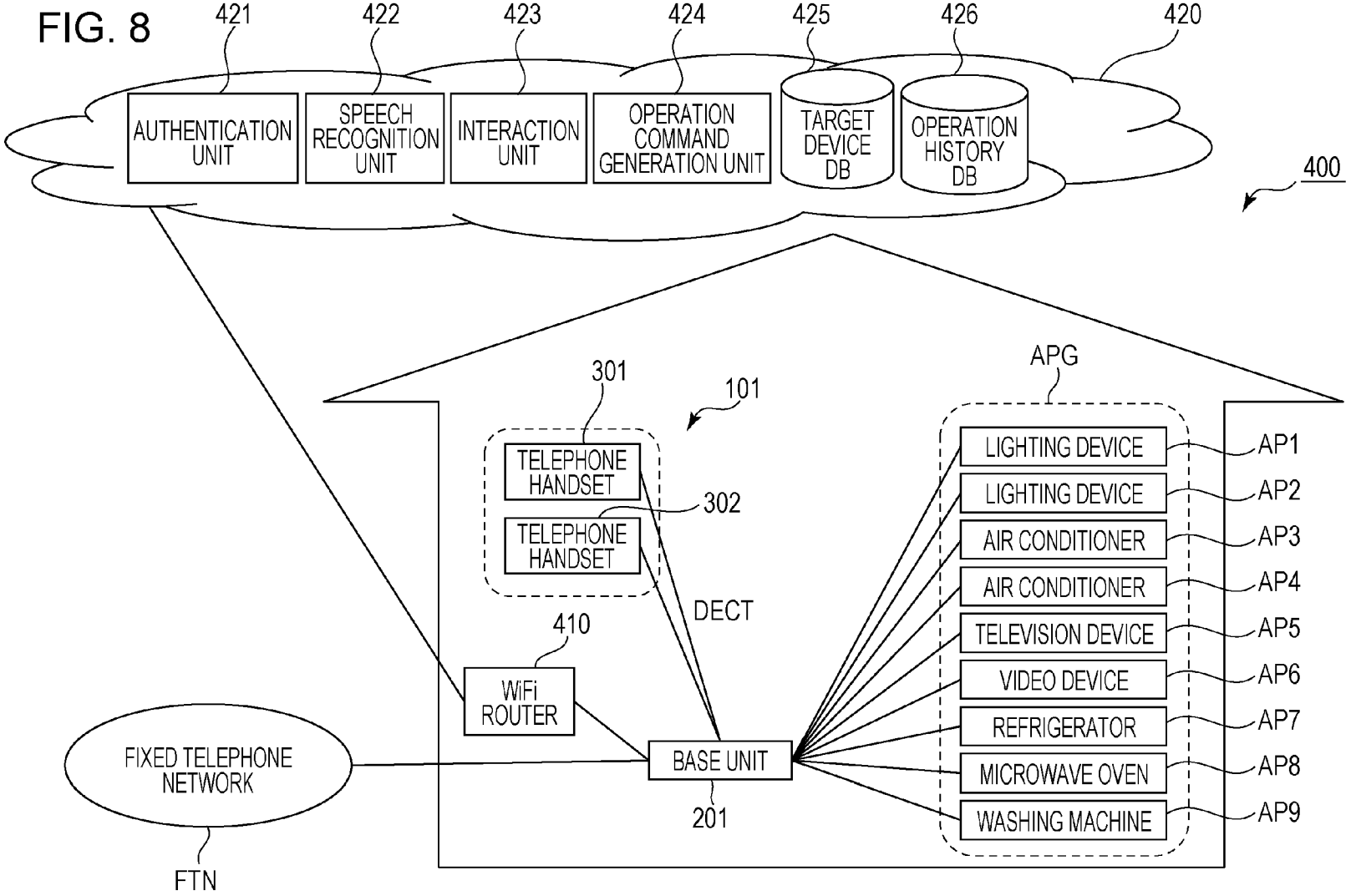
FIG. 8 is a conceptual diagram of a control system according to Embodiment 8.

FIG. 8 is a conceptual diagram of a control system 400 according to Embodiment 8. The control system 400 will be described with reference to FIG. 1, FIG. 4, and FIG. 5 to FIG. 8.

The control system 400 includes a cordless telephone device 101, a wireless fidelity (WiFi) router 410, and a cloud server 420. The cordless telephone device 101 corresponds to the cordless telephone device 100 described with reference to FIG. 1.

The cordless telephone device 101 includes a base unit 201 and two telephone handsets 301 and 302. Each of the telephone handsets 301 and 302 may be designed on the basis of the design principles of the telephone handsets 300B and 300C described with reference to FIG. 5 and FIG. 7.

The call bit information, the call stream, the instruction bit information, and the instruction stream are transmitted from each of the telephone handsets 301 and 302 to the base unit 201 using a TDD-TDMA scheme complying with the DECT standard. The base unit 201 has not only the function of a base unit of a typical cordless telephone device but also the function of a home gateway. Accordingly, the base unit 201 is connected not only to a fixed telephone network FTN (a telephone network used for public fixed telephone services) but also to the WiFi router 410 and a home electric appliance group APG including various home electric appliances.

The home electric appliance group APG includes a plurality of home electric appliances to be subject to remote control in accordance with voice instructions of the user. In this embodiment, the home electric appliance group APG includes two lighting devices AP1 and AP2, two air conditioners AP3 and AP4, a television device AP5, a video device AP6, a refrigerator AP7, a microwave oven AP8, and a washing machine AP9. The home electric appliance group APG may include other home electric appliances. The basic concept of this embodiment is not limited by the home electric appliance group APG.

The WiFi router 410 is connected to the base unit 201 so that the WiFi router 410 can communicate with the base unit 201 via Ethernet, whereas the WiFi router 410 is connected to the cloud server 420 so that the WiFi router 410 can communicate with the cloud server 420 via the Internet line. While one of the telephone handsets 301 and 302 is operating in the first operation mode (see FIG. 6), the call bit information and the call stream are transmitted from the one of the telephone handsets 301 and 302 to the base unit 201. The base unit 201 refers to the call bit information, and determines that the call stream is sent to the intended party via the fixed telephone network. When one of the telephone handsets 301 and 302 is operating in the second operation mode (see FIG. 6), the instruction bit information and the instruction stream are transmitted from the one of the telephone handsets 301 and 302 to the base unit 201. The base unit 201 refers to the instruction bit information, and determines that the instruction stream is sent to the cloud server 420 via the WiFi router 410 and the Internet line.

The cloud server 420 includes an authentication unit 421, a speech recognition unit 422, an interaction unit 423, an operation command generation unit 424, a target device database 425, and an operation history database 426. The cloud server 420 stores in advance information concerning the cordless telephone device 101. When the cloud server 420 receives an instruction stream, the authentication unit 421 determines whether or not the instruction stream is an instruction stream transmitted from an authorized cordless telephone device. This may prevent or at least reduce occurrence of unauthorized remote control of the home electric appliance group APG.

After that, the speech recognition unit 422 decodes the instruction stream, and analyzes the voice instructions from the user. The target device database 425 stores in advance information concerning the lighting devices AP1 and AP2, the air conditioners AP3 and AP4, the television device AP5, the video device AP6, the refrigerator AP7, the microwave oven AP8, and the washing machine AP9. The speech recognition unit 422 searches the target device database 425 for a home electric appliance specified by the voice instructions. The speech recognition unit 422 also searches for the content of the operation demanded by the user from the voice instructions.

If the voice instructions of the user are not clear, the speech recognition unit 422 may activate the interaction unit 423. For example, if the speech recognition unit 422 determines "start" as an operation but is not capable of determining a home electric appliance to be started to operate, the speech recognition unit 422 may cause the interaction unit 423 to generate message data representing the message, "Which home electric appliance would you like to start?" The message data is transferred to the telephone handset (one of the telephone handsets 301 and 302) that the user is using, via the Internet line, the WiFi router 410, and the base unit 201. As a result, a message sound corresponding to "Which home electric appliance would you like to start?" is output from the speaker 312 (see FIG. 5 or FIG. 7). Then, the user inputs voice instructions to specify a home electric appliance via the microphone 313, allowing the speech recognition unit 422 to appropriately understand the content of the remote control demanded by the user.

The user may operate the telephone handset 301 or 302 to submit a request for interactive input to the cloud server 420. Also in this case, the speech recognition unit 422 can appropriately understand the voice instructions of the user in cooperation with the interaction unit 423.

The speech recognition unit 422 outputs the result of the speech recognition process described above to the operation command generation unit 424. The operation command generation unit 424 generates an operation command in accordance with the result of the speech recognition process.

The operation command generation unit 424 may refer to the operation history database 426 to generate an operation command. When the user operates a home electric appliance in the home electric appliance group APG, the content of the operation performed on the home electric appliance is delivered from the home electric appliance which has been operated to the cloud server 420 via the base unit 201, the WiFi router 410, and the Internet line. Consequently, the content of the operation can be stored in the operation history database 426. The operation command generated by the operation command generation unit 424 may be output to the operation history database 426. Consequently, the content of the operation can be stored in the operation history database 426.

In a case where the result of the speech recognition process indicates that "the user wishes to operate the air conditioner AP3 at a set temperature of 28° C.", the operation command generation unit 424 may refer to the operation history database 426 to determine whether or not the air conditioner AP3 is in operation. If the air conditioner AP3 is in operation, the operation command generation unit 424 generates an operation command for setting the temperature of the air conditioner AP3 to 28° C. If the air conditioner AP3 is not in operation, the operation command generation unit 424 generates an operation command for bringing the air conditioner AP3 into operation, and an operation command for setting the temperature of the air conditioner AP3 to 28° C.

The operation command or commands are output from the operation command generation unit 424 to the WiFi router 410. After that, the operation command or commands are output from the WiFi router 410 to the home electric appliance specified in the voice instructions of the user via the base unit 201. Upon receipt of the operation command, the home electric appliance executes the operation specified in the voice instructions of the user.

Embodiment 9

The operation mode of the telephone handset described in connection with Embodiments 5 to 7 may be switched with a simple operation of the telephone handset. This may cause a person having no sufficient knowledge about appropriate remote control of a home electric appliance (e.g., a young child) to operate a home electric appliance by accident.

The designer may be able to design a handset connected to the base unit so that the handset and the base unit can communicate with each other, as a wearable terminal on the basis of the principles in the various embodiments described above. In this case, the wearable terminal may be removed from the body of the user. If the user leaves the wearable terminal after removing it from their body, someone may find the wearable terminal and pick it up. If a third party operates the wearable terminal, a home electric appliance may perform an unwanted operation.

To address the problem described above, it is desirable that a handset connected to the base unit so that the handset and the base unit can communicate with each other be operated only by an authorized user. In Embodiment 9, a description will be given of a wearable terminal having an authentication function to verify authenticity of a user.

Figure 9:
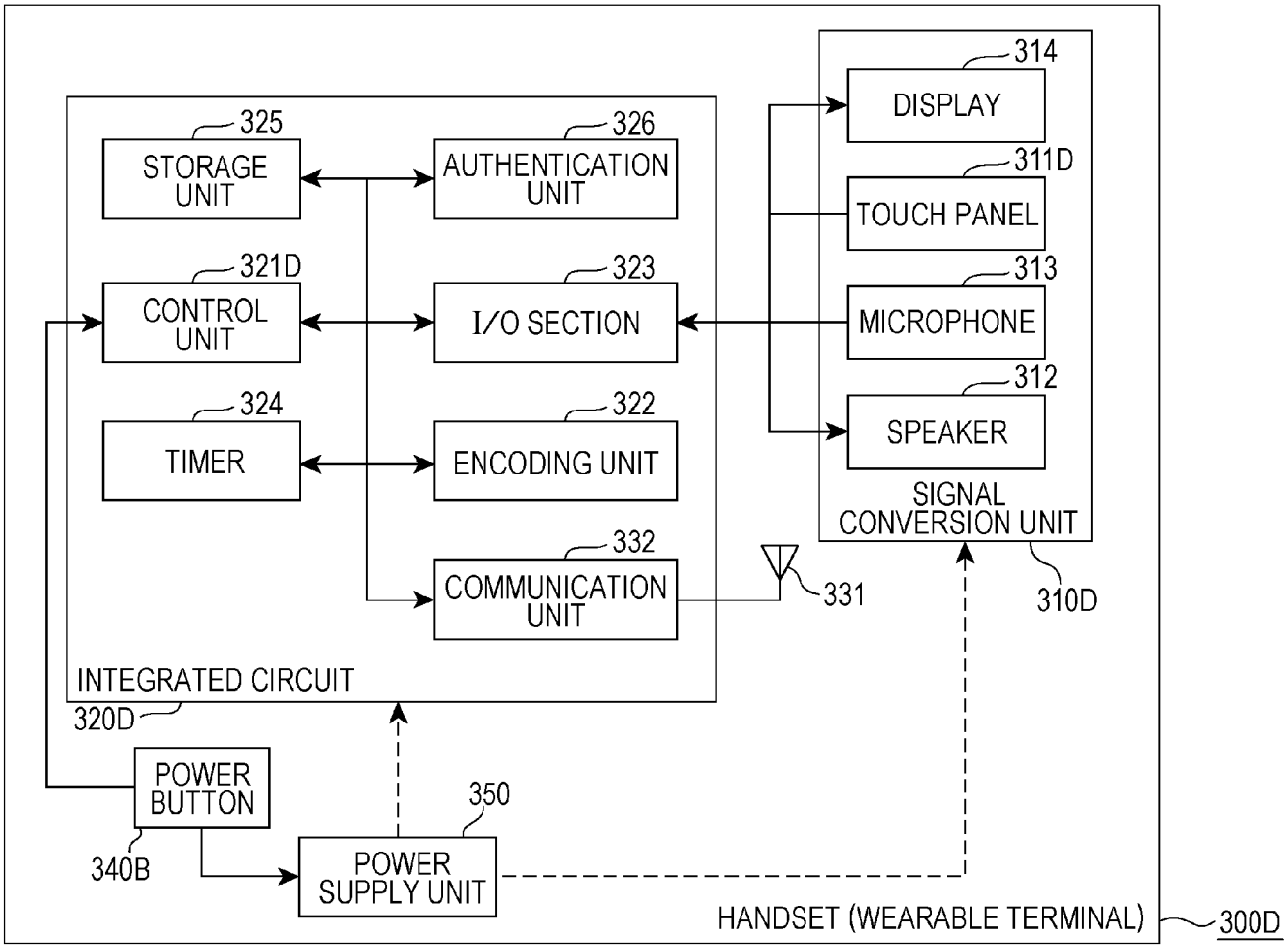
FIG. 9 is a schematic block diagram of a wearable terminal according to Embodiment 9.

FIG. 9 is a schematic block diagram of a wearable terminal 300D according to Embodiment 9. The wearable terminal 300D will be described with reference to FIG. 9. Numerals common to Embodiment 7 and Embodiment 9 designate components having substantially the same function as those in Embodiment 7. Thus, these components are identified using the description made in Embodiment 7.

The designer may design the wearable terminal 300D so that the wearable terminal 300D is wearable on a user's wrist. In this case, the designer may determine the design of the wearable terminal 300D so that the wearable terminal 300D looks like a watch or a bangle. The designer may design the wearable terminal 300D so that the wearable terminal 300D is wearable on a user's finger. In this case, the designer may determine the design of the wearable terminal 300D so that the wearable terminal 300D looks like a ring. The designer may design the wearable terminal 300D so that the wearable terminal 300D can hang from the user's neck. In this case, the designer may determine the design of the wearable terminal 300D so that the wearable terminal 300D looks like a pendant or a necklace. The basic concept of this embodiment is not limited to a specific position at which the wearable terminal 300D is worn or a specific design of the wearable terminal 300D.

Similarly to Embodiment 7, the wearable terminal 300D includes an antenna unit 331, a power button 340B, and a power supply unit 350. These components are identified using the description made in Embodiment 7.

The wearable terminal 300D further includes a signal conversion unit 310D and an integrated circuit 320D. Similarly to Embodiment 7, the integrated circuit 320D is responsible for various forms of signal processing such as signal processing for establishing a connection with the telephone of the intended party, signal processing for switching the operation mode between the first operation mode and the second operation mode, and signal processing for generating bit information and streams. The signal processing technique described in connection with Embodiment 7 is applied to the integrated circuit 320D.

The signal conversion unit 310D converts the signal output from the integrated circuit 320D into audio or an image. Additionally, the signal conversion unit 310D converts the operation or audio of the user into an electrical signal.

Similarly to Embodiment 7, the signal conversion unit 310D includes a microphone 313 and a speaker 312. These components are identified using the description made in Embodiment 7.

The speaker 312 and the microphone 313 may be replaced by a device (e.g., a headphone, a Bluetooth (registered trademark) hands-free microphone, or a Bluetooth (registered trademark) headset) different from the wearable terminal 300D. Thus, the speaker 312 and the microphone 313 may be removed from the signal conversion unit 310D.

The signal conversion unit 310D further includes a touch panel 311D and a display 314. The user may operate the touch panel 311D to input the telephone number of the intended party. The input telephone number is output to the integrated circuit 320D as an electrical signal. The integrated circuit 320D processes the electrical signal representing the telephone number, and transmits a radio wave representing the telephone number from the antenna unit 331 to the base unit.

The display 314 displays various images in accordance with signals from the integrated circuit 320D. When the user operates the touch panel 311D and inputs the telephone number of the intended party, the integrated circuit 320D may generate image data representing the input number. The image data is output from the integrated circuit 320D to the display 314. The display 314 displays the numbers input to the touch panel 311D by the user, in accordance with the image data. This enables the user to visually check whether or not the input telephone number is correct.

Similarly to Embodiment 7, the integrated circuit 320D includes an encoding unit 322, an I/O section 323, a timer 324, and a communication unit 332. These components are identified using the description made in Embodiment 7.

The integrated circuit 320D further includes a control unit 321D, a storage unit 325, and an authentication unit 326. The control unit 321D executes overall control related to data processing in the integrated circuit 320D. Accordingly, the I/O section 323, the timer 324, the storage unit 325, the authentication unit 326, the encoding unit 322, and the communication unit 332 operate under control of the control unit 321D.

The control unit 321D may generate image data for requesting the user to enter a password. The image data is output from the control unit 321D to the display 314 via the I/O section 323. As a result, the display 314 displays an image for requesting the user to enter a password.

In response to the password request image on the display 314, the user operates the touch panel 311D and enters a password. Authentication information indicating the entered password is output from the touch panel 311D to the I/O section 323. The I/O section 323 outputs the authentication information to the authentication unit 326 under control of the control unit 321D.

The storage unit 325 stores a password preset by the user. Upon receipt of the authentication information, the authentication unit 326 reads the password from the storage unit 325. After that, the authentication unit 326 compares the authentication information with the read password.

If the authentication information matches the read password, the authentication unit 326 notifies the control unit 321D of successful completion of the authentication. After that, the control unit 321D may generate image data indicating that the authentication has been successfully completed. The image data is output from the control unit 321D to the display 314 via the I/O section 323. As a result, the display 314 displays an image indicating successful completion of the authentication process.

If the authentication information does not match the read password, the authentication unit 326 notifies the control unit 321D that the authentication has failed. After that, the control unit 321D may generate image data for prompting the user to re-enter a password and/or prompting interruption of authentication. The image data is output from the control unit 321D to the display 314 via the I/O section 323. As a result, the display 314 displays an image for prompting the user to re-enter a password and/or prompting interruption of authentication. In response to the displayed image, the user operates the touch panel 311D and re-enters a password. Alternatively, in response to the displayed image, the user operates the touch panel 311D and requests the wearable terminal 300D to interrupt the authentication process. The request for the interruption of the authentication process, which is input via the touch panel 311D, is output from the touch panel 311D to the control unit 321D via the I/O section 323. Upon receipt of the request for the interruption of the authentication process, the control unit 321D may cause the I/O section 323 to interrupt the electrical signal from the microphone 313. This may prevent remote control by a person who does not know the password.

In the case of successful completion of the authentication process, the result of the authentication may be held until the wearable terminal 300D is removed. Alternatively, the authentication process described above may be executed each time the wearable terminal 300D is operated. Further alternatively, the authentication process described above may be executed at other timing. The basic concept of this embodiment is not limited to specific timing at which the authentication process is executed.

Embodiment 10

The technique described in connection with Embodiment 9 may be suitable for use in a control system for controlling a home electric appliance. In Embodiment 10, a description will be given of an illustrative control system.

Figure 10:
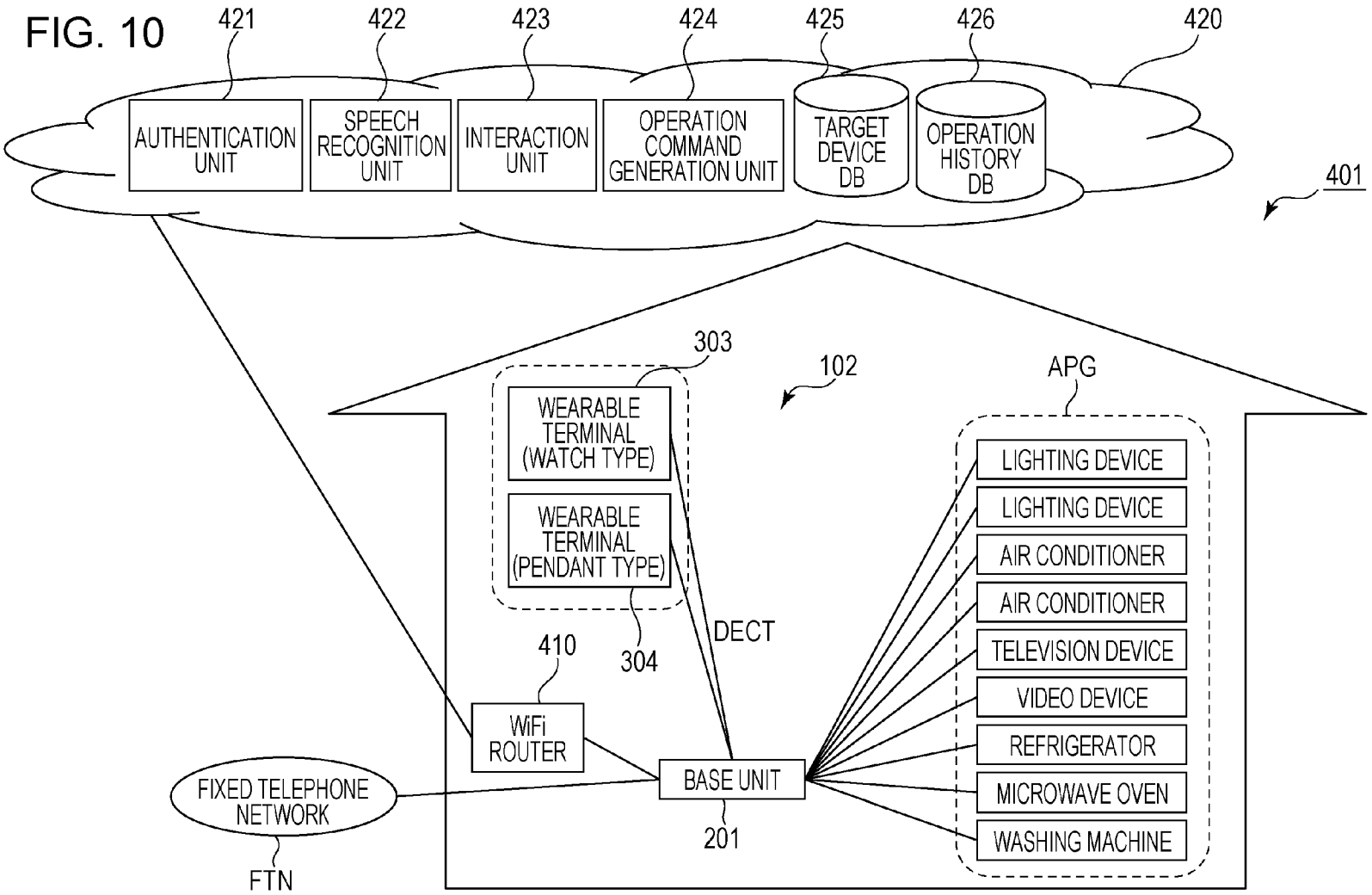
FIG. 10 is a conceptual diagram of a control system according to Embodiment 10.

FIG. 10 is a conceptual diagram of a control system 401 according to Embodiment 10. The control system 401 will be described with reference to FIG. 1, FIG. 6, FIG. 9, and FIG. 10. Numerals common to Embodiment 8 and Embodiment 10 designate components having substantially the same function as those in Embodiment 8. Thus, these components are identified using the description made in Embodiment 8.

Similarly to Embodiment 8, the control system 401 includes a WiFi router 410 and a cloud server 420. These components are identified using the description made in Embodiment 8.

The control system 401 further includes a cordless telephone device 102. The cordless telephone device 102 corresponds to the cordless telephone device 100 described with reference to FIG. 1.

The cordless telephone device 102 includes a base unit 201 and two wearable terminals 303 and 304. The wearable terminals 303 and 304 may be each designed on the basis of the design principles of the wearable terminal 300D described with reference to FIG. 9.

The wearable terminal 303 is wearable on a user's wrist. The wearable terminal 303 may look like a watch.

The wearable terminal 304 is designed to hang from the user's neck. The wearable terminal 304 may look like a pendant.

The call bit information, the call stream, the instruction bit information, and the instruction stream are transmitted from each of the wearable terminals 303 and 304 to the base unit 201 using a TDD-TDMA scheme complying with the DECT standard. When one of the wearable terminals 303 and 304 is operating in the first operation mode (see FIG. 6), the call bit information and the call stream are transmitted from the one of the wearable terminals 303 and 304 to the base unit 201. The base unit 201 refers to the call bit information, and determines that the call stream is sent to the intended party via a fixed telephone network. When one of the wearable terminals 303 and 304 is operating in the second operation mode (see FIG. 6), the instruction bit information and the instruction stream are transmitted from the one of the wearable terminals 303 and 304 to the base unit 201. The base unit 201 refers to the instruction bit information, and determines that the instruction stream is sent to the cloud server 420 via the WiFi router 410 and the Internet line. This enables the user to selectively take remote control of the home electric appliance group APG or make a conversation with the intended party by using the wearable terminals 303 and 304.

Embodiment 11

A control system may include a smartphone. In Embodiment 11, a description will be given of an illustrative control system including a smartphone.

Figure 11:
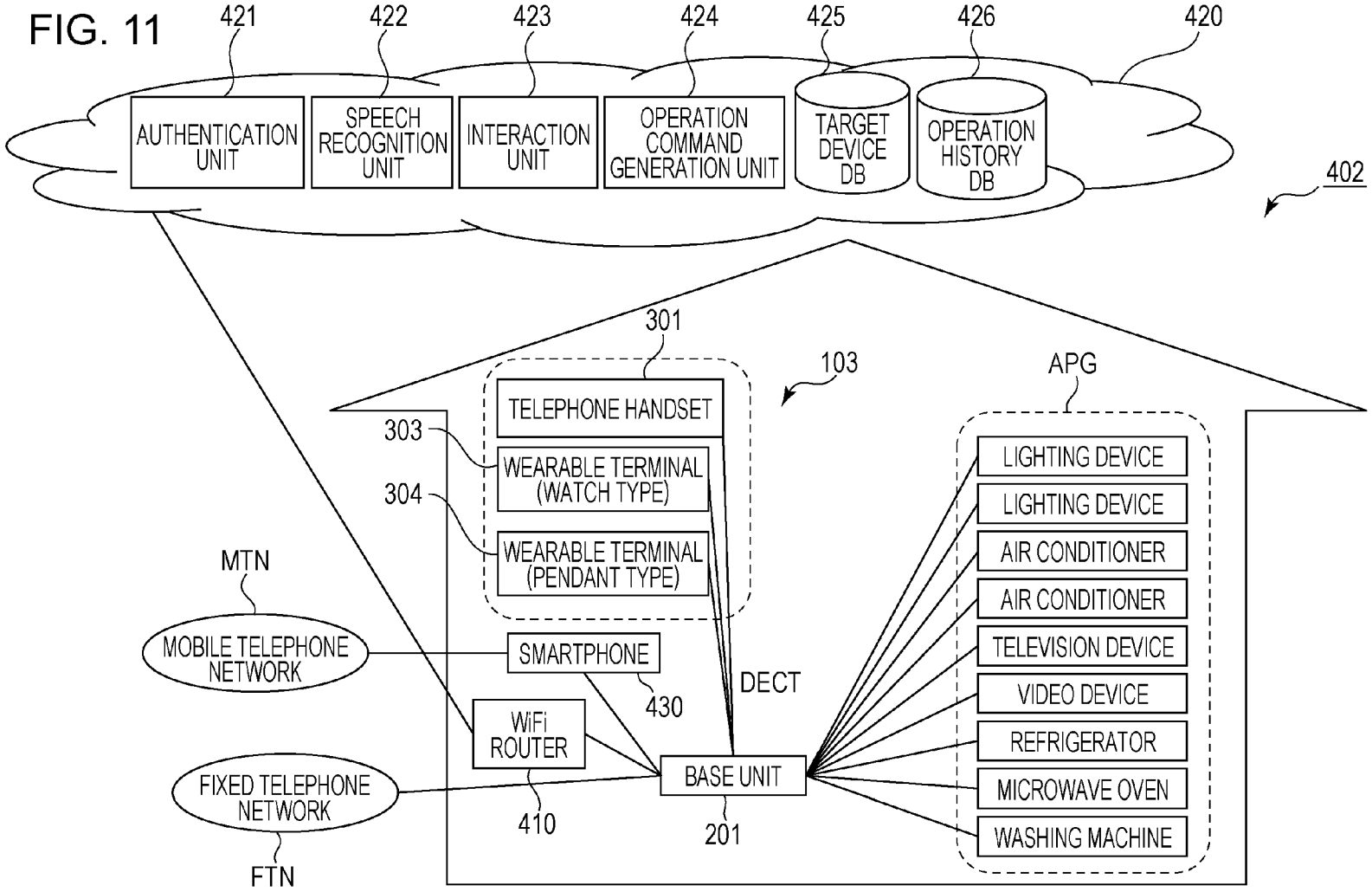
FIG. 11 is a conceptual diagram of a control system according to Embodiment 11.

FIG. 11 is a conceptual diagram of a control system 402 according to Embodiment 11. The control system 402 will be described with reference to FIG. 1 and FIG. 11. Numerals common to Embodiment 8, Embodiment 10, and Embodiment 11 designate components having substantially the same function as those in Embodiment 8 and/or Embodiment 10. Thus, these components are identified using the description made in Embodiment 8 and/or Embodiment 10.

Similarly to Embodiment 10, the control system 402 includes a WiFi router 410 and a cloud server 420. These components are identified using the description made in Embodiment 10.

The control system 402 further includes a cordless telephone device 103 and a smartphone 430. The cordless telephone device 103 corresponds to the cordless telephone device 100 described with reference to FIG. 1.

The cordless telephone device 103 includes a base unit 201, a telephone handset 301, and two wearable terminals 303 and 304. The base unit 201 and the telephone handset 301 are identified using the description made in Embodiment 8. The wearable terminals 303 and 304 are identified using the description made in Embodiment 10. Accordingly, the call bit information, the call stream, the instruction bit information, and the instruction stream are transmitted from each of the telephone handset 301 and the wearable terminals 303 and 304 to the base unit 201 using a TDD-TDMA scheme complying with the DECT standard.

The smartphone 430 is connected to the base unit 201 using WiFi communication technology. Additionally, the smartphone 430 is connected to a mobile telephone network MTN. The communication connection between the smartphone 430 and the mobile telephone network MTN may be based on wideband access technology such as long term evolution (LTE) or wideband code division multiple access (W-CDMA).

When the smartphone 430 receives an incoming call from the intended party, a notification signal indicating the incoming call to the smartphone 430 is sent to the wearable terminals 303 and 304 via the base unit 201. The user is able to answer the communication partner using one of the smartphone 430 and the wearable terminals 303 and 304. If the smartphone 430 is in a user's bag, the user is also able to answer the intended party using the wearable terminal 303 or 304 without taking the smartphone 430 out of the bag.

Embodiment 12

It will be convenient for a user who is familiar with a smartphone if a control system permits the user to operate the smartphone to control a home electric appliance. In Embodiment 12, a description will be given of an illustrative control system that permits a user to operate a smartphone to control a home electric appliance.

Figure 12:
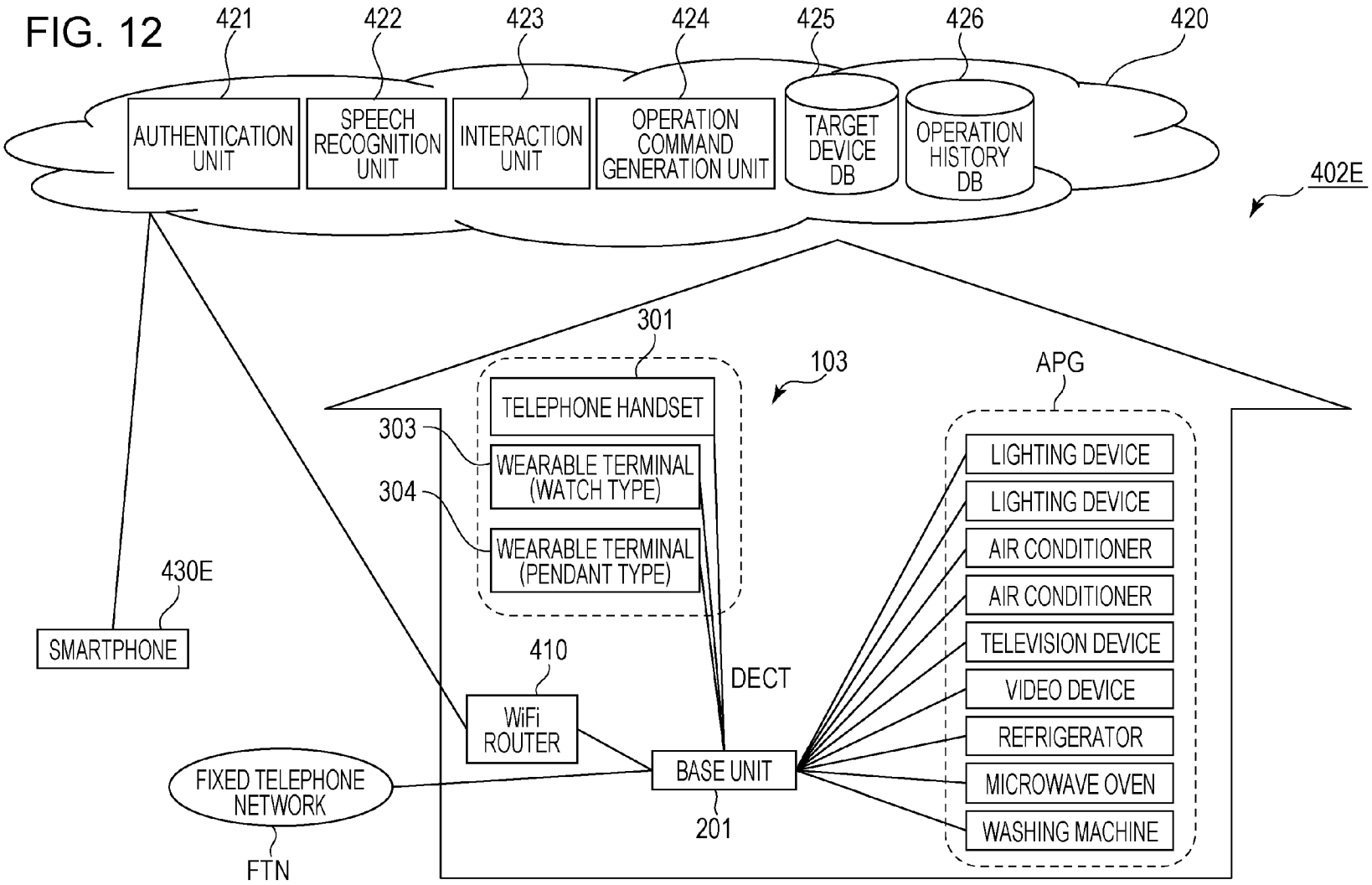
FIG. 12 is a conceptual diagram of a control system according to Embodiment 12.

FIG. 12 is a conceptual diagram of a control system 402E according to Embodiment 12. The control system 402E will be described with reference to FIG. 1 and FIG. 12. Numerals common to Embodiment 11 and Embodiment 12 designate components having substantially the same function as those in Embodiment 11. Thus, these components are identified using the description made in Embodiment 11.

Similarly to Embodiment 11, the control system 402E includes a cordless telephone device 103, a WiFi router 410, and a cloud server 420. These components are identified using the description made in Embodiment 11.

The control system 402E further includes a smartphone 430E. The smartphone 430E is connected to the cloud server 420. The communication connection between the smartphone 430E and the cloud server 420 may be based on wideband access technology such as the third generation (3G) or LTE.

An application program for remote control of the home electric appliance group APG has been downloaded to the smartphone 430E. A user gives voice instructions to the smartphone 430E. The smartphone 430E generates a radio wave representing the voice instructions. The radio wave is transferred from the smartphone 430E to the cloud server 420.

After that, the cloud server 420 generates an operation command on the basis of the technique described in connection with Embodiment 8. The operation command is finally transferred to the home electric appliance specified in the voice instructions. This enables the user to take appropriate remote control of a home electric appliance using the smartphone 430E.

Embodiment 13

A wearable terminal is available in various communication environments. In Embodiment 13, a description will be given of a wearable terminal available in various communication environments. Note that a technique described in connection with Embodiment 13 may be applied to a telephone handset.

Figure 13:
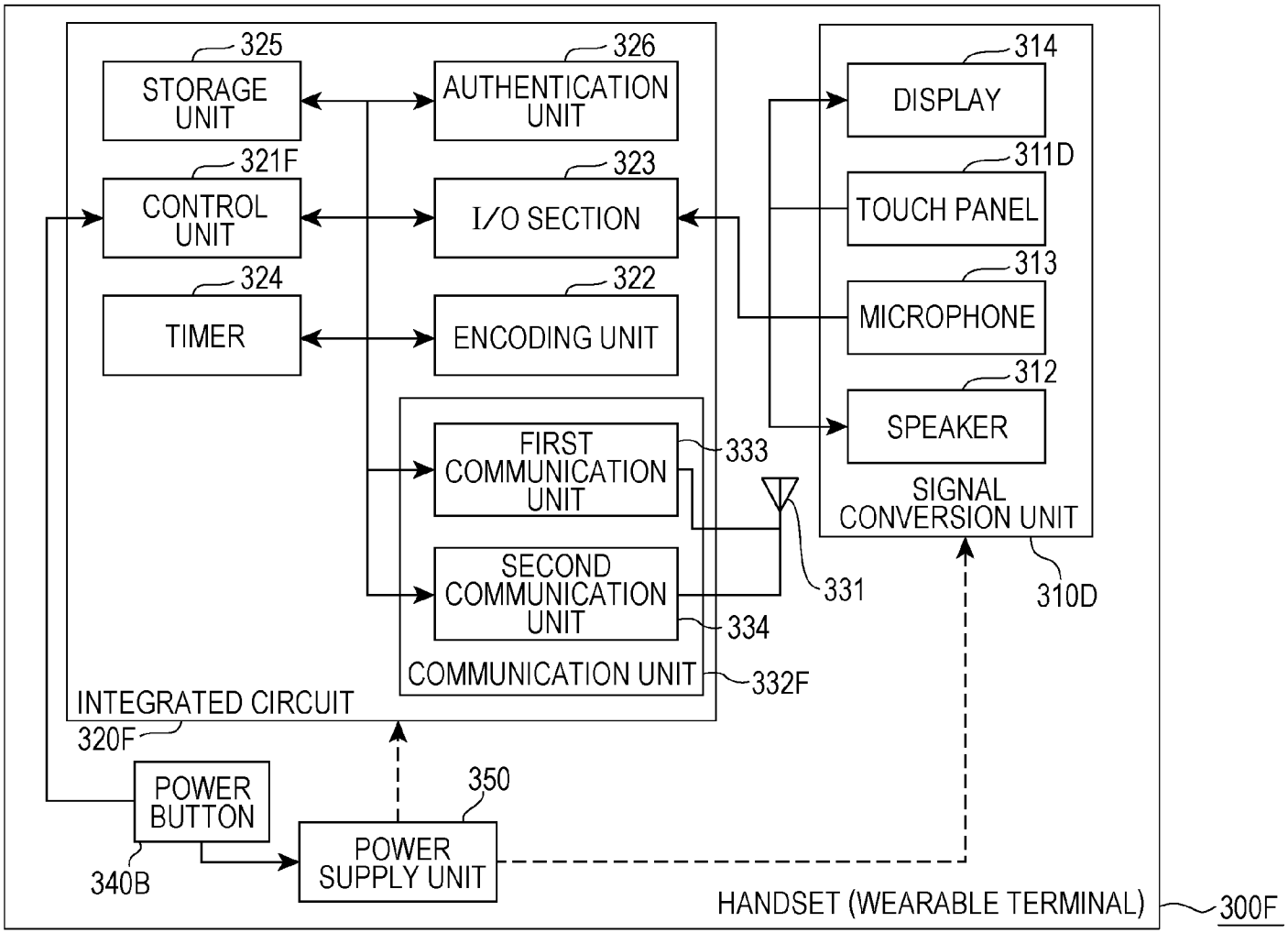
FIG. 13 is a schematic block diagram of a wearable terminal according to Embodiment 13.

FIG. 13 is a schematic block diagram of a wearable terminal 300F according to Embodiment 13. The wearable terminal 300F will be described with reference to FIG. 1, FIG. 9, and FIG. 13. Numerals common to Embodiment 9 and Embodiment 13 designate components having substantially the same function as those in Embodiment 9. Thus, these components are identified using the description made in Embodiment 9.

The designer may design the wearable terminal 300F so that the wearable terminal 300F is wearable on a user's wrist. In this case, the designer may determine the design of the wearable terminal 300F so that the wearable terminal 300F looks like a watch or a bangle. The designer may design the wearable terminal 300F so that the wearable terminal 300F is wearable on a user's finger. In this case, the designer may determine the design of the wearable terminal 300F so that the wearable terminal 300F looks like a ring. The designer may design the wearable terminal 300F so that the wearable terminal 300F can hang from the user's neck. In this case, the designer may determine the design of the wearable terminal 300F so that the wearable terminal 300F looks like a pendant or a necklace. The basic concept of this embodiment is not limited to a specific position at which the wearable terminal 300F is worn or a specific design of the wearable terminal 300F.

Similarly to Embodiment 9, the wearable terminal 300F includes a signal conversion unit 310D, an antenna unit 331, a power button 340B, and a power supply unit 350. These components are identified using the description made in Embodiment 9.

The wearable terminal 300F further includes an integrated circuit 320F. Similarly to Embodiment 9, the integrated circuit 320F is responsible for various forms of signal processing such as signal processing for establishing a connection with the telephone of the intended party, signal processing for switching the operation mode between the first operation mode and the second operation mode, signal processing for generating bit information and streams, and processing for user authentication. The signal processing technique described in connection with Embodiment 9 is applicable to the integrated circuit 320F.

Similarly to Embodiment 9, the integrated circuit 320F includes an encoding unit 322, an I/O section 323, a timer 324, a storage unit 325, and an authentication unit 326. These components are identified using the description made in Embodiment 9.

The integrated circuit 320F further includes a control unit 321F and a communication unit 332F. The control unit 321F executes overall control related to data processing in the integrated circuit 320F. Accordingly, the I/O section 323, the timer 324, the storage unit 325, the authentication unit 326, the encoding unit 322, and the communication unit 332F operate under control of the control unit 321F.

The communication unit 332F transmits the instruction bit information, the instruction stream, the call bit information, and the call stream from the antenna unit 331 under control of the control unit 321F. Accordingly, the communication unit 332F and the antenna unit 331 correspond to the transmission unit 330 described with reference to FIG. 1.

The communication unit 332F includes a first communication unit 333 and a second communication unit 334. The control unit 321F selects one of the first communication unit 333 and the second communication unit 334 as a communication element used for the transmission of the instruction bit information, the instruction stream, the call bit information, and the call stream.

When the control unit 321F designates the first communication unit 333, the instruction bit information, the instruction stream, the call bit information, and the call stream are transmitted to the base unit through a TDD-TDMA scheme complying with the DECT standard. Accordingly, the first communication unit 333 corresponds to the communication unit 332 described with reference to FIG. 9.

When the control unit 321F designates the second communication unit 334, the instruction bit information, the instruction stream, the call bit information, and the call stream are transmitted in accordance with short-range radio technology such as Bluetooth (registered trademark).

The user may operate the touch panel 311D to request the integrated circuit 320F to display an image for selecting a communication scheme. In response to the request from the user, the control unit 321F generates image data representing an image for selecting a communication scheme. The image data is output from the control unit 321F to the display 314 via the I/O section 323. As a result, the display 314 displays an image for selecting a communication scheme.

The user operates the touch panel 311D to select one of the first communication unit 333 and the second communication unit 334. The touch panel 311D generates a selection signal representing the selection of the user. The selection signal is output from the touch panel 311D to the control unit 321F via the I/O section 323. The control unit 321F designates one of the first communication unit 333 and the second communication unit 334 in accordance with the selection signal.

The control unit 321F may refer to the radio wave received by the antenna unit 331 and determine the communication environment of the wearable terminal 300F. In this case, the control unit 321F may select one of the first communication unit 333 and the second communication unit 334 in terms of the communication environment. The basic concept of this embodiment is not limited to a specific method for selecting one of the first communication unit 333 and the second communication unit 334.

Embodiment 14

The technique described in connection with Embodiment 13 may be suitable for use in a control system for controlling a home electric appliance. In Embodiment 14, a description will be given of an illustrative control system.

Figure 14:
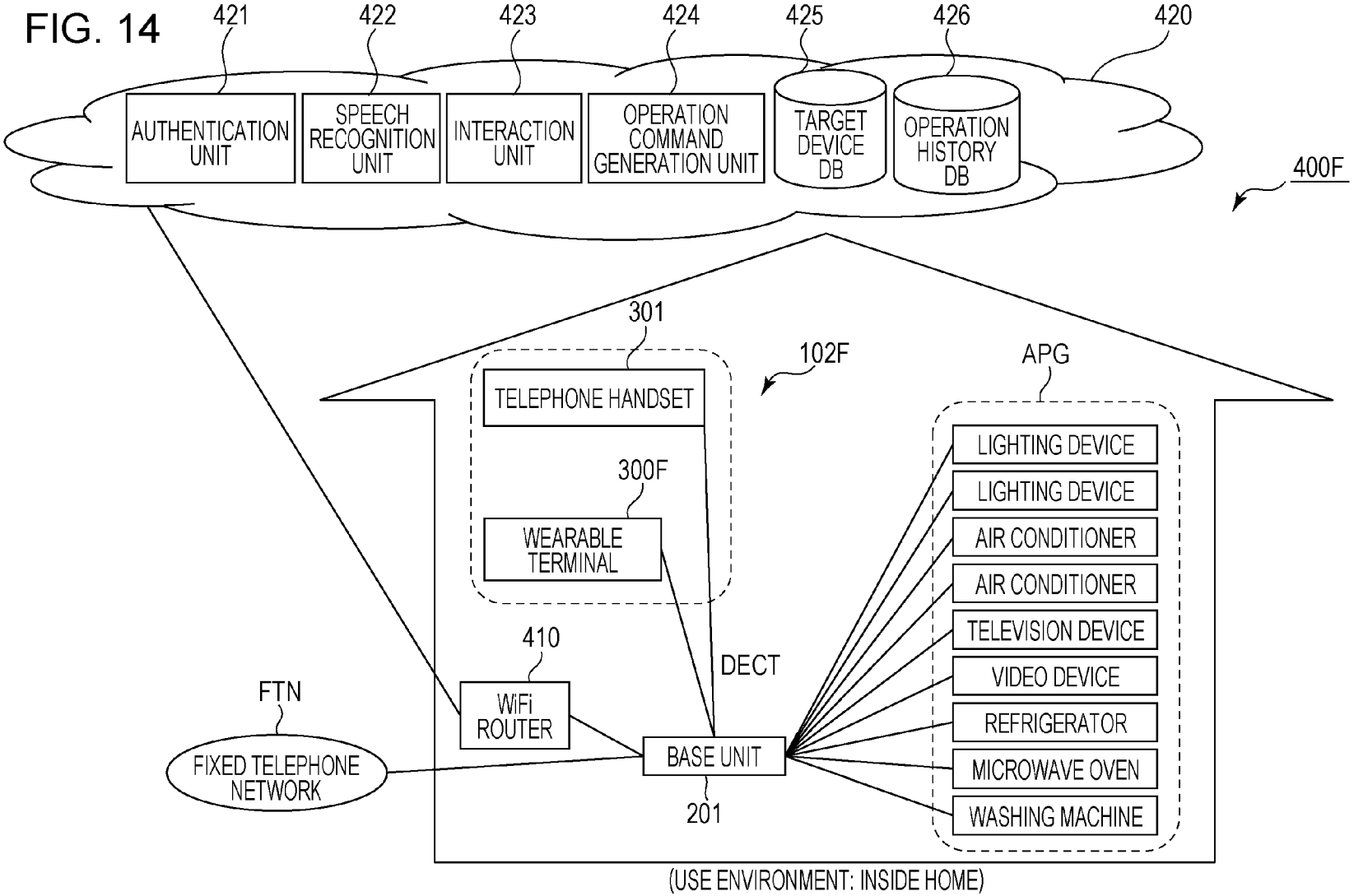
FIG. 14 is a conceptual diagram of a control system according to Embodiment 14.

FIG. 14 is a conceptual diagram of a control system 400F according to Embodiment 14. The control system 400F will be described with reference to FIG. 1, FIG. 13, and FIG. 14. Numerals common to Embodiment 8 and Embodiment 14 designate components having substantially the same function as those in Embodiment 8. Thus, these components are identified using the description made in Embodiment 8.

Similarly to Embodiment 8, the control system 400F includes a WiFi router 410 and a cloud server 420. These components are identified using the description made in Embodiment 8.

The control system 400F further includes a cordless telephone device 102F. The cordless telephone device 102F corresponds to the cordless telephone device 100 described with reference to FIG. 1.

The cordless telephone device 102F includes a base unit 201, a telephone handset 301, and a wearable terminal 300F. The base unit 201 and the telephone handset 301 are identified using the description made in Embodiment 8.

FIG. 14 illustrates a use environment of the wearable terminal 300F inside the user's home. As described in connection with Embodiment 13, the user operates the touch panel 311D to specify the first communication unit 333. As a result, the call bit information, the call stream, the instruction bit information, and the instruction stream are transmitted from the wearable terminal 300F to the base unit 201 using the TDD-TDMA scheme complying with the DECT standard.

Figure 15:
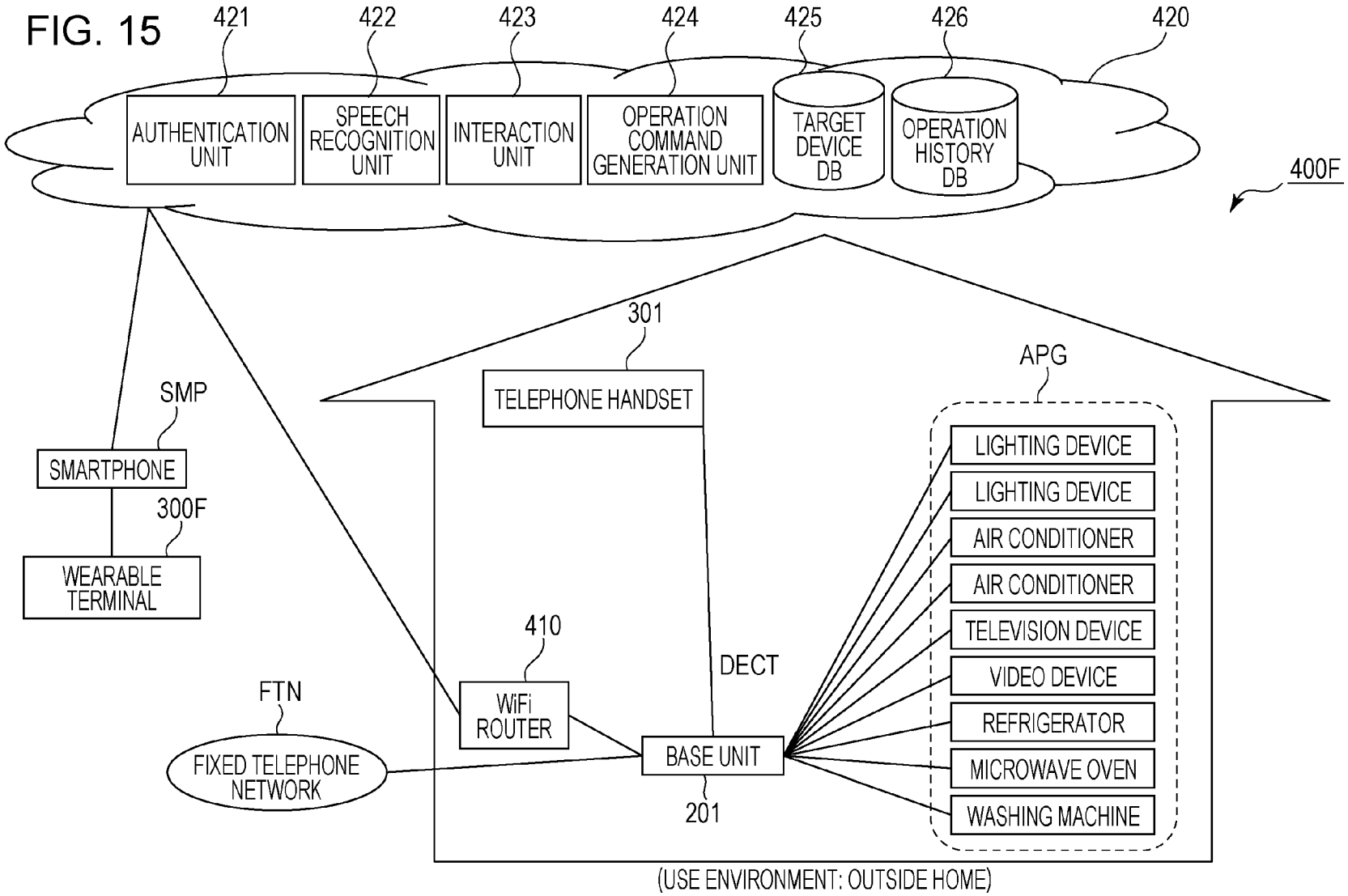
FIG. 15 is a conceptual diagram illustrating a use environment of the wearable terminal illustrated in FIG. 14.

FIG. 15 is a conceptual diagram illustrating a use environment of the wearable terminal 300F outside the user's home. A technique for switching between communication technologies will be described with reference to FIG. 13 to FIG. 15.

A user is away from home while carrying a smartphone SMP. An application program for relaying an instruction stream between the wearable terminal 300F and the cloud server 420 has been downloaded to the smartphone SMP. The smartphone SMP is connected to the cloud server 420 via wideband access such as 3G or LTE.

Since the user is wearing the wearable terminal 300F, the distance from the wearable terminal 300F to the smartphone SMP is sufficiently short to perform Bluetooth (registered trademark) communication between the wearable terminal 300F and the smartphone SMP. As described in connection with Embodiment 13, the user operates the touch panel 311D to specify the second communication unit 334. As a result, the call bit information, the call stream, the instruction bit information, and the instruction stream are transmitted to the smartphone SMP under Bluetooth (registered trademark) communication technology. The smartphone SMP is capable of delivering the instruction stream to the cloud server 420 via the wideband access described above.

The user may also specify the second communication unit 334 while they are at home. However, when the user wishes to perform long-range communication, it is more preferable that the first communication unit 333 be selected than the second communication unit 334 would be.

Embodiment 15

A wearable terminal is available in various communication environments. In Embodiment 15, a description will be given of a wearable terminal available in various communication environments. Note that a technique described in connection with Embodiment 15 may be applied to a telephone handset.

Figure 16:
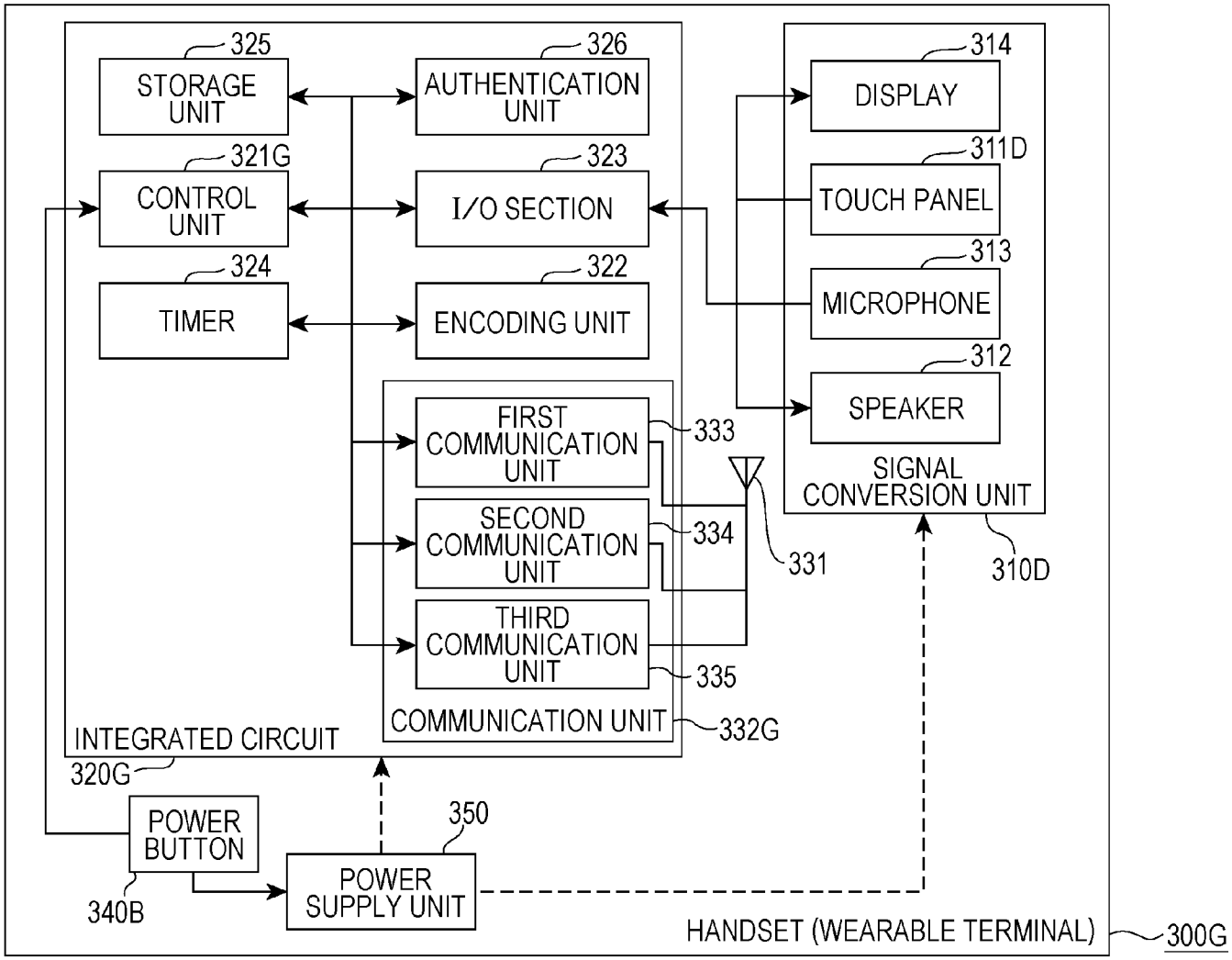
FIG. 16 is a schematic block diagram of a wearable terminal according to Embodiment 15.

FIG. 16 is a schematic block diagram of a wearable terminal 300G according to Embodiment 15. The wearable terminal 300G will be described with reference to FIG. 1 and FIG. 16. Numerals common to Embodiment 13 and Embodiment 15 designate components having substantially the same function as those in Embodiment 13. Thus, these components are identified using the description made in Embodiment 13.

The designer may design the wearable terminal 300G so that the wearable terminal 300G is wearable on a user's wrist. In this case, the designer may determine the design of the wearable terminal 300G so that the wearable terminal 300G looks like a watch or a bangle. The designer may design the wearable terminal 300G so that the wearable terminal 300G is wearable on a user's finger. In this case, the designer may determine the design of the wearable terminal 300G so that the wearable terminal 300G looks like a ring. The designer may design the wearable terminal 300G so that the wearable terminal 300G can hang from the user's neck. In this case, the designer may determine the design of the wearable terminal 300G so that the wearable terminal 300G looks like a pendant or a necklace. The basic concept of this embodiment is not limited to a specific position at which the wearable terminal 300G is worn or a specific design of the wearable terminal 300G.

Similarly to Embodiment 13, the wearable terminal 300G includes a signal conversion unit 310D, an antenna unit 331, a power button 340B, and a power supply unit 350. These components are identified using the description made in Embodiment 13.

The wearable terminal 300G further includes an integrated circuit 320G. Similarly to Embodiment 13, the integrated circuit 320G is responsible for various forms of signal processing such as signal processing for establishing a connection with the telephone of the intended party, signal processing for switching the operation mode between the first operation mode and the second operation mode, and signal processing for generating bit information and streams, and processing for user authentication. The signal processing technique described in connection with Embodiment 13 is applicable to the integrated circuit 320G.

Similarly to Embodiment 13, the integrated circuit 320G includes an encoding unit 322, an I/O section 323, a timer 324, a storage unit 325, and an authentication unit 326. These components are identified using the description made in Embodiment 13.

The integrated circuit 320G further includes a control unit 321G and a communication unit 332G. The control unit 321G executes overall control related to data processing in the integrated circuit 320G. Accordingly, the I/O section 323, the timer 324, the storage unit 325, the authentication unit 326, the encoding unit 322, and the communication unit 332G operate under control of the control unit 321G.

The communication unit 332G transmits the instruction bit information, the instruction stream, the call bit information, and the call stream from the antenna unit 331 under control of the control unit 321G. Accordingly, the communication unit 332G and the antenna unit 331 correspond to the transmission unit 330 described with reference to FIG. 1.

Similarly to Embodiment 13, the communication unit 332G includes a first communication unit 333 and a second communication unit 334. These components are identified using the description made in Embodiment 13.

The communication unit 332G further includes a third communication unit 335. The control unit 321G selects one of the first communication unit 333, the second communication unit 334, and the third communication unit 335 as a communication element used for the transmission of the instruction bit information, the instruction stream, the call bit information, and the call stream.

When the control unit 321G designates the first communication unit 333, the instruction bit information, the instruction stream, the call bit information, and the call stream are transmitted to the base unit through a TDD-TDMA scheme complying with the DECT standard.

When the control unit 321G designates the second communication unit 334, the instruction bit information, the instruction stream, the call bit information, and the call stream are transmitted in accordance with short-range radio technology such as Bluetooth (registered trademark).

When the control unit 321G designates the third communication unit 335, the instruction bit information, the instruction stream, the call bit information, and the call stream are transmitted on the basis of long-range radio technology such as 3G.

The user may operate the touch panel 311D to request the integrated circuit 320G to display an image for selecting a communication scheme. In response to the request from the user, the control unit 321G generates image data representing an image for displaying a communication scheme. The image data is output from the control unit 321G to the display 314 via the I/O section 323. As a result, the display 314 displays an image for selecting a communication scheme.

The user operates the touch panel 311D to select one of the first communication unit 333, the second communication unit 334, and the third communication unit 335. The touch panel 311D generates a selection signal representing the selection of the user. The selection signal is output from the touch panel 311D to the control unit 321G via the I/O section 323. The control unit 321G designates one of the first communication unit 333, the second communication unit 334, and the third communication unit 335 in accordance with the selection signal.

The control unit 321G may refer to the radio wave received by the antenna unit 331 and determine the communication environment of the wearable terminal 300G. In this case, the control unit 321G may select one of the first communication unit 333, the second communication unit 334, and the third communication unit 335 in terms of the communication environment. The basic concept of this embodiment is not limited to a specific method for selecting one of the first communication unit 333, the second communication unit 334, and the third communication unit 335.

Embodiment 16

The technique described in connection with Embodiment 15 may be suitable for use in a control system for controlling a home electric appliance. In Embodiment 16, a description will be given of an illustrative control system.

Figure 17:
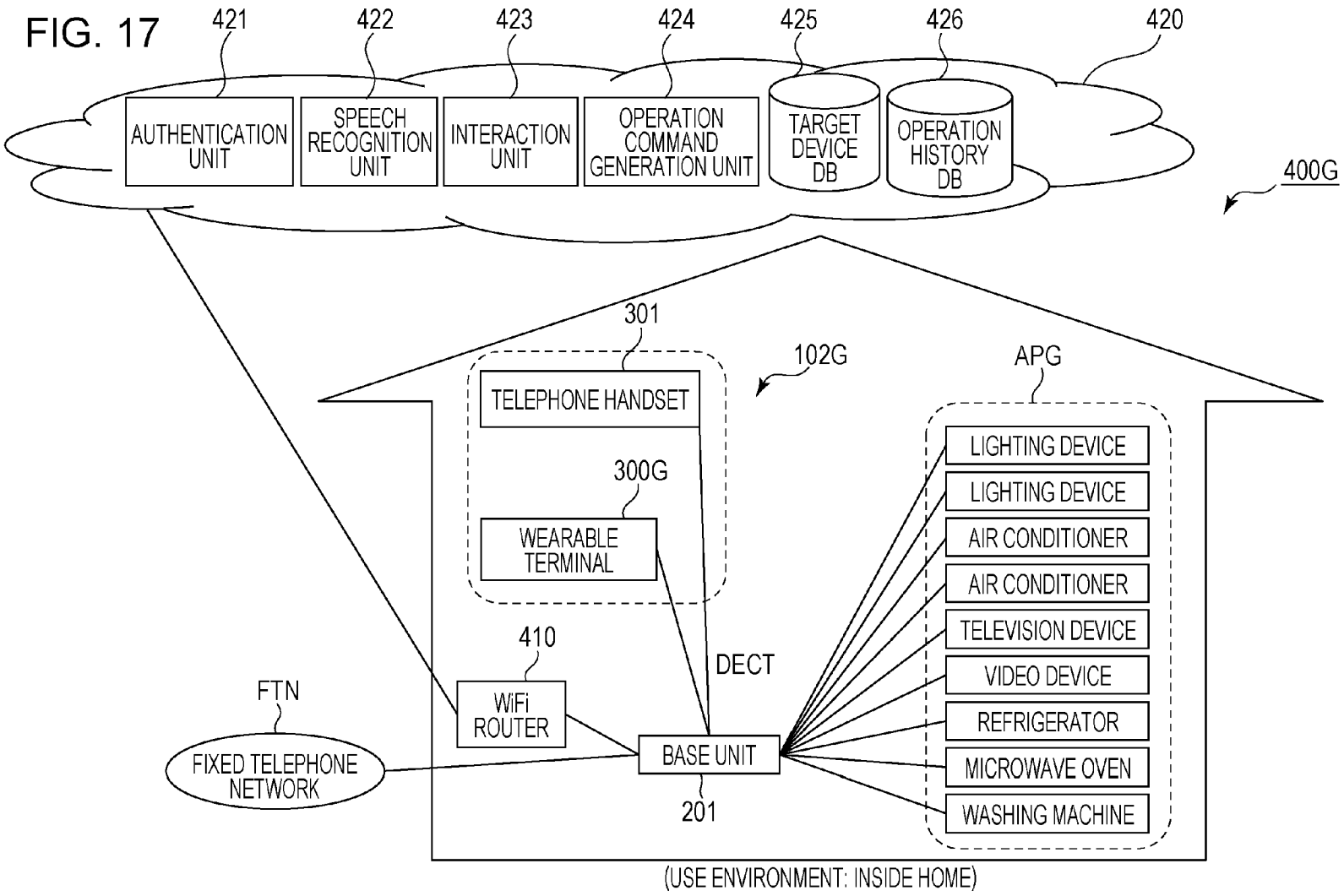
FIG. 17 is a conceptual diagram of a control system according to Embodiment 16.

FIG. 17 is a conceptual diagram of a control system 400G according to Embodiment 16. The control system 400G will be described with reference to FIG. 1, FIG. 16, and FIG. 17. Numerals common to Embodiment 14 and Embodiment 16 designate components having substantially the same function as those in Embodiment 14. Thus, these components are identified using the description made in Embodiment 14.

Similarly to Embodiment 14, the control system 400G includes a WiFi router 410 and a cloud server 420. These components are identified using the description made in Embodiment 14.

The control system 400G further includes a cordless telephone device 102G. The cordless telephone device 102G corresponds to the cordless telephone device 100 described with reference to FIG. 1.

The cordless telephone device 102G includes a base unit 201, a telephone handset 301, and a wearable terminal 300G. The base unit 201 and the telephone handset 301 are identified using the description made in Embodiment 14.

FIG. 17 illustrates a use environment of the wearable terminal 300G inside the user's home. As described in connection with Embodiment 15, the user operates the touch panel 311D to specify the first communication unit 333. As a result, the call bit information, the call stream, the instruction bit information, and the instruction stream are transmitted from the wearable terminal 300G to the base unit 201 using the TDD-TDMA scheme complying with the DECT standard.

Figure 18A:
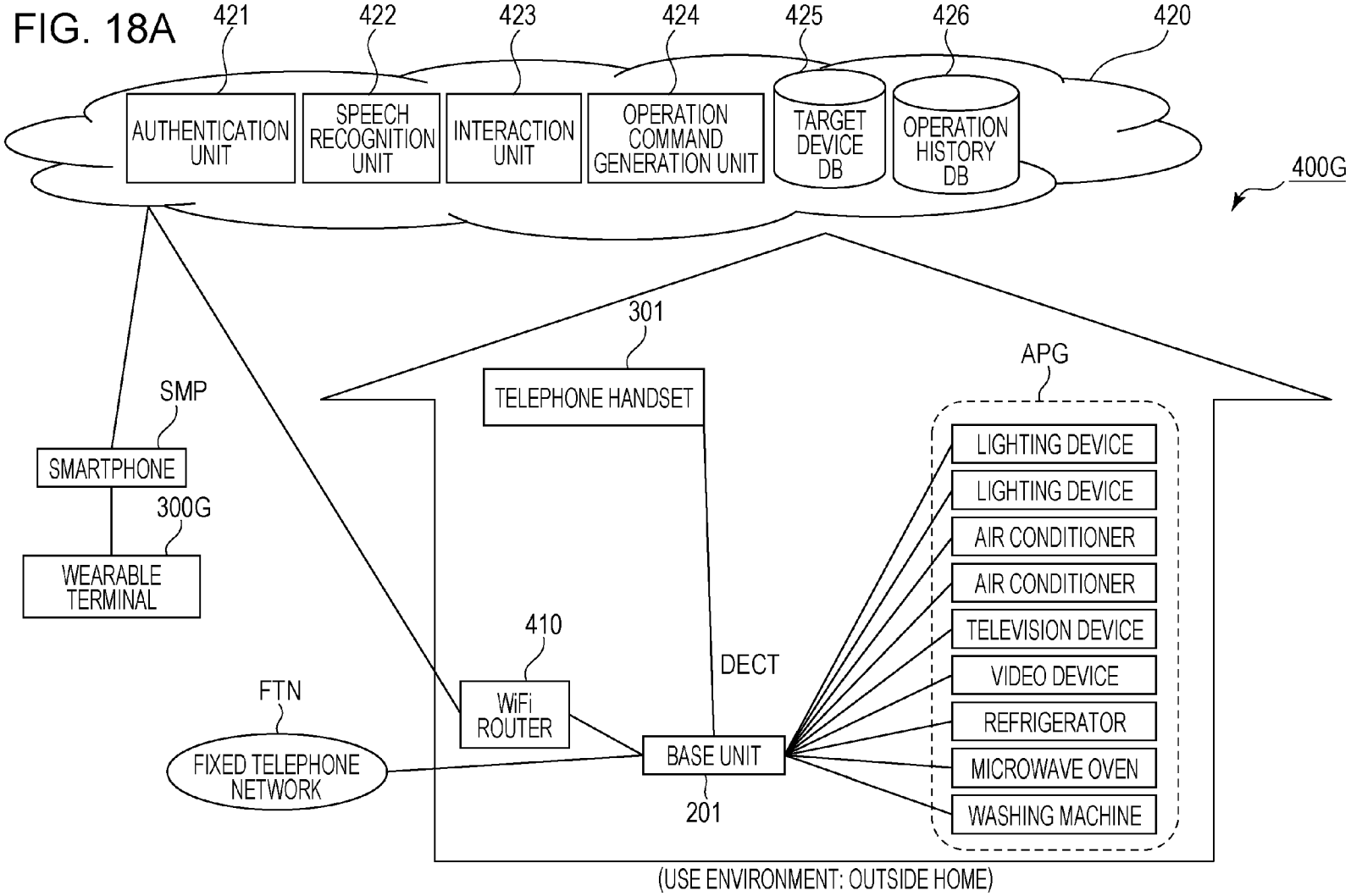
FIG. 18A is a conceptual diagram illustrating a use environment of a wearable terminal in the control system illustrated in FIG. 17.
Figure 18B:
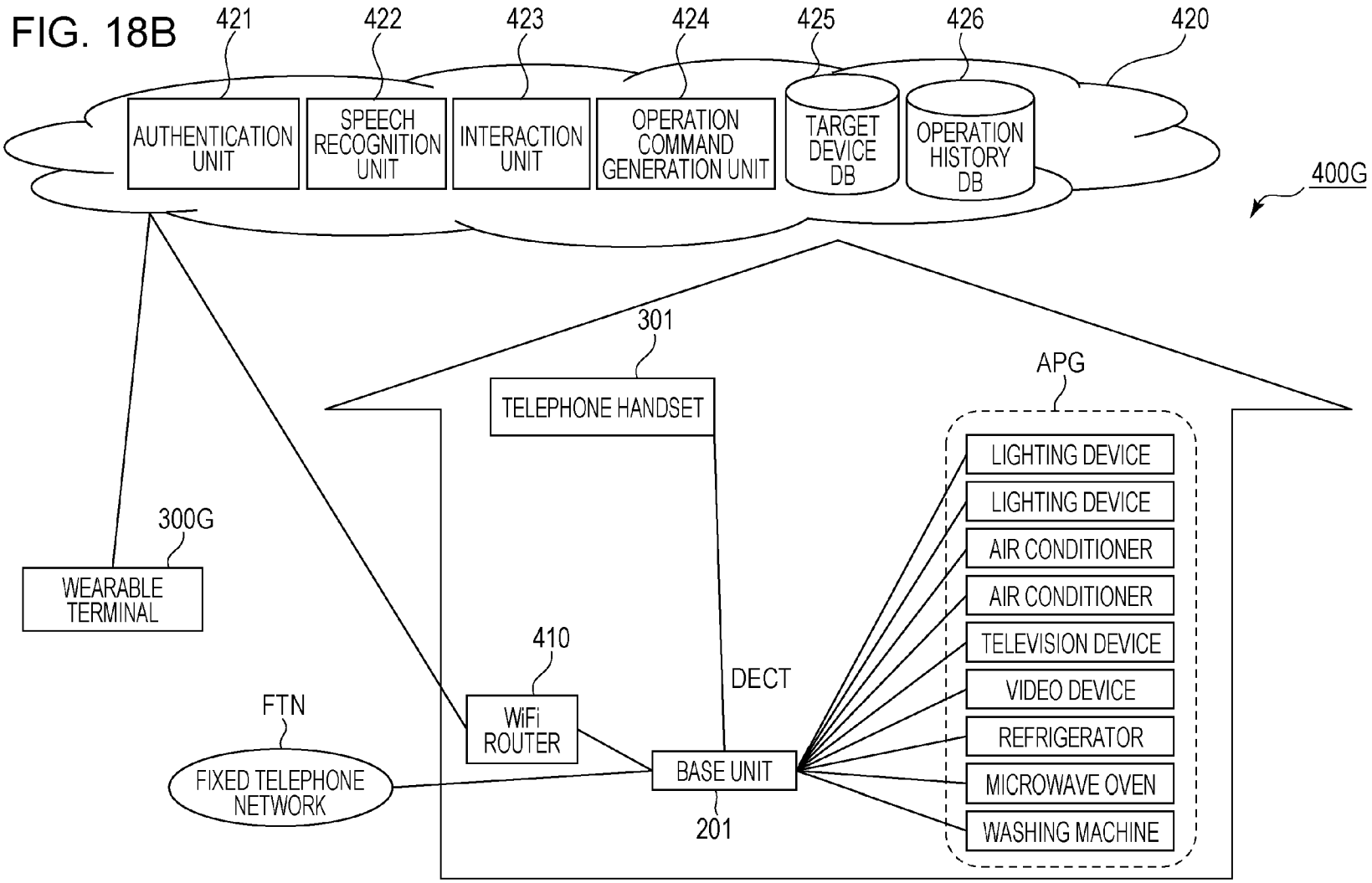
FIG. 18B is a conceptual diagram illustrating a use environment of the wearable terminal in the control system illustrated in FIG. 17.

FIG. 18A and FIG. 18B are conceptual diagrams illustrating a use environment of the wearable terminal 300G outside the user's home. Switching between communication technologies will be described with reference to FIG. 16 to FIG. 18A.

In the use environment illustrated in FIG. 18A, a user is away from home while carrying a smartphone SMP. Since the user is wearing the wearable terminal 300G, the distance from the wearable terminal 300G to the smartphone SMP is sufficiently short to perform Bluetooth (registered trademark) communication between the wearable terminal 300G and the smartphone SMP. As described in connection with Embodiment 15, the user operates the touch panel 311D to specify the second communication unit 334. As a result, the call bit information, the call stream, the instruction bit information, and the instruction stream are transmitted to the smartphone SMP under Bluetooth (registered trademark) communication technology. The smartphone SMP is capable of delivering the instruction stream to the cloud server 420 via the wideband access described previously.

In the use environment illustrated in FIG. 18B, the user is away from home without carrying the smartphone SMP. In this case, the user operates the touch panel 311D to specify the third communication unit 335. As a result, the call bit information, the call stream, the instruction bit information, and the instruction stream are transmitted to the cloud server 420 using 3G communication technology.

Embodiment 17

A base unit of a cordless telephone device may forward a stream received from a handset to a server or an intended party as it is. Alternatively, the base unit may decode a stream received by the handset and re-encode the stream. In Embodiment 17, a description will be given of a cordless telephone device including a base unit that decodes a stream received from a handset and re-encodes the stream.

Figure 19:
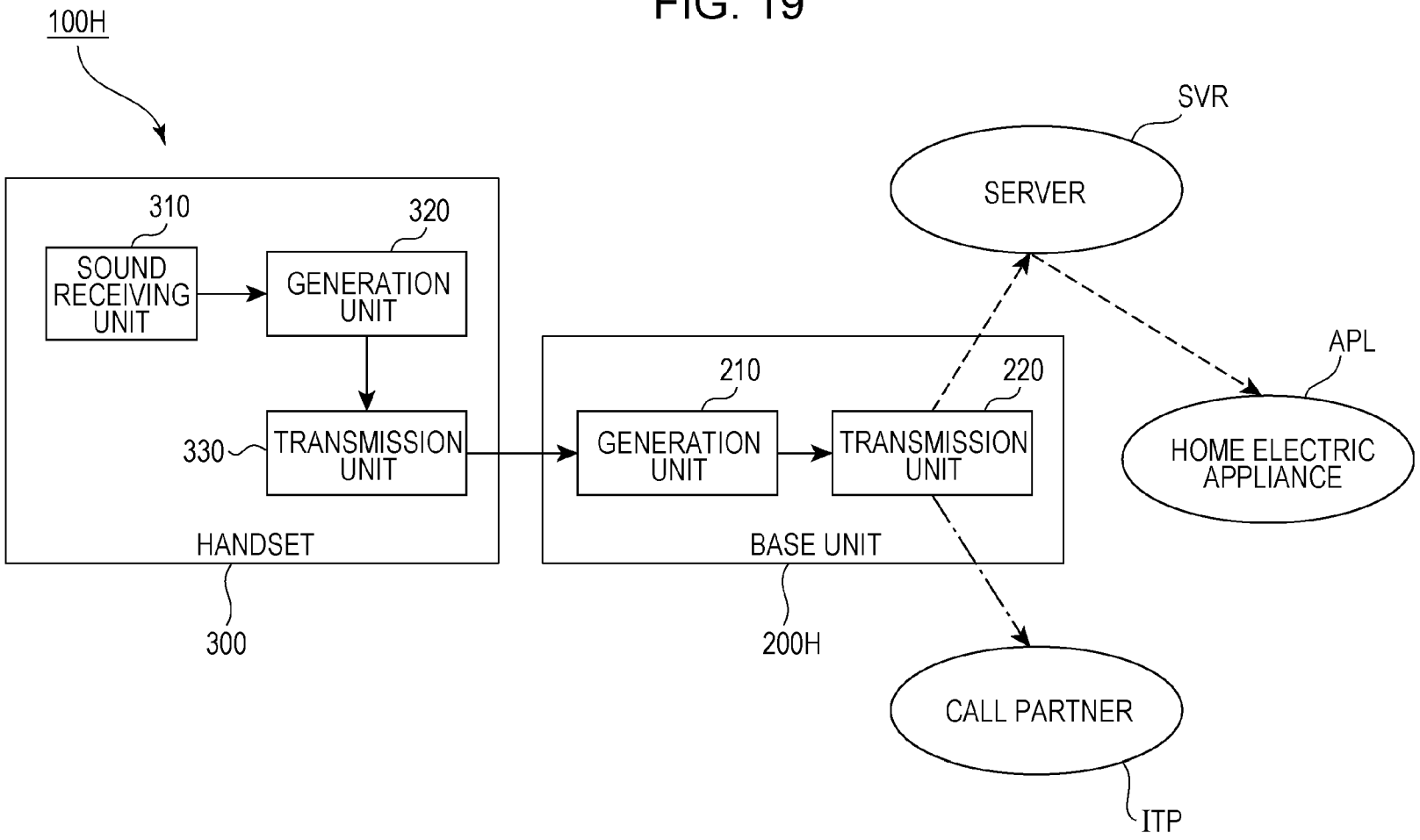
FIG. 19 is a schematic block diagram of a cordless telephone device according to Embodiment 17.

FIG. 19 is a schematic block diagram of a cordless telephone device 100H according to Embodiment 17. The cordless telephone device 100H will be described with reference to FIG. 19. Numerals common to Embodiment 1 and Embodiment 17 designate components having substantially the same function as those in Embodiment 1. Thus, these components are identified using the description made in Embodiment 1.

Similarly to Embodiment 1, the cordless telephone device 100H includes a handset 300. The handset 300 is identified using the description made in Embodiment 1.

The cordless telephone device 100H further includes a base unit 200H. The base unit 200H includes a generation unit 210 and a transmission unit 220. The instruction bit information, the instruction stream, the call bit information, and the call stream, which are generated by the handset 300, are transferred to the generation unit 210 as encoded signals.

When the generation unit 210 receives an encoded signal from the handset 300, the generation unit 210 decodes the signal. After that, the generation unit 210 determines whether the signal includes the instruction bit information or includes the call bit information. If the signal includes the instruction bit information, the generation unit 210 re-encodes the instruction stream. If the signal includes the call bit information, the generation unit 210 re-encodes the call stream. In this embodiment, the second generation unit is exemplified by the generation unit 210. The second instruction stream is exemplified by the instruction stream re-encoded by the generation unit 210. The second call stream is exemplified by the call stream re-encoded by the generation unit 210.

The re-encoded instruction stream is output from the generation unit 210 to the transmission unit 220. The transmission unit 220 transmits the instruction stream to the server SVR. The server SVR generates an operation command for controlling the home electric appliance APL, in accordance with receipt of the instruction stream. In this embodiment, the control command is exemplified by the operation command generated by the server SVR.

The re-encoded call stream is output from the generation unit 210 to the transmission unit 220. The transmission unit 220 transmits the call stream to the telephone of the intended party ITP. In this embodiment, the second transmission unit is exemplified by the transmission unit 220.

Embodiment 18

The base unit of the cordless telephone device described in connection with Embodiment 17 is configured to operate under various forms of control. In Embodiment 18, a description will be given of an illustrative control method for the base unit.

Figure 20:
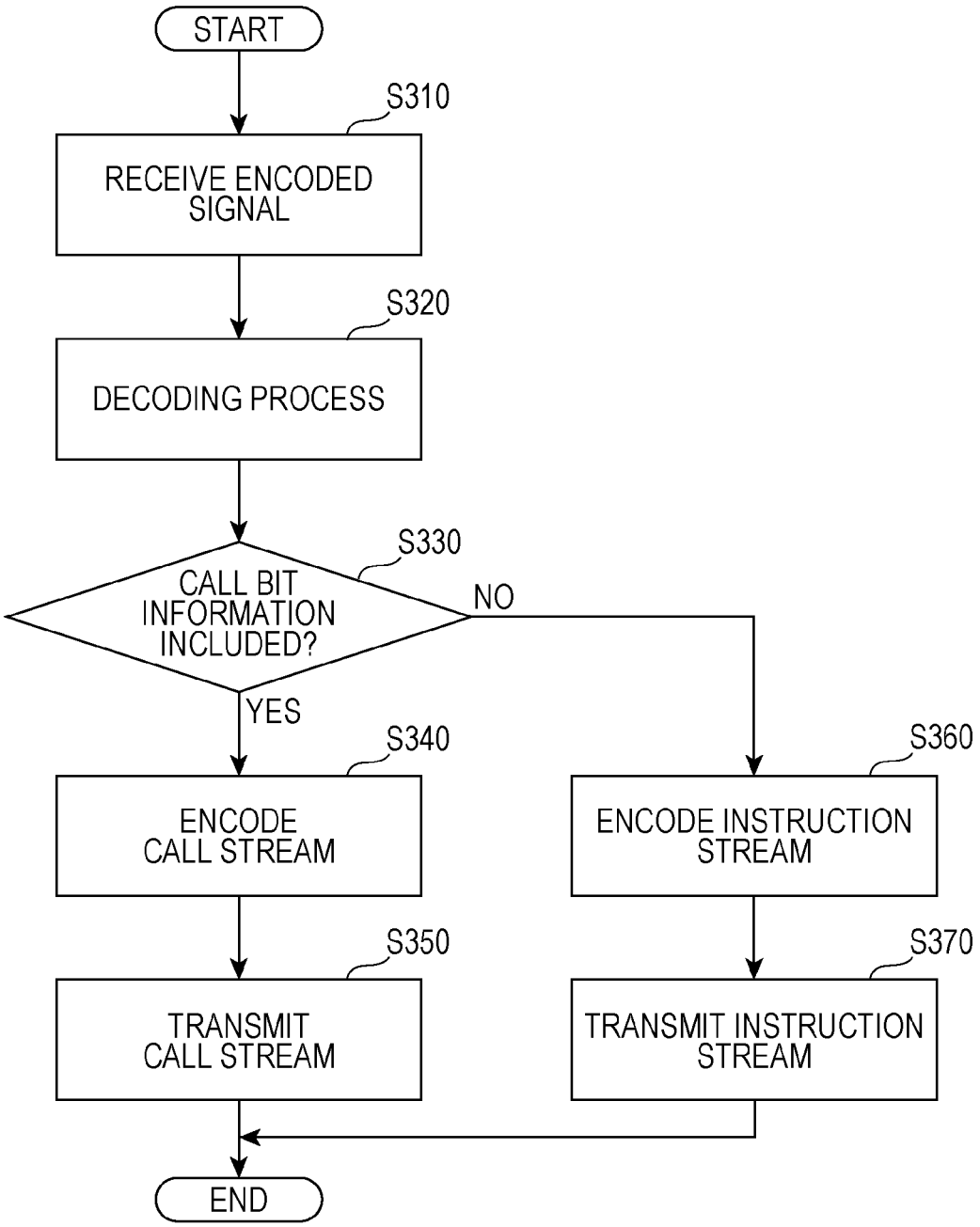
FIG. 20 is a schematic flowchart of an illustrative control method for a base unit of the cordless telephone device illustrated in FIG. 19 (Embodiment 18)

FIG. 20 is a schematic flowchart of an illustrative control method for the base unit 200H. A control method for the base unit 200H will be described with reference to FIG. 19 and FIG. 20.

Step S310

In step S310, an encoded signal is transferred to the generation unit 210. Then, step S320 is executed.

Step S320

In step S320, the generation unit 210 decodes the encoded signal. Then, step S330 is executed.

Step S330

In step S330, the generation unit 210 determines whether or not the decoded signal includes the call bit information. If the decoded signal includes the call bit information, step S340 is executed. Otherwise, step S360 is executed.

Step S340

In step S340, the generation unit 210 re-encodes the call stream. The re-encoded call stream is output from the generation unit 210 to the transmission unit 220. Then, step S350 is executed. In this embodiment, the second generation step is exemplified by step S340.

Step S350

In step S350, the transmission unit 220 transmits the call stream to the telephone of the intended party ITP. In this embodiment, the second transmission step is exemplified by step S350.

Step S360

In step S360, the generation unit 210 re-encodes the instruction stream. The re-encoded instruction stream is output from the generation unit 210 to the transmission unit 220. Then, step S370 is executed. In this embodiment, the second generation step is exemplified by step S360.

Step S370

In step S370, the transmission unit 220 transmits the instruction stream to the server SVR. In this embodiment, the second transmission step is exemplified by step S370.

Embodiment 19

The control system described in connection with the various embodiments described above includes a base unit configured to function as a home gateway. In Embodiment 19, a description will be given of a base unit configured to function as a home gateway.

Figure 21:
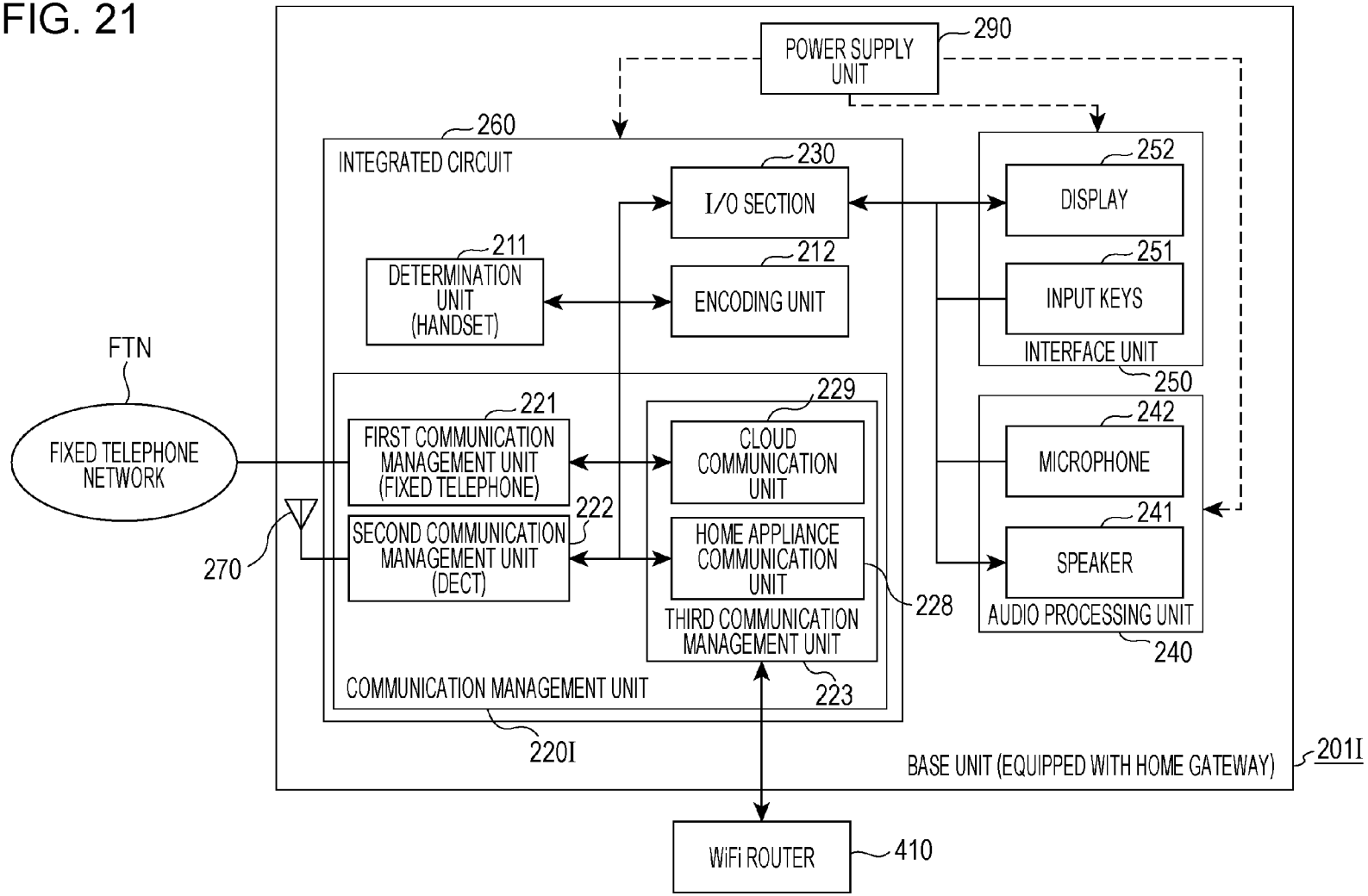
FIG. 21 is a schematic block diagram of a base unit according to Embodiment 19.

FIG. 21 is a schematic block diagram of a base unit 201I according to Embodiment 19. The base unit 201I will be described with reference to FIG. 8 and FIG. 19 to FIG. 21.

The base unit 201I functions not only as a telephone but also as a home gateway. The base unit 201I may be used as the base unit 201 described with reference to FIG. 8. Accordingly, the base unit 201I is connected not only to the fixed telephone network FTN but also to the WiFi router 410.

The base unit 201I is configured to deliver the audio of the user to the intended party via the fixed telephone network FTN. The base unit 201I is configured to deliver the audio of the intended party to the user via the fixed telephone network FTN.

The base unit 201I is configured to deliver voice instructions for requesting remote control of the home electric appliance group APG to the cloud server 420 via the WiFi router 410. The base unit 201I is configured to receive an operation command generated by the cloud server 420 via the WiFi router 410. The operation command is transferred from the base unit 201I to the home electric appliance group APG via Ethernet. The home electric appliance group APG executes the operation corresponding to the voice instructions in accordance with the operation command. This enables the user to take appropriate remote control of the home electric appliance group APG.

The base unit 201I includes a power supply unit 290, an audio processing unit 240, an interface unit 250, an integrated circuit 260, and an antenna unit 270. The power supply unit 290 supplies power to the audio processing unit 240, the interface unit 250, and the integrated circuit 260. The audio processing unit 240 converts the audio of the user into an electrical signal, and also converts a signal received from the integrated circuit 260 into audio. The interface unit 250 receives an operation of the user, and provides the user with necessary information. The integrated circuit 260 performs various forms of signal processing. The antenna unit 270 receives encoded signals from the telephone handsets 301 and 302.

The audio processing unit 240 includes a speaker 241 and a microphone 242. An audio signal transmitted from the telephone of the intended party is subject to predetermined processing by the integrated circuit 260. After that, the audio signal is output from the integrated circuit 260 to the speaker 241. The speaker 241 converts the audio signal into audio. This enables the user to hear the audio of the intended party. The user provides audio to the microphone 242. The microphone 242 converts the audio into an electrical signal. The electrical signal is output from the microphone 242 to the integrated circuit 260. The integrated circuit 260 processes the electrical signal. After that, the electrical signal is output from the integrated circuit 260 to the fixed telephone network FTN or the WiFi router 410.

The interface unit 250 includes input keys 251 and a display 252. The input keys 251 may be number keys (or a ten-key pad) of a typical telephone. The user may operate the input keys 251 to input the telephone number of the intended party. The input telephone number is output to the integrated circuit 260 as an electrical signal. The integrated circuit 260 processes the electrical signal representing the telephone number, and establishes communication between the base unit 201I and the telephone of the intended party via the fixed telephone network FTN. The integrated circuit 260 may generate image data representing the numbers input by the user, in accordance with receipt of the electrical signal representing the telephone number. The image data is output from the integrated circuit 260 to the display 252. The display 252 displays an image representing the numbers input by the user. This enables the user to visually check whether or not the input numbers are correct.

The integrated circuit 260 includes a determination unit 211, an encoding unit 212, a communication management unit 220I, and an I/O section 230. The determination unit 211 decodes the encoded signal received by the antenna unit 270 (step S320 described with reference to FIG. 20). The determination unit 211 then determines whether the signal includes the call bit information or includes the instruction bit information (step S330 described with reference to FIG. 20).

If the signal includes the call bit information, the call bit information and the call stream are output from the determination unit 211 to the encoding unit 212. The encoding unit 212 encodes the call stream (step S340 described with reference to FIG. 20). The encoding unit 212 specifies an output path of the encoded call stream, and outputs the encoded call stream to the communication management unit 220I. After that, the communication management unit 220I outputs the encoded call stream to the fixed telephone network FTN (step S350 described with reference to FIG. 20).

If the signal includes the instruction bit information, the instruction bit information and the instruction stream are output from the determination unit 211 to the encoding unit 212. The encoding unit 212 encodes the instruction stream (step S360 described with reference to FIG. 20). The encoding unit 212 specifies an output path of the encoded instruction stream, and outputs the encoded instruction stream to the communication management unit 220I. After that, the communication management unit 220I outputs the encoded instruction stream to the WiFi router 410 (step S370 described with reference to FIG. 20). The determination unit 211 and the encoding unit 212 correspond to the generation unit 210 described with reference to FIG. 19. The communication management unit 220I corresponds to the transmission unit 220 described with reference to FIG. 19.

The audio provided by the user to the microphone 242 is input to the I/O section 230 as an electrical signal. After that, the electrical signal representing the audio is output from the I/O section 230 to the encoding unit 212. The encoding unit 212 encodes the electrical signal. The encoding unit 212 specifies an output path of the encoded electrical signal, and outputs the encoded electrical signal to the communication management unit 220I. After that, the communication management unit 220I outputs the encoded electrical signal to the fixed telephone network FTN.

The communication management unit 220I includes a first communication management unit 221, a second communication management unit 222, and a third communication management unit 223. The first communication management unit 221 manages communication made through the fixed telephone network FTN. The second communication management unit 222 manages communication made through a multiplexing scheme (e.g., a TDD-TDMA scheme complying with the DECT standard) constructed between the telephone handsets 301 and 302 and the base unit 201I. The third communication management unit 223 manages communication made through the WiFi router 410 and Ethernet.

When the telephone of the intended party sends an audio signal to the base unit 201i via the fixed telephone network FTN, the first communication management unit 221 receives the audio signal. When the user answers the communication partner using the audio processing unit 240, the audio signal is output from the first communication management unit 221 to the speaker 241 via the I/O section 230. When the user answers the intended party using one of the telephone handsets 301 and 302, the first communication management unit 221 transmits the audio signal generated by the intended party from the antenna unit 270 to the one of the telephone handsets 301 and 302 in cooperation with the second communication management unit 222.

When the user provides audio to the microphone 242 and when the antenna unit 270 receives the call bit information, the encoding unit 212 outputs the encoded signal to the first communication management unit 221. The first communication management unit 221 transmits the encoded signal to the telephone of the intended party via the fixed telephone network FTN. In this embodiment, the second public communication line is exemplified by the fixed telephone network used for communication between the first communication management unit 221 and the telephone of the intended party.

When the antenna unit 270 receives an encoded signal from one of the telephone handsets 301 and 302, the encoded signal is output from the second communication management unit 222 to the determination unit 211. The encoded signal is decoded by the determination unit 211. If the decoded signal includes the instruction bit information, the encoding unit 212 outputs the instruction stream to the third communication management unit 223 after performing an encoding process.

The third communication management unit 223 includes a cloud communication unit 229 and a home appliance communication unit 228. When the third communication management unit 223 receives the instruction stream, the instruction stream is transmitted from the cloud communication unit 229 to the cloud server 420 via the WiFi router 410. In this embodiment, the first public communication line is exemplified by the Internet line constructed between the WiFi router 410 and the cloud server 420.

The cloud server 420 generates an operation command in accordance with the instruction stream. The operation command is output from the cloud server 420 to the third communication management unit 223 via the WiFi router 410. When the third communication management unit 223 receives the operation command, the home appliance communication unit 228 outputs the operation command to the home electric appliance group APG via Ethernet. As a result, a home electric appliance in the home electric appliance group APG operates in accordance with the operation command.

Embodiment 20

The base unit described in connection with Embodiment 19 is configured to operate under various forms of control. In Embodiment 20, a description will be given of an illustrative control method for the base unit.

Figure 22:
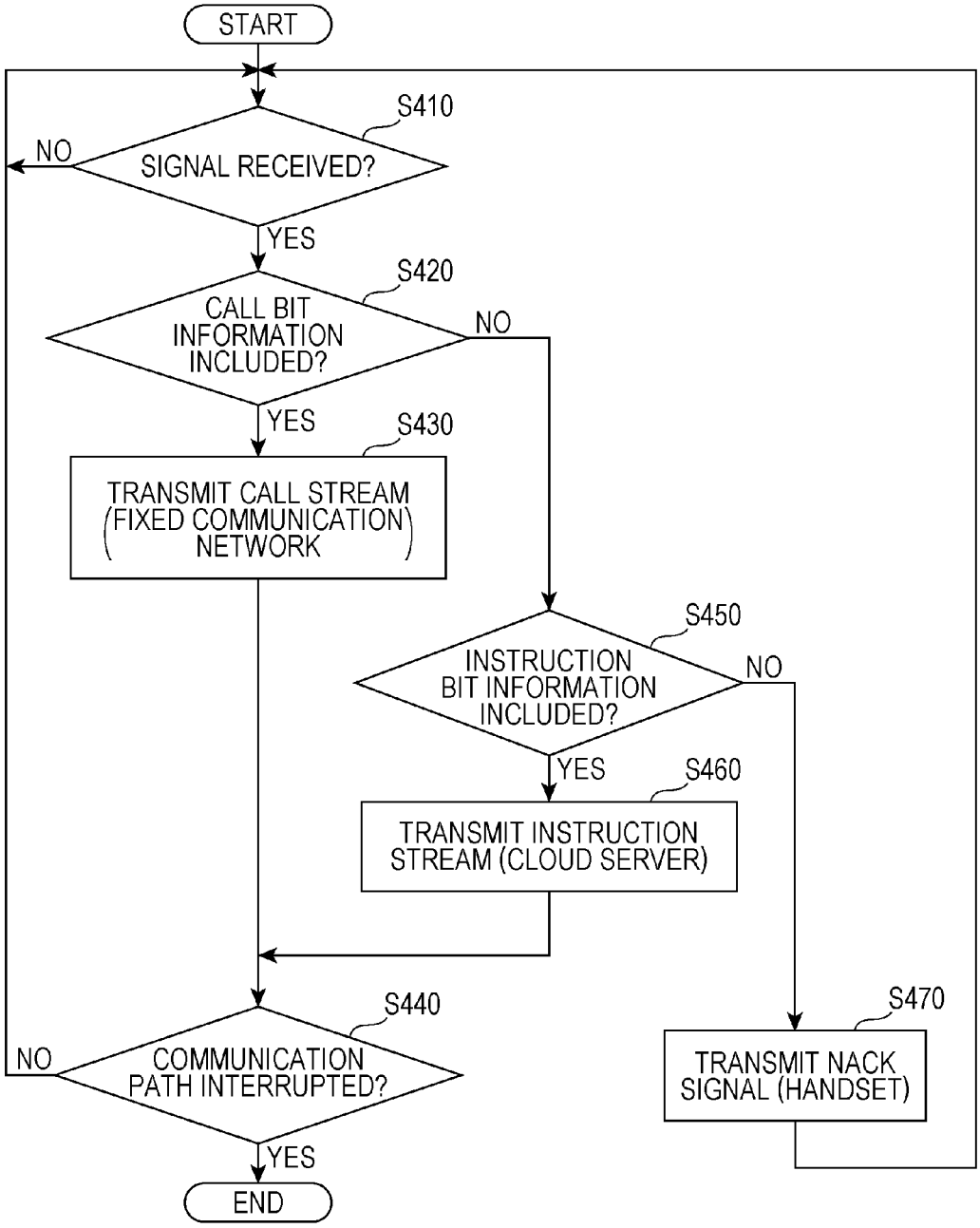
FIG. 22 is a schematic flowchart of an illustrative control method for the base unit illustrated in FIG. 21 (Embodiment 20)

FIG. 22 is a schematic flowchart of an illustrative control method for the base unit 201I. A control method for the base unit 201I will be described with reference to FIG. 8, FIG. 21, and FIG. 22.

Step S410

Step S410 is executed until an encoded signal is transmitted to the antenna unit 270. When an encoded signal is transmitted to the antenna unit 270, step S420 is executed.

Step S420

In step S420, the second communication management unit 222 outputs the encoded signal to the determination unit 211. The determination unit 211 decodes the encoded signal. The determination unit 211 determines whether or not the decoded signal includes the call bit information. If the decoded signal includes the call bit information, step S430 is executed. Otherwise, step S450 is executed.

Step S430

In step S430, the call bit information and the call stream are output from the determination unit 211 to the encoding unit 212. The encoding unit 212 encodes the call stream. The encoded call stream is output from the encoding unit 212 to the first communication management unit 221. After that, the encoded call stream is output from the first communication management unit 221 to the telephone of the intended party via the fixed telephone network FTN. Then, step S440 is executed.

Step S440

In step S440, the first communication management unit 221 determines whether or not the communication connection with the telephone of the communication partner is ongoing. If the communication connection with the telephone of the communication partner is ongoing, step S410 is executed. Otherwise, the process ends.

Step S450

The determination unit 211 determines whether or not the decoded signal includes the instruction bit information. If the decoded signal includes the instruction bit information, step S460 is executed. Otherwise, step S470 is executed.

Step S460

In step S460, the instruction bit information and the instruction stream are output from the determination unit 211 to the encoding unit 212. The encoding unit 212 encodes the instruction stream. The encoded instruction stream is output from the encoding unit 212 to the third communication management unit 223. After that, the encoded instruction stream is output to the cloud server 420 via the WiFi router 410 by the cloud communication unit 229. Then, step S440 is executed.

Step S470

In step S470, the determination unit 211 generates a NACK signal. The NACK signal is output from the determination unit 211 to the second communication management unit 222. The NACK signal is transmitted from the second communication management unit 222 to one of the telephone handsets 301 and 302.

Embodiment 21

In Embodiment 6, the operation mode is switched to the mute mode by using the handset. Alternatively, the base unit may switch the operation mode to the mute mode. In Embodiment 21, a description will be given of switching to the mute mode by using the base unit.

Figure 23:
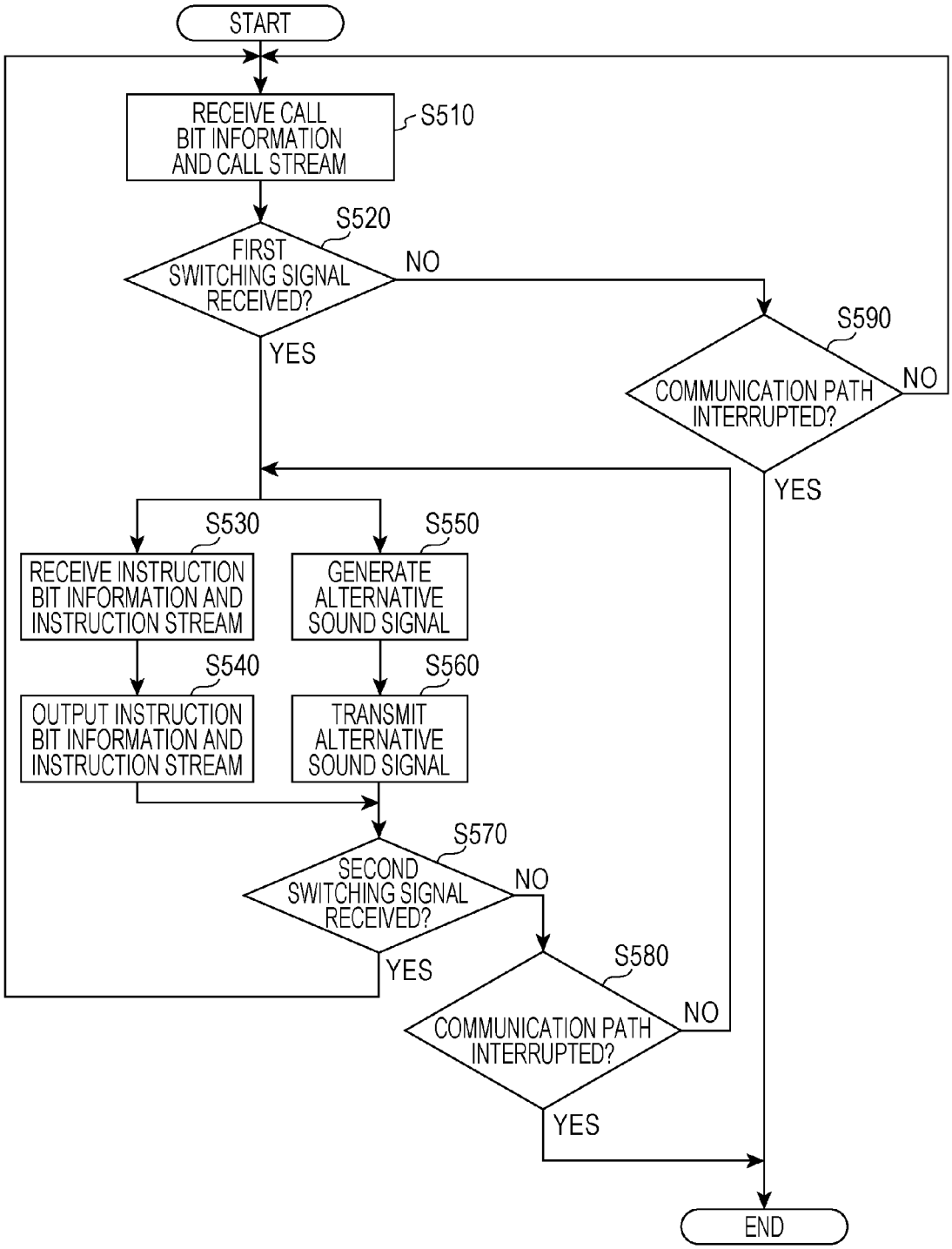
FIG. 23 is a schematic flowchart of control of switching to a mute mode, which is executed by the base unit illustrated in FIG. 21 (Embodiment 21)

FIG. 23 is a schematic flowchart of control of switching to the mute mode, which is executed by using the base unit 201I. A control method for the base unit 201I will be described with reference to FIG. 8, FIG. 21, and FIG. 23.

Step S510

In step S510, the call bit information and the call stream are transmitted from one of the telephone handsets 301 and 302 to the antenna unit 270. Then, step S520 is executed.

Step S520

In step S520, in response to a request from the user, by operating one of the telephone handsets 301 and 302, to switch the operation mode to the mute mode, the one of the telephone handsets 301 and 302 generates a first switching signal. The first switching signal is transmitted from the one of the telephone handsets 301 and 302 to the antenna unit 270. When the antenna unit 270 receives the first switching signal, step S530 and step S550 are performed in parallel. Otherwise, step S590 is executed.

Step S530

In step S530, the instruction bit information and the instruction stream are transmitted from the one of the telephone handsets 301 and 302 to the antenna unit 270. Then, step S540 is executed.

Step S540

In step S540, the instruction bit information and the instruction stream are output from the second communication management unit 222 to the determination unit 211. Then, step S570 is executed.

Step S550

In step S550, the first communication management unit 221 generates an alternative sound signal representing an alternative sound (e.g., noise or background sound). Then, step S560 is executed.

Step S560

In step S560, the alternative sound signal is transmitted from the first communication management unit 221 to the telephone of the intended party via the fixed telephone network FTN. Then, step S570 is executed.

Step S570

In step S570, in response to a request from the user, by operating one of the telephone handsets 301 and 302, to exit the mute mode, the one of the telephone handsets 301 and 302 generates a second switching signal. The second switching signal is transmitted from the one of the telephone handsets 301 and 302 to the antenna unit 270. When the antenna unit 270 receives the second switching signal, step S510 is executed. Otherwise, step S580 is executed.

Step S580

In step S580, the first communication management unit 221 determines whether or not the communication connection with the telephone of the communication partner is ongoing. If the communication connection with the telephone of the communication partner is ongoing, step S530 and step S550 are performed in parallel. Otherwise, the process ends.

Step S590

In step S590, the first communication management unit 221 determines whether or not the communication connection with the telephone of the communication partner is ongoing. If the communication connection with the telephone of the communication partner is ongoing, step S510 is executed. Otherwise, the process ends.

Embodiment 22

The base unit according to Embodiment 19 communicates with a cloud server via a WiFi router, and also communicates with a home electric appliance via Ethernet. Alternatively, similarly to communication with the cloud server, the base unit may communicate with a home electric appliance via the WiFi router. In Embodiment 22, a description will be given of a base unit that communicates not only with a cloud server but also with a home electric appliance via a WiFi router.

Figure 24:
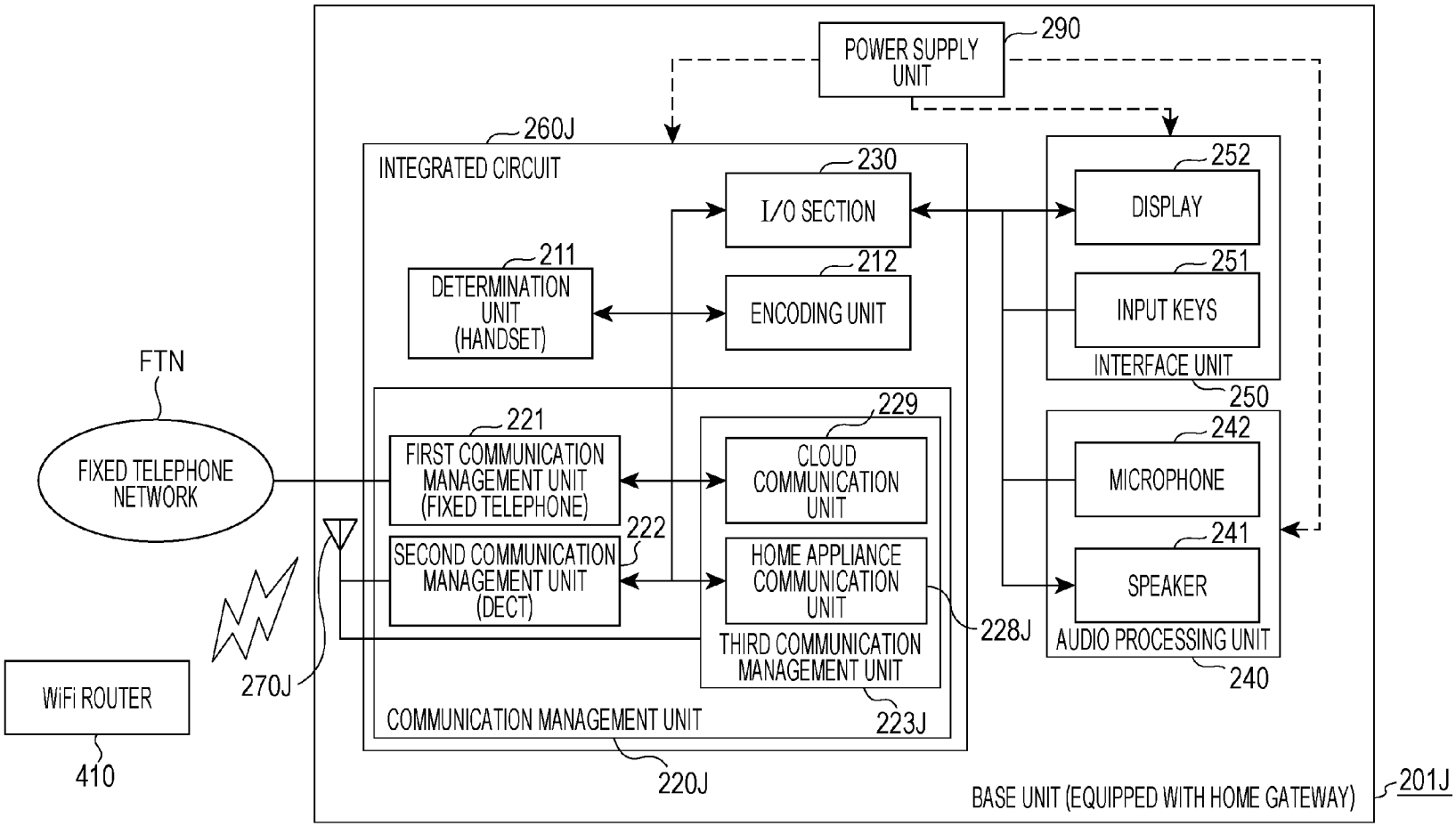
FIG. 24 is a schematic block diagram of a base unit according to Embodiment 22.

FIG. 24 is a schematic block diagram of a base unit 201J according to Embodiment 22. The base unit 201J will be described with reference to FIG. 24. Numerals common to Embodiment 19 and Embodiment 22 designate components having substantially the same function as those in Embodiment 19. Thus, these components are identified using the description made in Embodiment 19.

Similarly to Embodiment 19, the base unit 201J includes a power supply unit 290, an audio processing unit 240, and an interface unit 250. These components are identified using the description made in Embodiment 19.

The base unit 201J further includes an integrated circuit 260J and an antenna unit 270J. The antenna unit 270J receives signals from various handsets (e.g., a telephone handset and a wearable terminal) connected to the base unit 201J so that the handsets and the base unit 201J can communicate with each other, using a multiplexing scheme. The integrated circuit 260J processes the signals received by the antenna unit 270J.

Similarly to Embodiment 19, the integrated circuit 260J includes a determination unit 211, an encoding unit 212, and an I/O section 230. These components are identified using the description made in Embodiment 19.

The integrated circuit 260J further includes a communication management unit 220J. The communication management unit 220J manages communication with the fixed telephone network FTN and the WiFi router 410.

Similarly to Embodiment 19, the communication management unit 220J includes a first communication management unit 221 and a second communication management unit 222. These components are identified using the description made in Embodiment 19.

The communication management unit 220J further includes a third communication management unit 223J. Unlike Embodiment 19, the third communication management unit 223J is dedicated to the management of communication made through the WiFi router 410.

The antenna unit 270J receives a signal from the WiFi router 410. Additionally, the antenna unit 270J transmits a signal to the WiFi router 410.

Similarly to Embodiment 19, the antenna unit 270J is connected to the second communication management unit 222. Unlike Embodiment 19, the antenna unit 270J is also connected to the third communication management unit 223J.

Similarly to Embodiment 19, the third communication management unit 223J includes a cloud communication unit 229. The cloud communication unit 229 transmits the encoded instruction stream from the antenna unit 270J to the WiFi router 410. After that, the instruction stream is transmitted from the WiFi router 410 to the cloud server.

The third communication management unit 223J further includes a home appliance communication unit 228J. The home appliance communication unit 228J transmits the operation command generated by the cloud server from the antenna unit 270J to the WiFi router 410. After that, the operation command is transmitted from the WiFi router 410 to a home electric appliance. As a result, the home electric appliance operates in accordance with the operation command.

Embodiment 23

As described in connection with Embodiment 11, the base unit may be connected to a smartphone using WiFi communication technology. In Embodiment 23, a description will be given of a base unit connected to a smartphone so that the base unit and the smartphone can communicate with each other using WiFi communication technology.

Figure 25:
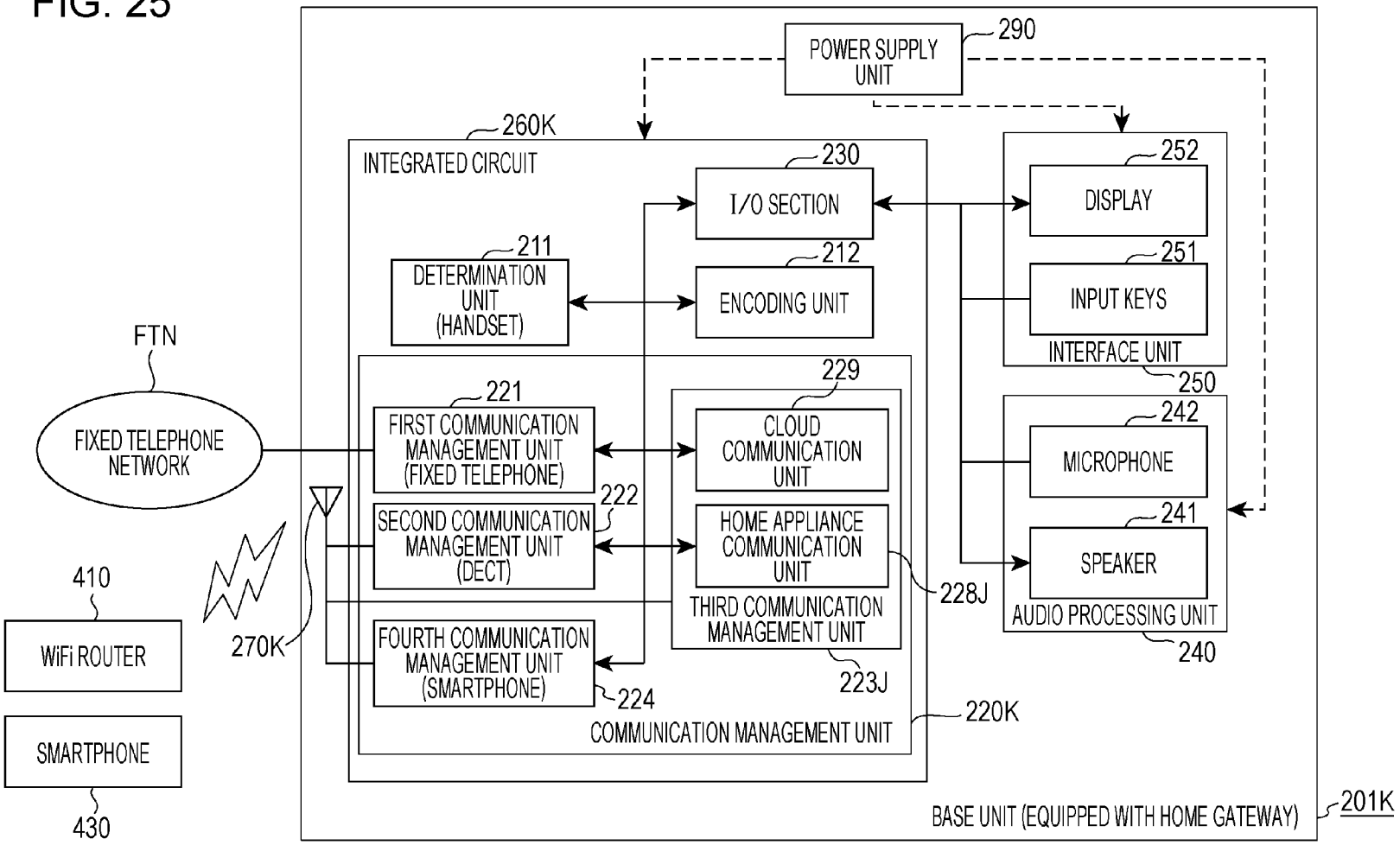
FIG. 25 is a schematic block diagram of a base unit according to Embodiment 23.

FIG. 25 is a schematic block diagram of a base unit 201K according to Embodiment 23. The base unit 201K will be described with reference to FIG. 11 and FIG. 25. Numerals common to Embodiment 22 and Embodiment 23 designate components having substantially the same function as those in Embodiment 22. Thus, these components are identified using the description made in Embodiment 22.

The base unit 201K is connected to the telephone handset 301 and the wearable terminals 303 and 304 so that the base unit 201K can communicate with the telephone handset 301 and the wearable terminals 303 and 304 through a TDD-TDMA scheme complying with the DECT standard. Accordingly, the base unit 201K may be used as the base unit 201 described with reference to FIG. 11.

Similarly to Embodiment 22, the base unit 201K includes a power supply unit 290, an audio processing unit 240, and an interface unit 250. These components are identified using the description made in Embodiment 22.

The base unit 201K further includes an integrated circuit 260K and an antenna unit 270K. The antenna unit 270K receives signals from the telephone handset 301 and the wearable terminals 303 and 304 through a multiplexing scheme. The integrated circuit 260K processes the signals received by the antenna unit 270K.

Similarly to Embodiment 22, the integrated circuit 260K includes a determination unit 211, an encoding unit 212, and an I/O section 230. These components are identified using the description made in Embodiment 22.

The integrated circuit 260K further includes a communication management unit 220K. The communication management unit 220K manages communication with the fixed telephone network FTN and the WiFi router 410.

Similarly to Embodiment 22, the communication management unit 220K includes a first communication management unit 221, a second communication management unit 222, and a third communication management unit 223J. These components are identified using the description made in Embodiment 22.

The communication management unit 220K further includes a fourth communication management unit 224. The antenna unit 270K receives signals from the WiFi router 410 and the smartphone 430. Additionally, the antenna unit 270K transmits a signal to the WiFi router 410 and the smartphone 430. The antenna unit 270K is connected to the second communication management unit 222, the third communication management unit 223J, and the fourth communication management unit 224. The fourth communication management unit 224 manages communication with the smartphone 430.

When the user operates the smartphone 430 to request to make a conversation with an intended party via the fixed telephone network FTN, the antenna unit 270K receives an audio signal representing the audio input to the smartphone 430. After that, the fourth communication management unit 224 outputs the audio signal to the first communication management unit 221. The first communication management unit 221 transmits the audio signal to the telephone of the intended party.

Embodiment 24

The base unit may be connected to an IP telephone network. In Embodiment 24, a description will be given of a base unit connected to an Internet Protocol (IP) telephone network and a control system including the base unit.

Figure 26A:
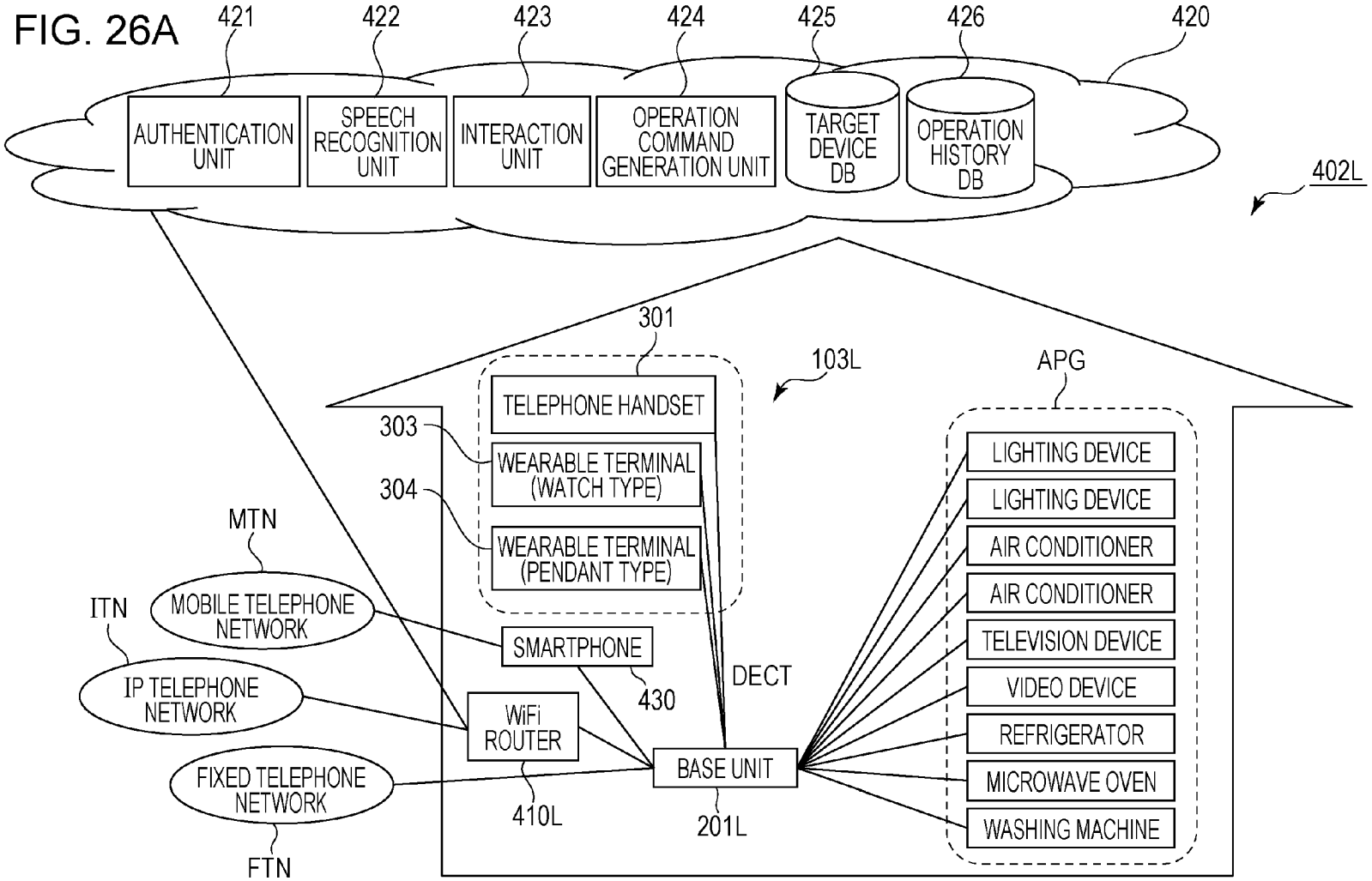
FIG. 26A is a conceptual diagram of a control system according to Embodiment 24.
Figure 26B:
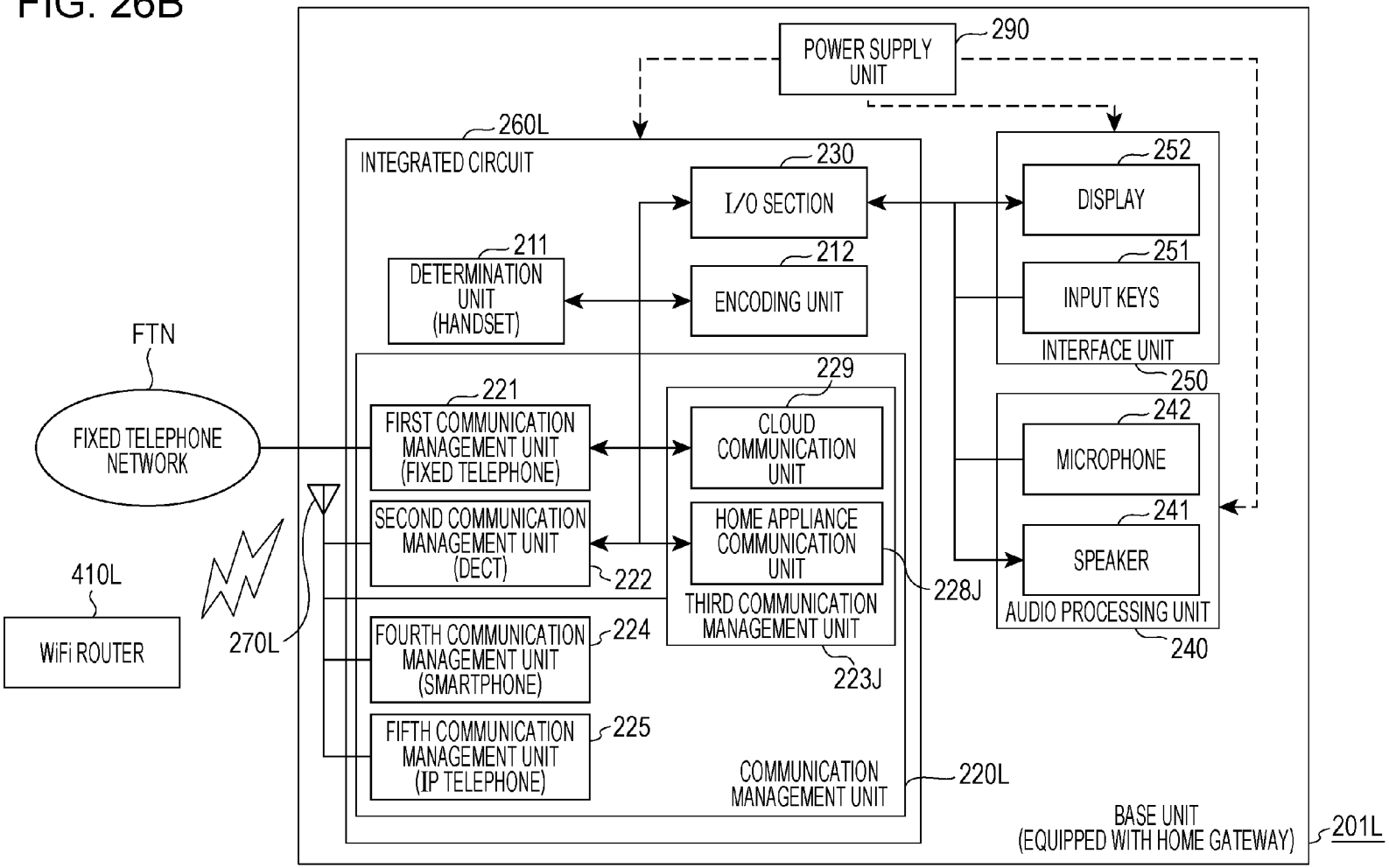
FIG. 26B is a schematic block diagram of a base unit in the control system illustrated in FIG. 26A.

FIG. 26A is a conceptual diagram of a control system 402L according to Embodiment 24. FIG. 26B is a schematic block diagram of a base unit 201L in the control system 402L. The control system 402L will be described with reference to FIG. 26A and FIG. 26B. Numerals common to Embodiment 11, Embodiment 23, and Embodiment 24 designate components having substantially the same function as those in Embodiment 11 and/or Embodiment 23. Thus, these components are identified using the description made in Embodiment 11 and/or Embodiment 23.

Similarly to Embodiment 11, the control system 402L includes a cloud server 420 and a smartphone 430. These components are identified using the description made in Embodiment 11.

The control system 402L further includes a cordless telephone device 103L and a WiFi router 410L.

Similarly to Embodiment 11, the cordless telephone device 103L includes a telephone handset 301 and two wearable terminals 303 and 304. These components are identified using the description made in Embodiment 11.

The cordless telephone device 103L includes a base unit 201L. The base unit 201L is connected to the WiFi router 410L, the smartphone 430, and the fixed telephone network FTN so that the base unit 201L can communicate with the WiFi router 410L, the smartphone 430, and the fixed telephone network FTN. The base unit 201L is connected to the telephone handset 301 and the wearable terminals 303 and 304 so that the base unit 201L can communicate with the telephone handset 301 and the wearable terminals 303 and 304 through a TDD-TDMA scheme complying with the DECT standard.

The WiFi router 410L is connected to the cloud server 420 and an IP telephone network ITN. This enables the user to have a conversation with an intended party via the IP telephone network ITN.

Similarly to Embodiment 23, the base unit 201L includes a power supply unit 290, an audio processing unit 240, and an interface unit 250. These components are identified using the description made in Embodiment 23.

The base unit 201L further includes an integrated circuit 260L and an antenna unit 270L. The antenna unit 270L receives signals from the telephone handset 301 and the wearable terminals 303 and 304 through a multiplexing scheme. The integrated circuit 260L processes the signals received by the antenna unit 270L.

Similarly to Embodiment 23, the integrated circuit 260L includes a determination unit 211, an encoding unit 212, and an I/O section 230. These components are identified using the description made in Embodiment 23.

The integrated circuit 260L further includes a communication management unit 220L. The communication management unit 220L manages communication with the fixed telephone network FTN and the WiFi router 410L.

Similarly to Embodiment 23, the communication management unit 220L includes a first communication management unit 221, a second communication management unit 222, a third communication management unit 223J, and a fourth communication management unit 224. These components are identified using the description made in Embodiment 23.

The communication management unit 220L further includes a fifth communication management unit 225. The antenna unit 270L receives signals from the WiFi router 410L and the smartphone 430. Additionally, the antenna unit 270L transmits a signal to the WiFi router 410L and the smartphone 430. The antenna unit 270L is connected to the second communication management unit 222, the third communication management unit 223J, the fourth communication management unit 224, and the fifth communication management unit 225. The fifth communication management unit 225 manages communication with the IP telephone network ITN. When the user requests to make a conversation with an intended party via the IP telephone network ITN, the fifth communication management unit 225 manages the communication of signals via the IP telephone network ITN.

Embodiment 25

As described in connection with Embodiment 8, the control system may include a plurality of telephone handsets. The plurality of telephone handsets may be located in different rooms. In this case, a home electric appliance installed in a room where the telephone handset in use is located may be preferentially subject to remote control. In Embodiment 25, a description will be given of a control system including a plurality of telephone handsets.

Figure 27:
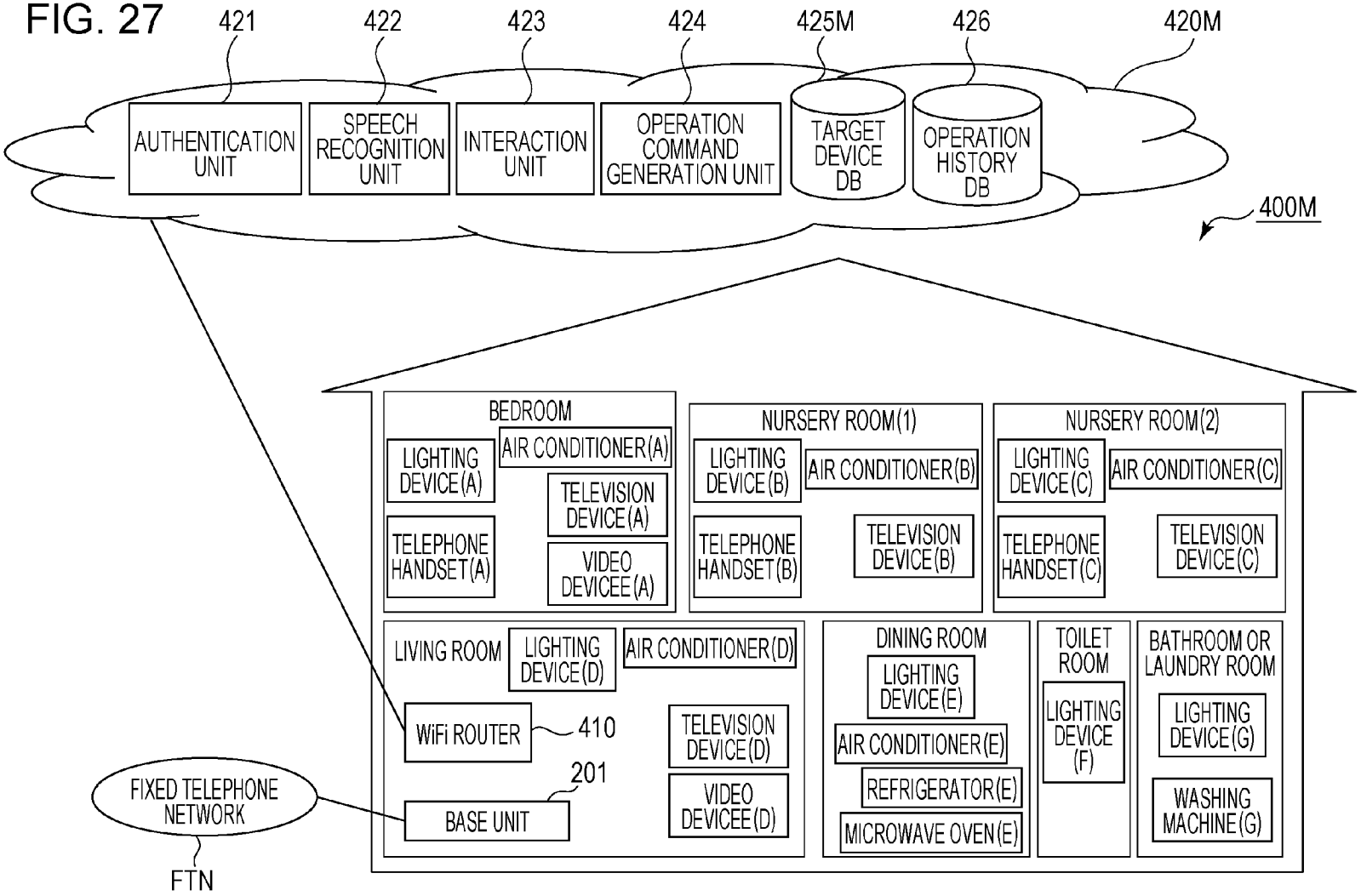
FIG. 27 is a conceptual diagram of a control system according to Embodiment 25.

FIG. 27 is a conceptual diagram of a control system 400M according to Embodiment 25. The control system 400M will be described with reference to FIG. 27. Numerals common to Embodiment 8 and Embodiment 25 designate components having substantially the same function as those in Embodiment 8. Thus, these components are identified using the description made in Embodiment 8.

Similarly to Embodiment 8, the control system 400M includes a base unit 201 and a WiFi router 410. These components are identified using the description made in Embodiment 8.

The control system 400M further includes three telephone handsets (a telephone handset (A), a telephone handset (B), and a telephone handset (C)) and a cloud server 420M. The telephone handset (A) is located in a bedroom. The telephone handset (B) is located in a nursery room (1). The telephone handset (C) is located in a nursery room (2).

When the user requests to take remote control of a home electric appliance using the telephone handset (A), the cloud server 420M preferentially generates an operation command for the remote control of a home electric appliance installed in the bedroom. When the user requests to take remote control of a home electric appliance using the telephone handset (B), the cloud server 420M preferentially generates an operation command for the remote control of a home electric appliance installed in the nursery room (1). When the user requests to take remote control of a home electric appliance using the telephone handset (C), the cloud server 420M preferentially generates an operation command for the remote control of a home electric appliance installed in the nursery room (2).

Similarly to Embodiment 8, the control system 400M includes an authentication unit 421, a speech recognition unit 422, an interaction unit 423, an operation command generation unit 424, and an operation history database 426. These components are identified using the description made in Embodiment 8.

The control system 400M further includes a target device database 425M. The target device database 425M stores data for setting priorities for home electric appliances to be controlled.

FIG. 28 is a table showing illustrative data stored in the target device database 425M. The data stored in the target device database 425M will be described with reference to FIG. 27 and FIG. 28.

As illustrated in FIG. 27, the user has seven lighting devices. In some cases, it may be difficult for the speech recognition unit 422 to recognize which lighting device among the seven lighting devices the user wishes to take remote control of. In response to a request from the user using the telephone handset (A) to turn on a lighting device, the operation command generation unit 424 refers to the target device database 425M and the operation history database 426. If the lighting device (A) is on while the lighting device (D) is off, the operation command generation unit 424 selects the lighting device (D) as the target of remote control.

Embodiment 26

As described in connection with Embodiment 9, a handset connected to a base unit so that the handset and the base unit can communicate with each other may be designed as a wearable terminal. Since a wearable terminal changes its position as the user wearing it moves, the wearable terminal may have a function to acquire position information. In this case, the control system may refer to the position of the wearable terminal and determine a home electric appliance to be subject to remote control. In Embodiment 26, a description will be given of a wearable terminal having a function to acquire position information.

Figure 29:
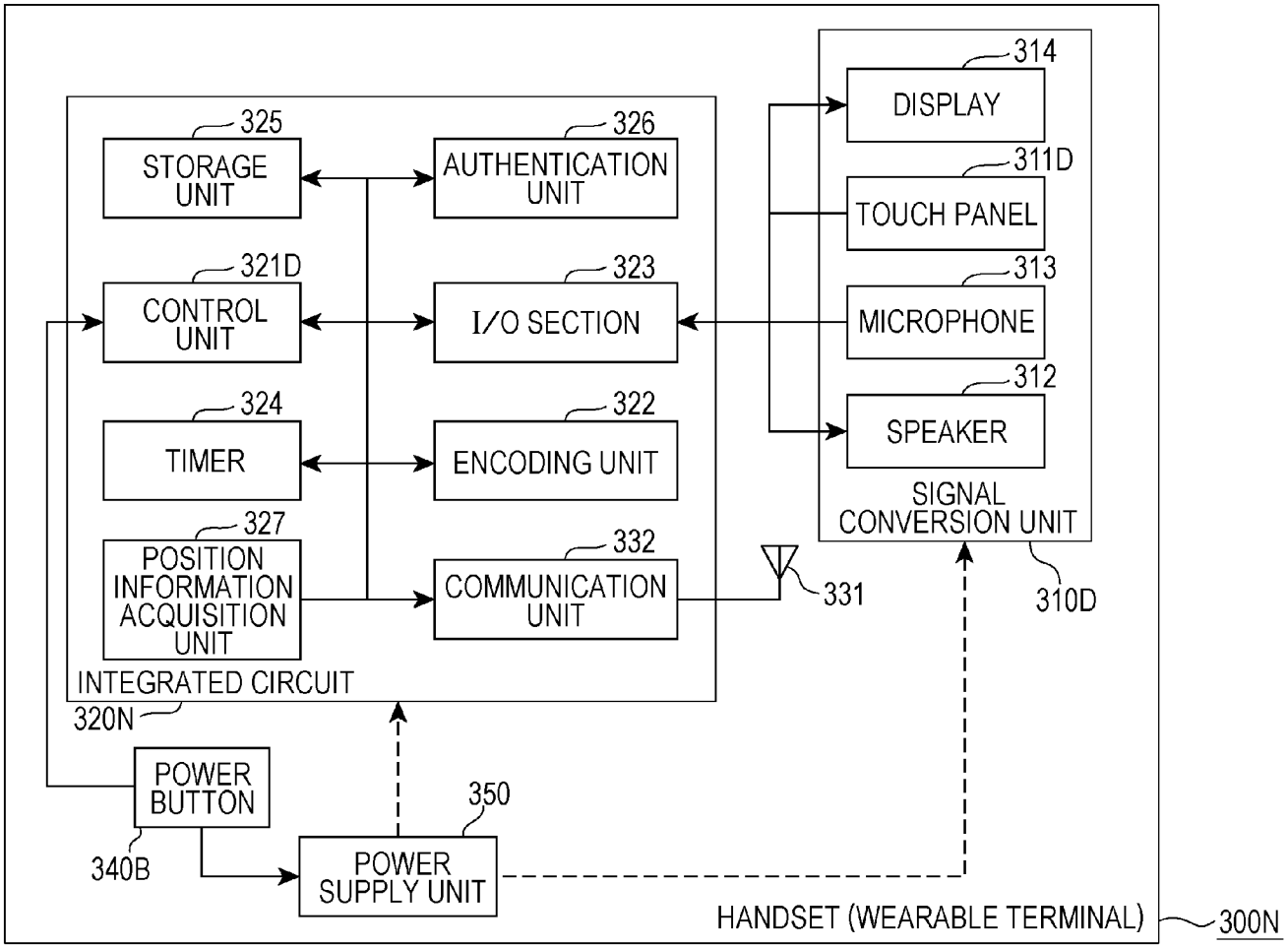
FIG. 29 is a schematic block diagram of a wearable terminal according to Embodiment 26.

FIG. 29 is a schematic block diagram of a wearable terminal 300N according to Embodiment 26. The wearable terminal 300N will be described with reference to FIG. 29. Numerals common to Embodiment 9 and Embodiment 26 designate components having substantially the same function as those in Embodiment 9. Thus, these components are identified using the description made in Embodiment 9.

The designer may design the wearable terminal 300N so that the wearable terminal 300N is wearable on a user's wrist. In this case, the designer may determine the design of the wearable terminal 300N so that the wearable terminal 300N looks like a watch or a bangle. The designer may design the wearable terminal 300N so that the wearable terminal 300N is wearable on a user's finger. In this case, the designer may determine the design of the wearable terminal 300N so that the wearable terminal 300N looks like a ring. The designer may design the wearable terminal 300N so that the wearable terminal 300N can hang from the user's neck. In this case, the designer may determine the design of the wearable terminal 300N so that the wearable terminal 300N looks like a pendant or a necklace. The basic concept of this embodiment is not limited to a specific position at which the wearable terminal 300N is worn or a specific design of the wearable terminal 300N.

Similarly to Embodiment 9, the wearable terminal 300N includes a signal conversion unit 310D, an antenna unit 331, a power button 340B, and a power supply unit 350. These components are identified using the description made in Embodiment 9.

The wearable terminal 300N further includes an integrated circuit 320N. Similarly to Embodiment 9, the integrated circuit 320N is responsible for various forms of signal processing such as signal processing for establishing a connection with the telephone of the intended party, signal processing for switching the operation mode between the first operation mode and the second operation mode, signal processing for generating bit information and streams, and signal processing for authenticating the user. The signal processing technique described in connection with Embodiment 9 is applied to the integrated circuit 320N.

Similarly to Embodiment 9, the integrated circuit 320N includes a control unit 321D, an encoding unit 322, an I/O section 323, a timer 324, a storage unit 325, an authentication unit 326, and a communication unit 332.

The integrated circuit 320N further includes a position information acquisition unit 327. The position information acquisition unit 327 acquires position information concerning the position of the wearable terminal 300N by using global positioning system (GPS) technology. The position information acquisition unit 327 generates a position signal representing the position information. The position signal is output from the position information acquisition unit 327 to the communication unit 332. The communication unit 332 transmits the position signal from the antenna unit 331.

Figure 30:
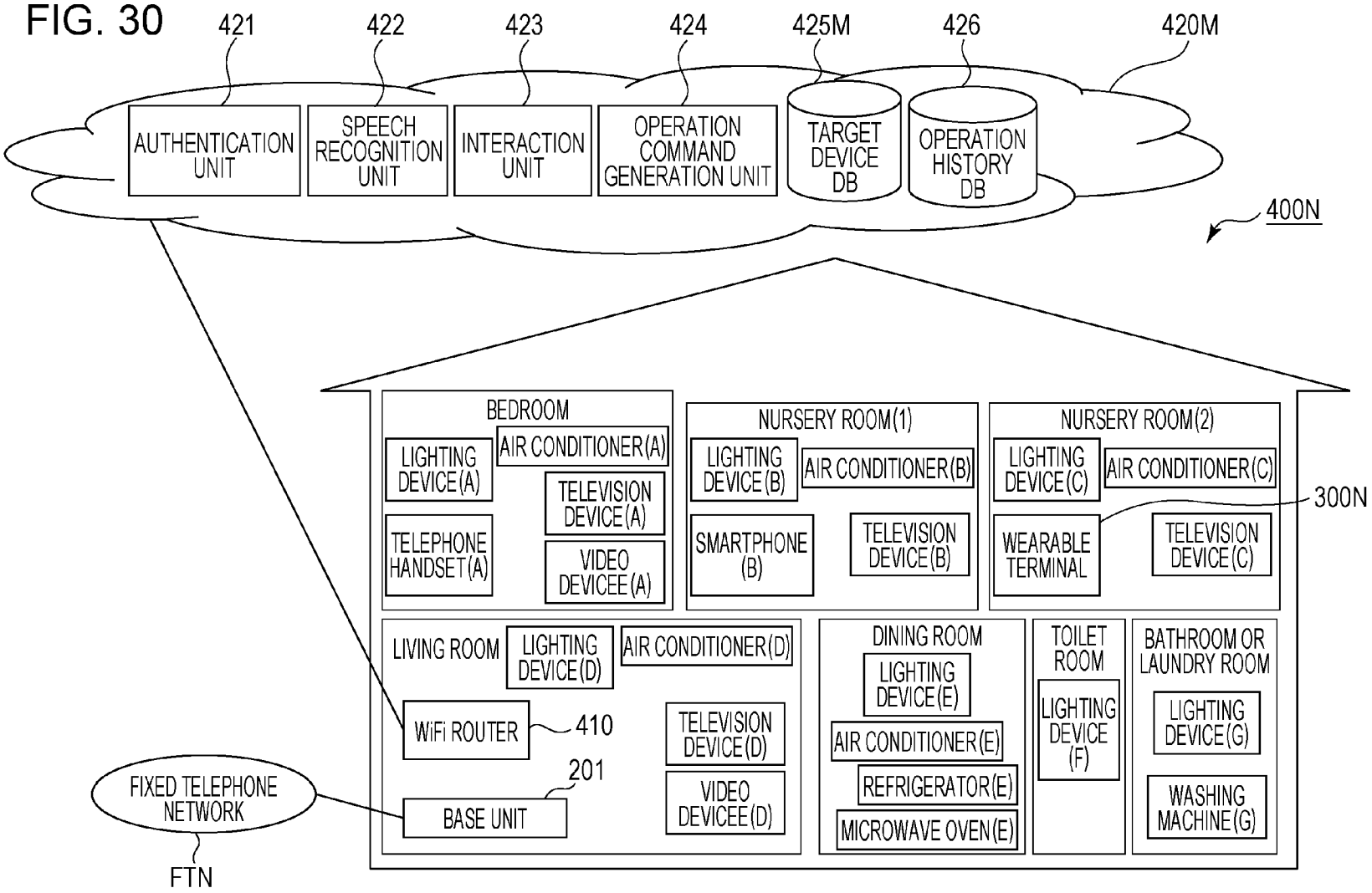
FIG. 30 is a conceptual diagram of a control system including the wearable terminal illustrated in FIG. 29.

FIG. 30 is a conceptual diagram of a control system 400N including the wearable terminal 300N. The control system 400N will be described with reference to FIG. 30. Numerals common to Embodiment 25 and Embodiment 26 designate components having substantially the same function as those in Embodiment 25. Thus, these components are identified using the description made in Embodiment 25.

Similarly to Embodiment 25, the control system 400N includes a base unit 201, a WiFi router 410, a telephone handset (A), and a cloud server 420M. These components are identified using the description made in Embodiment 25.

The control system 400N further includes the wearable terminal 300N described above. The wearable terminal 300N is located in the nursery room (2).

FIG. 31 is a table showing illustrative data stored in the target device database 425M. The data stored in the target device database 425M will be described with reference to FIG. 30 and FIG. 31.

As illustrated in FIG. 30, the user has seven lighting devices. In some cases, it may be difficult for the speech recognition unit 422 to recognize which lighting device among the seven lighting devices the user wishes to take remote control of. In response to a request from the user using the wearable terminal 300N in the nursery room (2) to turn on a lighting device, the operation command generation unit 424 refers to the target device database 425M and the operation history database 426. If the lighting device (C) is on while the lighting device (D) is off, the operation command generation unit 424 selects the lighting device (D) as the target of remote control.

Embodiment 27

A home electric appliance group that is controllable by the control system described in connection with Embodiment 8 may include a controller for controlling a home electric appliance. In Embodiment 27, a description will be given of an illustrative method for using a control system will be described.

Figure 32:
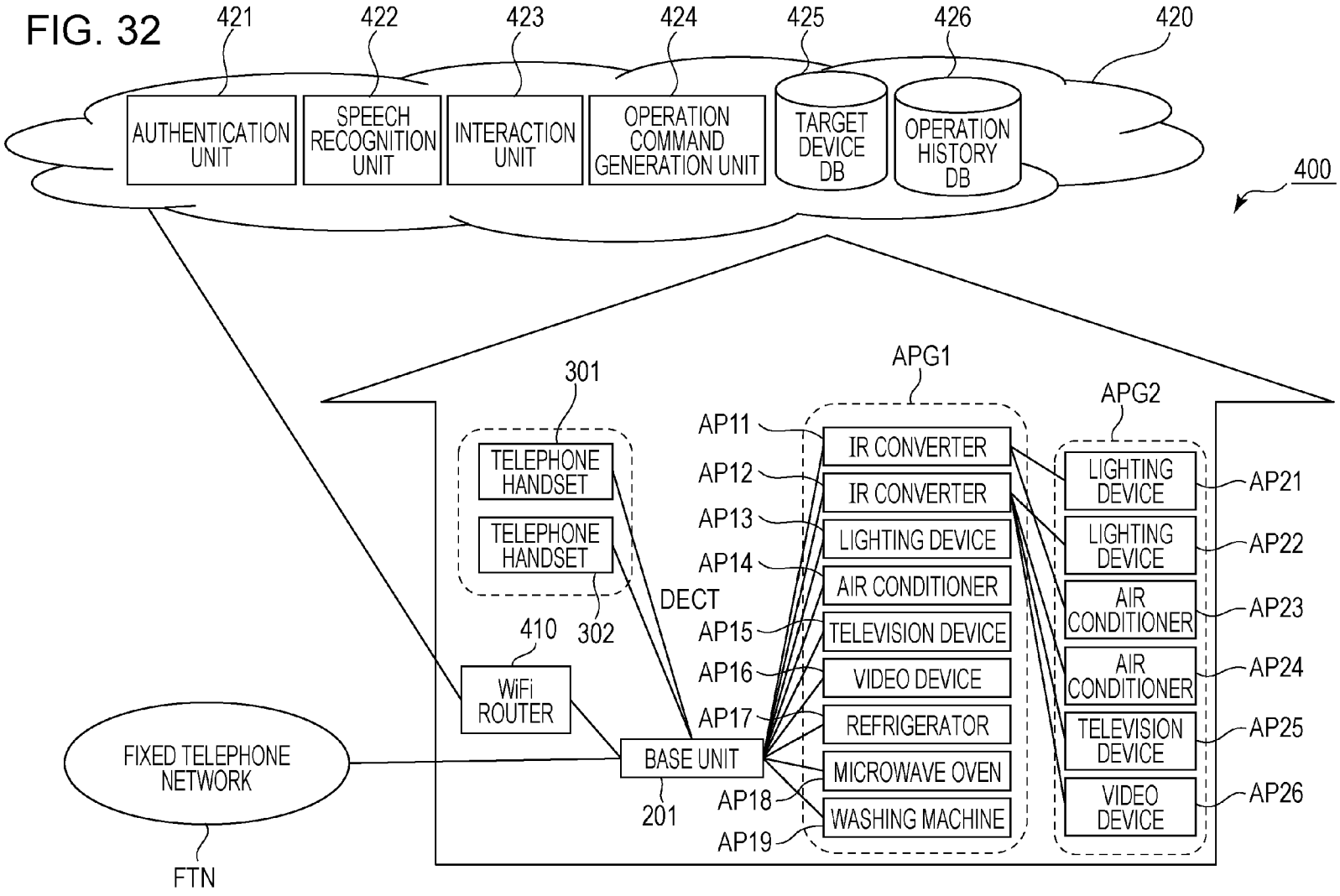
FIG. 32 is a conceptual diagram of a method for using the control system illustrated in FIG. 8 (Embodiment 27)

FIG. 32 is a conceptual diagram of a method for using the control system 400. An illustrative method for using the control system 400 will be described with reference to FIG. 32.

The control system 400 is configured to directly control a first home electric appliance group APG1. An operation command generated by the control system 400 is transmitted to the first home electric appliance group APG1 via the WiFi router 410 or Ethernet.

The first home electric appliance group APG1 includes infrared (IR) converters AP11 and AP12, a lighting device AP13, an air conditioner AP14, a television device AP15, a video device AP16, a refrigerator AP17, a microwave oven AP18, and a washing machine AP19. The IR converters AP11 and AP12 generate a control signal (infrared signal) for controlling a second home electric appliance group APG2 in accordance with an operation command received from the control system 400. The control signal is transmitted from the IR converters AP11 and AP12 to the second home electric appliance group APG2.

The second home electric appliance group APG2 includes lighting devices AP21 and AP22, air conditioners AP23 and AP24, a television device AP25, and a video device AP26. The IR converters AP11 and AP12 refer to the operation command, and select a home electric appliance to be operated from within the second home electric appliance group APG2. The IR converters AP11 and AP12 transmit a control signal to the selected home electric appliance. The selected home electric appliance executes the operation specified by the control signal.

Embodiment 28

The control system described in connection with the various embodiments described above may employ the DECT standard for communication between the handset and the base unit. The DECT standard specifies the use of audio codec schemes such as 32 kbit/s full term (Adaptive Differential Pulse Code Modulation (ADPCM)) G.726, 64 kbit/s Pulse Code Modulation (PCM) G.711, Wideband speech codec G.722 at 64 kbit/s, Wideband speech codec G.729.1 up to 32 kbit/s, 64 kbit/s Moving Picture Expert Group 4 (MPEG-4) Error Resilient (ER) Advanced Audio Coding-Low Delay (AAC-LD) codec, and 32 kbit/s MPEC-4 ER AAC-LD codec. The handset may use one of the above-described audio codec schemes to encode a call stream. The handset may use another of the above-described audio codec schemes to encode an instruction stream. In this case, the use of different audio codec schemes may serve as an index for differentiating the call stream and the instruction stream from each other, resulting in a reduction in the number of bits of a signal transmitted from the handset to the base unit. For example, the instruction stream may be encoded using an audio encoding scheme with a higher bit rate than the call stream. In Embodiment 28, a description will be given of a wearable terminal configured to encode an instruction stream using an audio encoding scheme different from that of a call stream.

Figure 33:
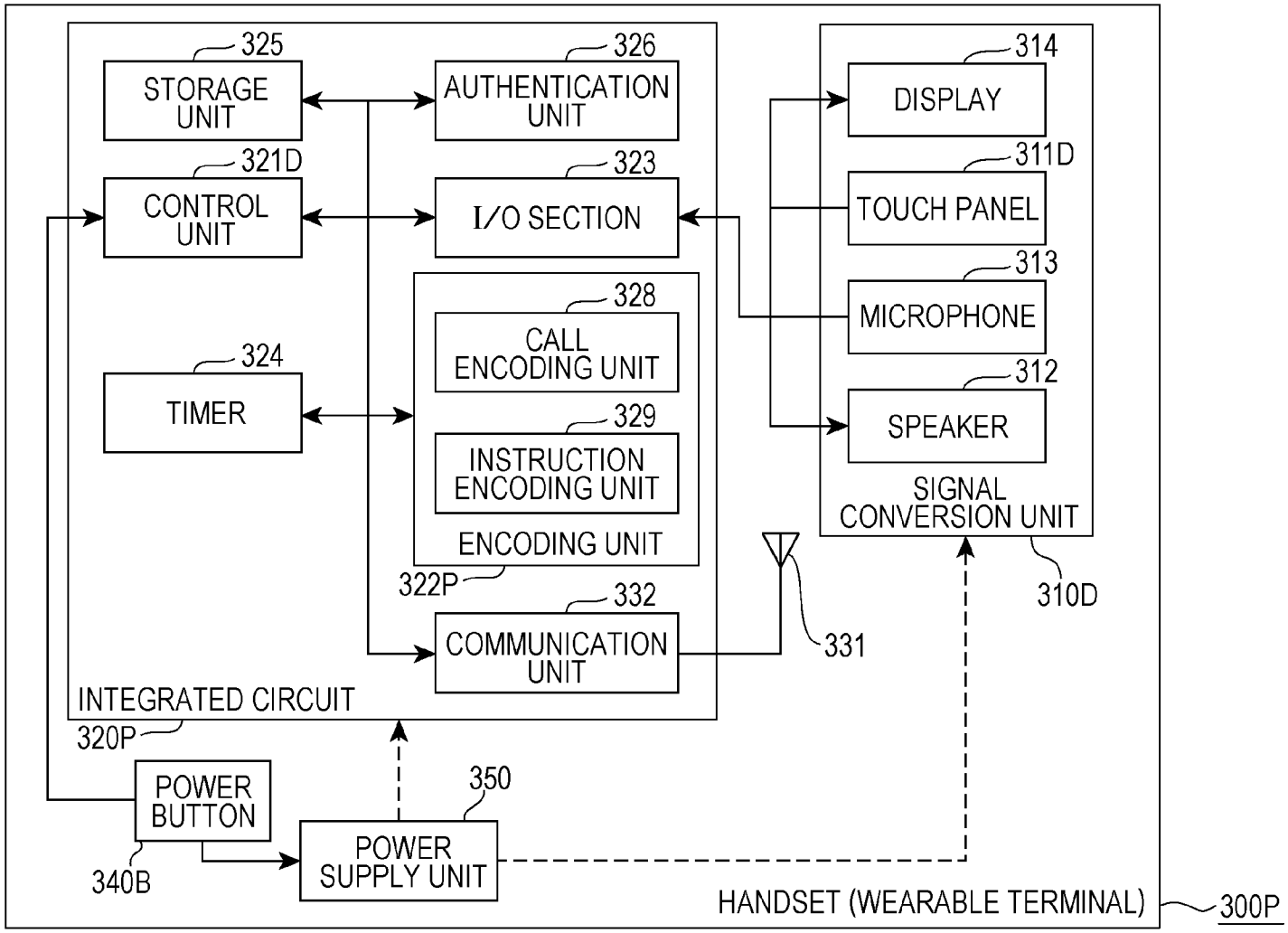
FIG. 33 is a schematic block diagram of a wearable terminal according to Embodiment 28.

FIG. 33 is a schematic block diagram of a wearable terminal 300P according to Embodiment 28. The wearable terminal 300P will be described with reference to FIG. 10 and FIG. 33. Numerals common to Embodiment 9 and Embodiment 28 designate components having substantially the same function as those in Embodiment 9. Thus, these components are identified using the description made in Embodiment 9.

The wearable terminal 300P may be used as each of the wearable terminals 303 and 304 described with reference to FIG. 10. Accordingly, the wearable terminal 300P is connected to the base unit 201 so that the wearable terminal 300P and the base unit 201 can communicate with each other through a multiplexing scheme complying with the DECT standard.

Similarly to Embodiment 9, the wearable terminal 300P includes a signal conversion unit 310D, an antenna unit 331, a power button 340B, and a power supply unit 350. These components are identified using the description made in Embodiment 9.

The wearable terminal 300P further includes an integrated circuit 320P. The integrated circuit 320P is responsible for various forms of signal processing such as signal processing for establishing a connection with the telephone of the intended party, signal processing for switching the operation mode between the first operation mode and the second operation mode, and signal processing for authenticating the user. The signal processing technique described in connection with Embodiment 9 is applied to the integrated circuit 320P.

Similarly to Embodiment 9, the integrated circuit 320P includes a control unit 321D, an I/O section 323, a timer 324, a storage unit 325, an authentication unit 326, and a communication unit 332. These components are identified using the description made in Embodiment 9.

The integrated circuit 320P further includes an encoding unit 322P. The encoding unit 322P includes a call encoding unit 328 and an instruction encoding unit 329. The call encoding unit 328 encodes a call stream. The instruction encoding unit 329 encodes an instruction stream.

For example, the call encoding unit 328 may encode a call stream using 32 kbit/s full term (ADPCM) G.726. The instruction encoding unit 329 may encode an instruction stream using 64 kbit/s PCM G.711 or 64 kbit/s MPEG-4 ER AAC-LD codec.

Embodiment 29

Similarly to the handset described in connection with Embodiment 28, the base unit may execute an encoding process using an audio codec scheme complying with the DECT standard. The DECT standard specifies the use of audio codec schemes such as 32 kbit/s full term (ADPCM) G.726, 64 kbit/s PCM G.711, Wideband speech codec G.722 at 64 kbit/s, Wideband speech codec G.729.1 up to 32 kbit/s, 64 kbit/s MPEG-4 ER AAC-LD codec, and 32 kbit/s MPEC-4 ER AAC-LD codec. The base unit may use one of the above-described audio codec schemes to encode a call stream. The base unit may use another of the above-described audio codec schemes to encode an instruction stream. In this case, the use of different audio codec schemes may serve as an index for differentiating the call stream and the instruction stream from each other, resulting in a reduction in the number of bits of a signal used for communication between the handset and the base unit. For example, the instruction stream may be encoded using an audio encoding scheme with a higher bit rate than the call stream. In Embodiment 29, a description will be given of a base unit configured to encode an instruction stream using an audio encoding scheme different from that of a call stream.

Figure 34:
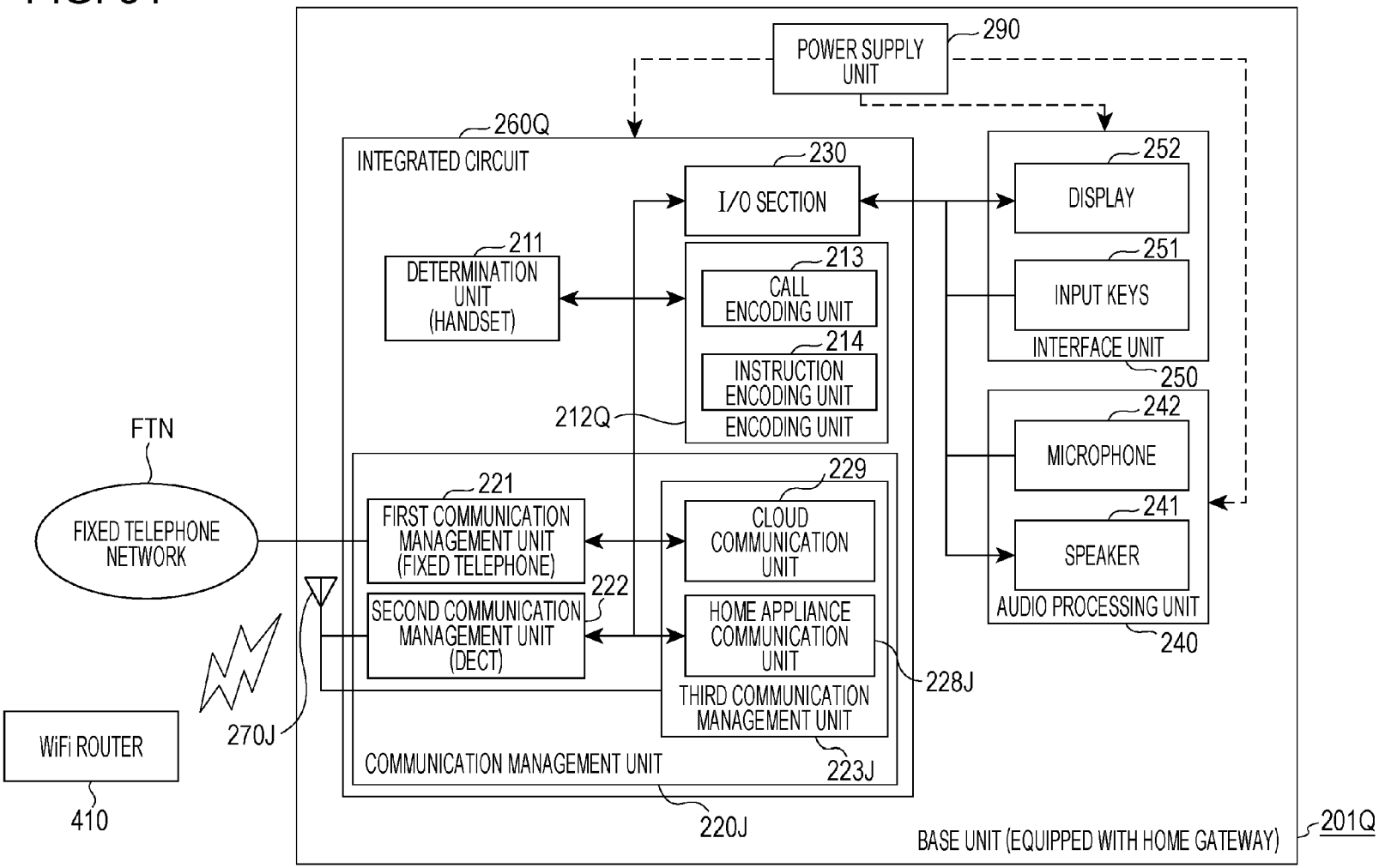
FIG. 34 is a schematic block diagram of a base unit according to Embodiment 29.

FIG. 34 is a schematic block diagram of a base unit 201Q according to Embodiment 29. The base unit 201Q will be described with reference to FIG. 34. Numerals common to Embodiment 22 and Embodiment 29 designate components having substantially the same function as those in Embodiment 22. Thus, these components are identified using the description made in Embodiment 22.

Similarly to Embodiment 22, the base unit 201Q includes a power supply unit 290, an audio processing unit 240, an interface unit 250, and an antenna unit 270J. These components are identified using the description made in Embodiment 22.

The base unit 201Q further includes an integrated circuit 260Q. The integrated circuit 260Q processes a signal received by the antenna unit 270J.

Similarly to Embodiment 22, the integrated circuit 260Q includes a determination unit 211, a communication management unit 220J, and an I/O section 230. These components are identified using the description made in Embodiment 22.

The integrated circuit 260Q further includes an encoding unit 212Q. The encoding unit 212Q includes a call encoding unit 213 and an instruction encoding unit 214. The call encoding unit 213 encodes a call stream. Additionally, the call encoding unit 213 encodes an electrical signal generated by the microphone 242. The instruction encoding unit 214 encodes an instruction stream.

For example, the call encoding unit 213 may encode the call stream using 32 kbit/s full term (ADPCM) G.726. The instruction encoding unit 214 may encode the instruction stream using 64 kbit/s PCM G.711 or 64 kbit/s MPEG-4 ER AAC-LD codec.

Embodiment 30

The instruction stream described in connection with the various embodiments described above is transmitted to a cloud server via a public communication line different from the public communication line used for the transmission of the call stream. Alternatively, the instruction stream may be transmitted or received using a public communication line that is common to the call stream. In Embodiment 30, a description will be given of a control system that uses a common public communication line for the communication of the call stream and the instruction stream.

Figure 35:
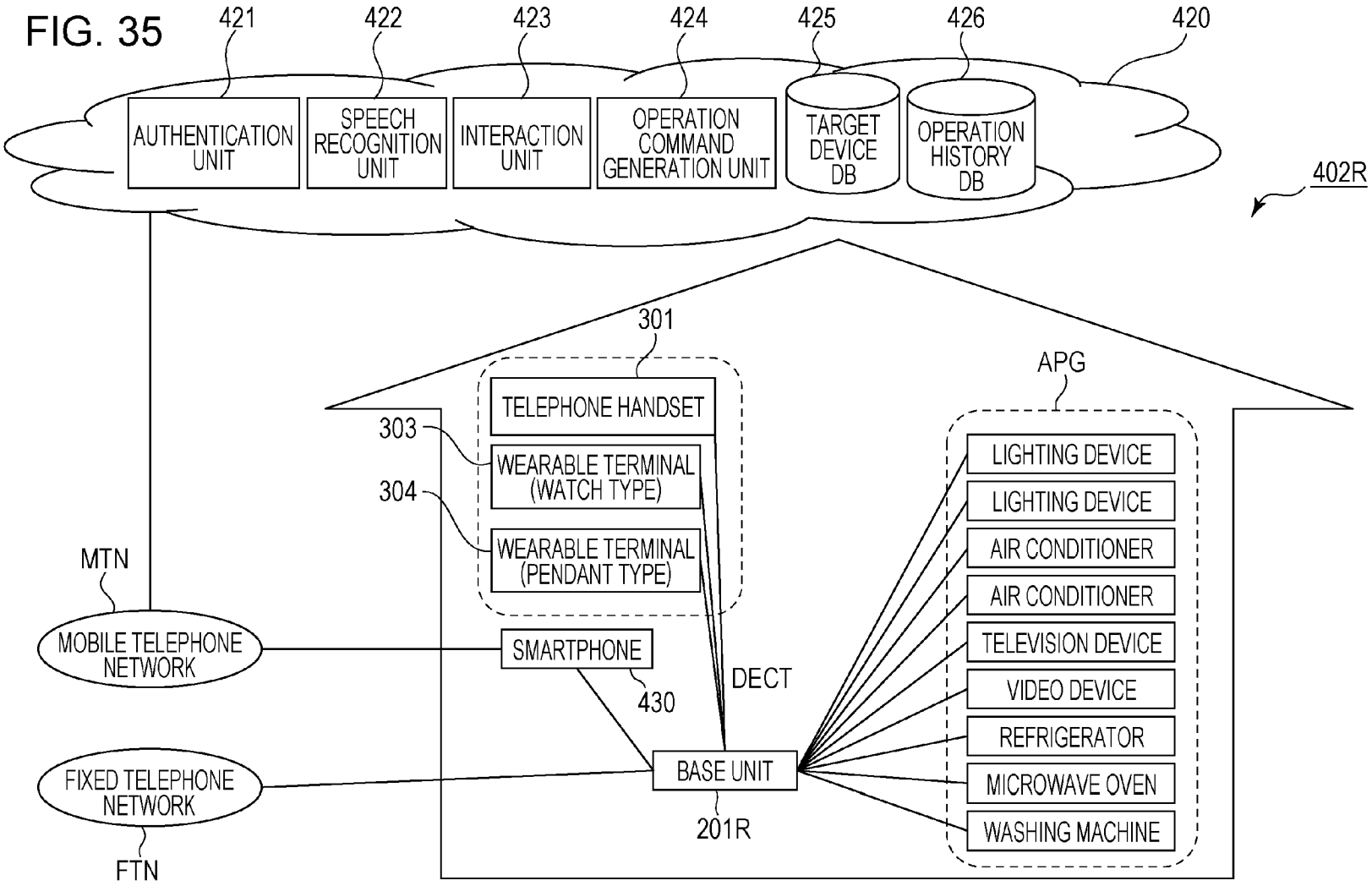
FIG. 35 is a conceptual diagram of a control system according to Embodiment 30.

FIG. 35 is a conceptual diagram of a control system 402R according to Embodiment 30. The control system 402R will be described with reference to FIG. 35. Numerals common to Embodiment 11 and Embodiment 30 designate components having substantially the same function as those in Embodiment 11. Thus, these components are identified using the description made in Embodiment 11.

Similarly to Embodiment 11, the control system 402R includes a telephone handset 301, two wearable terminals 303 and 304, a cloud server 420, and a smartphone 430. These components are identified using the description made in Embodiment 11.

The control system 402R further includes a base unit 201R. Similarly to Embodiment 11, the base unit 201R has the function of a telephone, and the function of a home gateway. Additionally, the base unit 201R also has the function of a WiFi router.

The base unit 201R enables a user to have a conversation with an intended party via the smartphone 430 and via the mobile telephone network MTN in accordance with the subscriber identity module (SIM) identity allocated to the smartphone 430. The user is also able to have a conversation with an intended party via the mobile telephone network MTN by using the telephone handset 301 or the wearable terminal 303 or 304. Accordingly, the call stream is communicated via the mobile telephone network MTN.

The subscription to use the mobile telephone network MTN may involve an authentication process for allocating SIM identity to the telephone handset 301, the wearable terminals 303 and 304, the base unit 201R, and the smartphone 430.

Similarly to the call stream, the instruction stream is transmitted to the cloud server 420 via the mobile telephone network MTN. The operation command is transmitted to the base unit 201R via the mobile telephone network MTN. Accordingly, the subscription for the same line enables the user to seamlessly perform operations, that is, making a telephone call and taking remote control of a home electric appliance. This may improve user convenience. Additionally, the basic concept of this embodiment is beneficial to the user in terms of the fee for the line for telephone calls. In this embodiment, the common public communication line is exemplified by a communication line including the mobile telephone network MTN. The second instruction stream is exemplified by the instruction stream output from the base unit 201R. The second call stream is exemplified by the call stream output from the base unit 201R.

Embodiment 31

The wearable terminal described in connection with the various embodiments described above generates instruction bit information and an instruction stream in accordance with an operation of a power button. Alternatively, the wearable terminal may generate instruction bit information and an instruction stream in response to a specific gesture performed by the user. In Embodiment 31, a description will be given of a wearable terminal that generates instruction bit information and an instruction stream in accordance with a gesture of a user.

Figure 36:
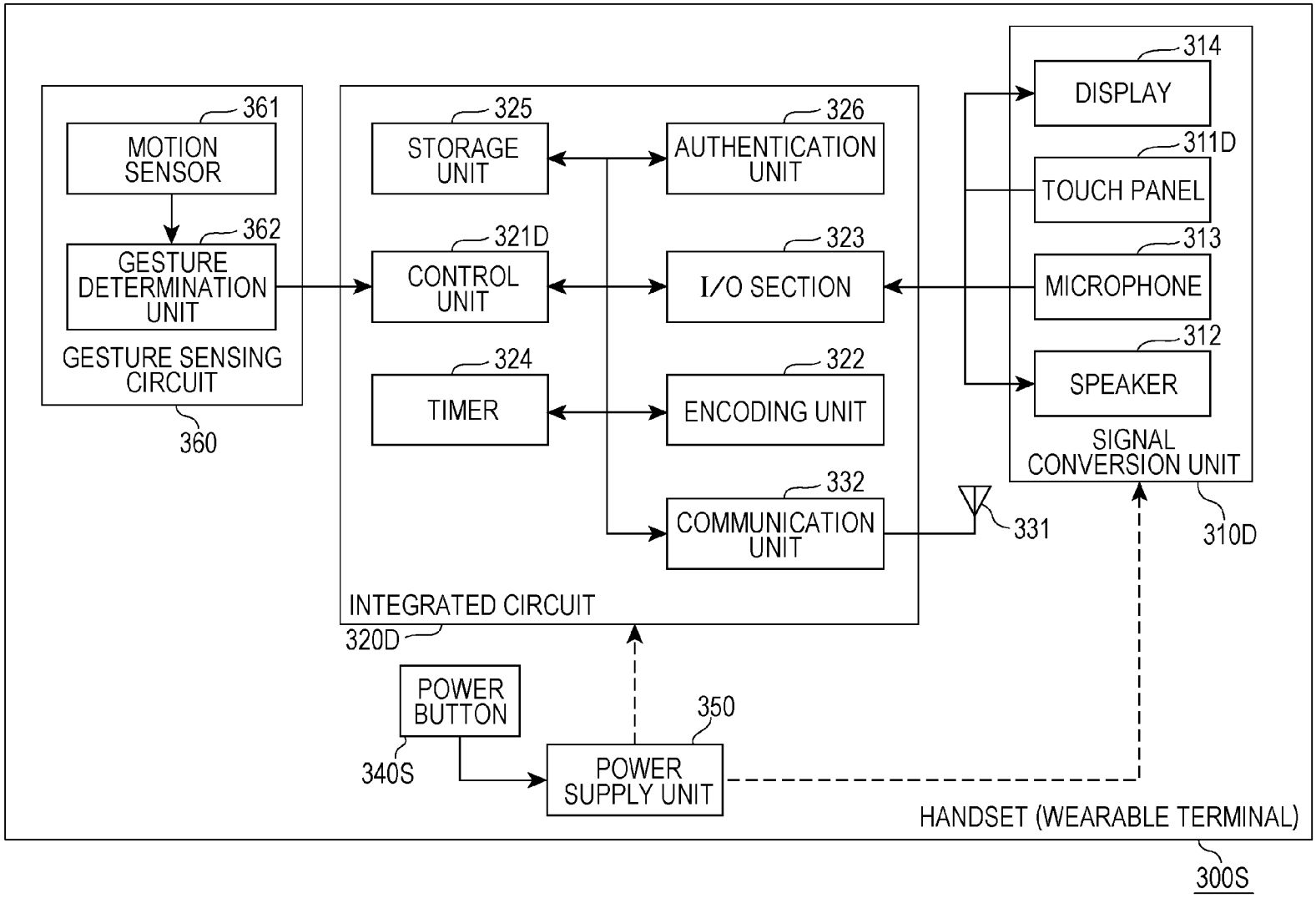
FIG. 36 is a schematic block diagram of a wearable terminal according to Embodiment 31.

FIG. 36 is a schematic block diagram of a wearable terminal 300S according to Embodiment 31. The wearable terminal 300S will be described with reference to FIG. 36. Numerals common to Embodiment 9 and Embodiment 31 designate components having substantially the same function as those in Embodiment 9. Thus, these components are identified using the description made in Embodiment 9.

The wearable terminal 300S is designed to be wearable on a user's upper limb. The term "upper limb", as used herein, refers to a body portion of a user extending from the shoulder to the fingertip. The wearable terminal 300S may be designed to be wearable on a user's wrist. Alternatively, the wearable terminal 300S may be designed to be wearable on a user's finger. The basic concept of this embodiment is not limited to a specific position at which is the wearable terminal 300S is worn.

When the wearable terminal 300S is designed to be wearable on a user's wrist, the wearable terminal 300S may look like a watch. When the wearable terminal 300S is designed to be wearable on a user's finger, the wearable terminal 300S may look like a ring. The designer of the wearable terminal 300S may determine the design of the wearable terminal 300S so as to be suitable for the position at which the wearable terminal 300S is worn. Accordingly, the basic concept of this embodiment is not limited to a specific design of the wearable terminal 300S.

Similarly to Embodiment 9, the wearable terminal 300S includes a signal conversion unit 310D, an integrated circuit 320D, an antenna unit 331, and a power supply unit 350. These components are identified using the description made in Embodiment 9.

The wearable terminal 300S further includes a power button 340S and a gesture sensing circuit 360. Similarly to Embodiment 9, the power button 340S is used to determine whether to supply power from the power supply unit 350 or to stop the supply of power from the power supply unit 350. Unlike Embodiment 9, a trigger signal for requesting the generation of instruction bit information and an instruction stream is generated by the gesture sensing circuit 360 rather than the power button 340S.

The gesture sensing circuit 360 includes a motion sensor 361 and a gesture determination unit 362. The motion sensor 361 detects a motion of the upper limb. The motion sensor 361 outputs motion data representing the motion of the upper limb. The motion sensor 361 may be an acceleration sensor. Alternatively, the motion sensor 361 may be an angular velocity sensor. The gesture determination unit 362 determines, based on the motion data, whether or not the user has requested the generation of instruction bit information and an instruction stream. When determining that the user has requested the generation of instruction bit information and an instruction stream, the gesture determination unit 362 generates a trigger signal. The trigger signal is output from the gesture determination unit 362 to the control unit 321D.

Figure 37:
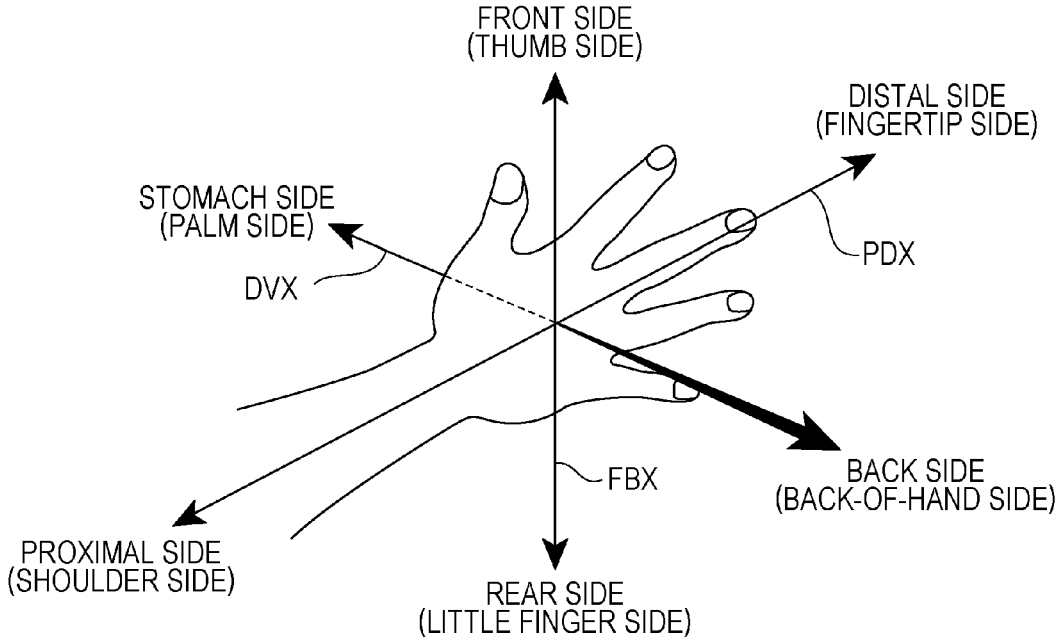
FIG. 37 is a conceptual diagram of a three-dimensional coordinate system that is set for a user's upper limb.

FIG. 37 is a conceptual diagram of a three-dimensional coordinate system that is set for the upper limb. A motion detection technique of the motion sensor 361 will be described with reference to FIG. 36 and FIG. 37.

The motion sensor 361 detects a motion of the upper limb in the direction of a first axis DVX. A coordinate axis extending along the extended upper limb, from the shoulder to the fingertip, in the vertically downward oriented direction of the upper limb is hereinafter referred to as a second axis PDX. A coordinate axis perpendicular to the second axis PDX and extending in the direction of movement of the user is hereinafter referred to as a third axis FBX. The first axis DVX is perpendicular to a coordinate plane defined by the second axis PDX and the third axis FBX.

The motion sensor 361 detects a movement of the upper limb in the extending direction of the first axis DVX perpendicular to the coordinate plane defined by the second axis PDX and the third axis FBX. A detection axis of a sensor used as the motion sensor 361 may be perpendicular to the coordinate plane defined by the second axis PDX and the third axis FBX. In this case, the motion sensor 361 may be able to accurately sense a motion (e.g., acceleration and/or angular velocity) in the direction extending along the first axis DVX. Alternatively, a detection axis of a sensor used as the motion sensor 361 may be inclined at an angle larger than 0° and smaller than 90° with respect to the coordinate plane defined by the second axis PDX and the third axis FBX. In this case, the motion sensor 361 can sense not only a motion in the direction extending along the first axis DVX but also a motion in a direction extending along the coordinate plane defined by the second axis PDX and the third axis FBX. The gesture determination unit 362 may apply a predetermined vector operation to the motion data output from the motion sensor 361, and individually evaluate the motion in the direction extending along the first axis DVX and the motion in the direction extending along the coordinate plane defined by the second axis PDX and the third axis FBX. The basic concept of this embodiment is not limited to a specific angle at which a detection axis of a sensor intersects the coordinate plane defined by the second axis PDX and the third axis FBX.

While the user is walking, the upper limbs frequently move in the direction indicated by the third axis FBX. When the user attempts to pick up an object far in front of them, the upper limb is extended, causing the wearable terminal 300S to be likely to move in the direction indicated by the second axis PDX. When the user attempts to pick up an object in front of their chest, the upper limb bends, causing the wearable terminal 300S to be likely to move in the direction indicated by the second axis PDX. The user's motions described above frequently occur. By comparison with motions in the directions indicated by the third axis FBX and the second axis PDX, the motion of the upper limb in the direction indicated by the first axis DVX does not frequently occur. That is, the user does not usually move the upper limb quickly and/or a large amount in the direction indicated by the first axis DVX.

When the motion sensor 361 senses a motion of the upper limb (i.e., the wearable terminal 300S) in the direction indicated by the first axis DVX, the instruction bit information and the instruction stream are generated under control of the control unit 321D. Thus, the remote control of a home electric appliance is not likely to start in response to an accidental or unintentional movement of the user. This may prevent or reduce inadvertent or unintentional operation of the home electric appliance.

FIG. 38 is a table depicting illustrative relationships between operations demanded by the user and operations performed on the wearable terminal 300S. Illustrative relationships between operations demanded by the user and operations performed on the wearable terminal 300S will be described with reference to FIG. 36 to FIG. 38.

When the user wishes to take remote control of a home electric appliance, the user may move the upper limb on which the wearable terminal 300S is worn in the direction indicated by the first axis DVX. When the user wishes to make a telephone call using the wearable terminal 300S, the user may press the power button 340S. When the user wishes to answer an incoming call on a smartphone with the wearable terminal 300S, the user may touch the touch panel 311D.

The basic concepts of the various embodiments described above may be used in combination to meet the request to control a home electric appliance.

The basic concepts of the embodiments described above are suitable for use in the control of a home electric appliance.

What is claimed is:

[1. A method for controlling a cordless telephone device including a base unit and a handset, for use in a system that allows remote control of a home electric appliance by using voice instructions of a user, the method comprising:

a first generation step of causing a first generation unit included in the handset to generate a first stream by encoding audio input via a sound receiving unit included in the handset;

a first transmission step of transmitting the first stream to the base unit, the first generation step including causing the first generation unit to generate instruction bit information indicating that the audio represents the voice instructions and to generate, as the first stream, a first instruction stream indicative of the voice instructions in a case where a first trigger indicating a request to start the remote control of the home electric appliance is given to the first generation unit, the first transmission step including transmitting the instruction bit information and the first instruction stream to the base unit through a common multiplexing scheme that is common to transmission of the first stream generated in a case where the first trigger is not given to the first generation unit.]

[2. The method according to claim 1, wherein the common multiplexing scheme is a Time Division Duplex/Time Division Multiple Access scheme complying with a Digital Enhanced Cordless Telecommunications standard.]

[3. The method according to claim 2, wherein in a case where the first trigger is not given to the first generation unit, the first generation step includes causing the first generation unit to generate call bit information indicating that the audio represents a voice call and to generate, as the first stream, a first call stream indicative of the audio.]

[4. The method according to claim 3, wherein the first generation step includes, in a case where the first generation unit receives the first trigger during generation of the first call stream, causing the first generation unit to generate the instruction bit information and the first instruction stream, and causing the first generation unit to switch an operation mode of the cordless telephone device from a call mode in which the audio is transferred to an intended party with which the user is engaged in the voice call to a mute mode in which transfer of the audio to the intended party is interrupted.]

[5. The method according to claim 4, wherein the first generation step includes causing the first generation unit to generate, during the mute mode, an alternative stream representing an alternative sound that replaces the audio, and the first transmission step includes transmitting the alternative stream to the base unit through the common multiplexing scheme.]

[6. The method according to claim 5, wherein the first generation step includes, in a case where the first generation unit receives a second trigger indicating a request to return to the call mode, (i) causing the first generation unit to terminate the mute mode, and (ii) causing the first generation unit to generate the call bit information and the first call stream.]

[7. The method according to claim 5, wherein the first generation step includes, after a certain period has elapsed since the mute mode began, (i) causing the first generation unit to terminate the mute mode, and (ii) causing the first generation unit to generate the call bit information and the first call stream.]

[8. The method according to claim 3, wherein the first generation step includes causing the first generation unit to generate, as the call bit information, information specifying an audio encoding scheme for the first call stream.]

[9. The method according to claim 8, wherein the first generation step includes causing the first generation unit to generate, as the call bit information, information specifying a bit rate for the first call stream.]

[10. The method according to claim 1, wherein the first generation step includes causing the first generation unit to generate, as the instruction bit information, information specifying an audio encoding scheme for the first instruction stream.]

[11. The method according to claim 10, wherein the first generation step includes causing the first generation unit to generate, as the instruction bit information, information specifying a bit rate for the first instruction stream.]

[12. The method according to claim 3, wherein the first generation step includes causing the first generation unit to encode the first instruction stream and the first call stream at a bit rate complying with the Digital Enhanced Cordless Telecommunications standard using an audio encoding scheme complying with the Digital Enhanced Cordless Telecommunications standard.]

[13. The method according to claim 1, wherein the first trigger is given to the first generation unit by predetermined movement given to the handset, predetermined audio given to the handset, or a predetermined operation given to the handset.]

[14. The method according to claim 4, further comprising:

a second generation step of generating a second stream corresponding to the first stream transmitted from the handset to the base unit; and a second transmission step of transmitting the second stream, wherein the second generation step includes (i) in a case where the base unit receives the instruction bit information and the first instruction stream, causing the base unit to generate a second instruction stream corresponding to the first instruction stream, and (ii) in a case where the base unit receives the call bit information and the first call stream, causing the base unit to generate a second call stream corresponding to the first call stream, and the second transmission step includes (iii) in a case where the base unit generates the second instruction stream, causing the base unit to transmit the second instruction stream to a server that generates a control command using the second instruction stream for controlling the home electric appliance, and (iv) in a case where the base unit generates the second call stream, transmitting the second call stream to a telephone of the intended party.]

[15. The method according to claim 14, wherein the second transmission step includes causing the base unit to selectively transmit the second instruction stream or the second call stream via a public communication line that is common to transmission of the second instruction stream and the second call stream.]

[16. The method according to claim 14, wherein the second transmission step includes (i) in a case where the base unit generates the second instruction stream, causing the base unit to transmit the second instruction stream via a first public communication line, and (ii) in a case where the base unit generates the second call stream, causing the base unit to transmit the second call stream via a second public communication line different from the first public communication line.]

[17. The method according to claim 14, wherein the second generation step includes causing the base unit to generate, during the mute mode, an alternative stream representing an alternative sound that replaces the audio, and the second transmission step includes, in a case where the base unit generates the alternative stream, transmitting the alternative stream to the telephone of the intended party.]

[18. A handset of a cordless telephone device for use in a system that allows remote control of a home electric appliance by using voice instructions of a user, the handset comprising:

a sound receiving unit configured to receive audio of the user;

a first generation unit configured to generate a first stream by encoding the audio input via the sound receiving unit; and a first transmission unit configured to transmit the first stream to a base unit of the cordless telephone device, the first generation unit being configured to generate instruction bit information indicating that the audio represents the voice instructions and to generate, as the first stream, a first instruction stream indicative of the voice instructions in accordance with a first trigger indicating a request to start the remote control of the home electric appliance, the first transmission unit being configured to transmit the instruction bit information and the first instruction stream to the base unit through a common multiplexing scheme that is common to transmission of a first stream generated in a case where the first trigger is not given to the first generation unit.]

[19. The handset according to claim 18, wherein in a case where the first trigger is not given to the first generation unit, the first generation unit is configured to generate call bit information indicating that the audio represents a voice call and to generate, as the first stream, a first call stream indicative of the audio.]

[20. The handset according to claim 18, further comprising:

a trigger generation unit configured to give the first trigger to the first generation unit.]

[21. A cordless telephone device comprising:

the handset according to claim 19; and a base unit, the base unit including (i) a second generation unit configured to generate a second instruction stream corresponding to the first instruction stream in accordance with receipt of the instruction bit information and the first instruction stream, and configured to generate a second call stream corresponding to the first call stream in accordance with receipt of the call bit information and the first call stream, and (ii) a second transmission unit configured to transmit the second instruction stream to a server that generates a control command using the second instruction stream for controlling the home electric appliance, and configured to transmit the second call stream to a telephone of an intended party with which the user is engaged in the voice call.]

*22. A method for controlling a first device for use in a system that allows remote control of a home electric appliance by using voice instructions of a user, the method comprising:*

*a sound receiving step of receiving audio of the user;*

*a first generation step of generating a first stream by encoding the audio input via the sound receiving step; and*

*a first transmission step of transmitting the first stream to a second device included in the system,*

*the first generation step including generating instruction bit information indicating that the audio represents the voice instructions and to generate, as the first stream, a first instruction stream indicative of the voice instructions in accordance with a first trigger indicating a request to start the remote control of the home electric appliance,*

*wherein in a case where the first trigger is not given to the first device, the first generation step includes generating call bit information indicating that the audio represents a voice call and to generate, as the first stream, a first call stream indicative of the audio,*

*the first generation step includes, in a case where the first device receives the first trigger during generation of the first call stream, switching an operation mode of the system from a call mode in which the audio is transferred to an intended party with which the user is engaged in the voice call to a mute mode in which transfer of the audio to the intended party is interrupted, and*

*the first generation step includes, in a case where the first device receives a second trigger indicating a request to return to the call mode or after a certain period has elapsed since the mute mode began, (i) terminating the mute mode, and (ii) generating the call bit information and the first call stream.*

*23. The method according to claim 22, wherein*

*the first generation step includes generating, during the mute mode, an alternative stream representing an alternative sound that replaces the audio, and*

*the first transmission step includes transmitting the alternative stream to the second device.*

*24. The method according to claim 22, wherein*

*the first generation step includes generating, as the call bit information, information specifying an audio encoding scheme for the first call stream.*

*25. The method according to claim 24, wherein*

*the first generation step includes generating, as the call bit information, information specifying a bit rate for the first call stream.*

*26. The method according to claim 22, wherein*

*the first generation step includes generating, as the instruction bit information, information specifying an audio encoding scheme for the first instruction stream.*

*27. The method according to claim 26, wherein*

*the first generation step includes generating, as the instruction bit information, information specifying a bit rate for the first instruction stream.*

*28. The method according to claim 22, further comprising:*

*a second generation step of generating a second stream corresponding to the first stream transmitted from the first device to the second device; and*

*a second transmission step of transmitting the second stream,*

*wherein the second generation step includes*

*(i) in a case where the second device receives the instruction bit information and the first instruction stream, causing the second device to generate a second instruction stream corresponding to the first instruction stream, and*

*(ii) in a case where the second device receives the call bit information and the first call stream, causing the second device to generate a second call stream corresponding to the first call stream, and*

*the second transmission step includes*

*(iii) in a case where the second device generates the second instruction stream, causing the second device to transmit the second instruction stream to a server that generates a control command using the second instruction stream for controlling the home electric appliance, and*

*(iv) in a case where the second device generates the second call stream, transmitting the second call stream to a third device of the intended party.*

*29. The method according to claim 28, wherein*

*the second transmission step includes causing the second device to selectively transmit the second instruction stream or the second call stream via a public communication line that is common to transmission of the second instruction stream and the second call stream.*

*30. The method according to claim 28, wherein*

*the second transmission step includes*

*(i) in a case where the second device generates the second instruction stream, causing the second device to transmit the second instruction stream via a first public communication line, and*

*(ii) in a case where the second device generates the second call stream, causing the second device to transmit the second call stream via a second public communication line different from the first public communication line.*

*31. The method according to claim 28, wherein*

*the second generation step includes causing the second device to generate, during the mute mode, an alternative stream representing an alternative sound that replaces the audio, and*

*the second transmission step includes, in a case where the second device generates the alternative stream, transmitting the alternative stream to the third device of the intended party.*

*32. A first device for use in a system that allows remote control of a home electric appliance by using voice instructions of a user, the first device comprising:*

*a sound receiver configured to receive audio of the user;*

*one or more memories; and*

*an integrated circuit configured to perform operations including:*

*generating a first stream by encoding the audio input via the sound receiver;*

*transmitting the first stream to a second device;*

*generating instruction bit information indicating that the audio represents the voice instructions and generating, as the first stream, a first instruction stream indicative of the voice instructions in accordance with a first trigger indicating a request to start the remote control of the home electric appliance; and*

*transmitting the instruction bit information and the first instruction stream to the second device,*

*in a case where the first trigger is not given to the first device, the integrated circuit generates call bit information indicating that the audio represents a voice call and generates, as the first stream, a first call stream indicative of the audio,*

*in a case where the first device receives the first trigger during generation of the first call stream, the integrated circuit switches an operation mode of the system from a call mode in which the audio is transferred to an intended party with which the user is engaged in the voice call to a mute mode in which transfer of the audio to the intended party is interrupted, and*

*in a case where the first device receives a second trigger indicating a request to return to the call mode or after a certain period has elapsed since the mute mode began, the integrated circuit (i) terminates the mute mode, and (ii) generates the call bit information and the first call stream.*

*33. The first device according claim 32, further comprising:*

*the integrated circuit is configured to perform an operation of generating the first trigger.*

*34. A communication system comprising:*

*the first device according to claim 32; and*

*a second device, the second device including:*

*one or more memories; and*

*an integrated circuit configured to perform operations including:*

*(i) generating a second instruction stream corresponding to the first instruction stream in accordance with receipt of the instruction bit information and the first instruction stream, and generating a second call stream corresponding to the first call stream in accordance with receipt of the call bit information and the first call stream, and*

*(ii) transmitting the second instruction stream to a server that generates a control command using the second instruction stream for controlling the home electric appliance, and transmitting the second call stream to a third device of an intended party with which the user is engaged in the voice call.*

*35. The communication system according to claim 34, wherein*

*the communication system is a cordless telephone device, the first device is handset and the second device is base unit.*

* * * * *